United States Patent
Van Ostrand et al.

(10) Patent No.: US 12,032,772 B2
(45) Date of Patent: *Jul. 9, 2024

(54) DISPLAY SCANNING FREQUENCY PATTERNS TO CONVEY DATA

(71) Applicant: SIGMASENSE, LLC., Wilmington, DE (US)

(72) Inventors: Daniel Keith Van Ostrand, Leander, TX (US); Richard Stuart Seger, Jr., Belton, TX (US); Shayne X. Short, College Station, TX (US); Timothy W. Markison, Mesa, AZ (US)

(73) Assignee: SIGMASENSE, LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,598

(22) Filed: Jul. 19, 2023

(65) Prior Publication Data

US 2023/0367416 A1 Nov. 16, 2023

Related U.S. Application Data

(63) Continuation of application No. 17/461,377, filed on Aug. 30, 2021, now Pat. No. 11,709,561, which is a
(Continued)

(51) Int. Cl.
*G06F 3/02* (2006.01)
*G06F 1/16* (2006.01)
(Continued)

(52) U.S. Cl.
CPC .......... *G06F 3/04162* (2019.05); *G06F 1/163* (2013.01); *G06F 1/266* (2013.01);
(Continued)

(58) Field of Classification Search
CPC ...... G06F 3/02; G06F 3/0416; G06F 3/04162; G06F 3/044; G06F 3/04883;
(Continued)

(56) References Cited

U.S. PATENT DOCUMENTS

| 5,437,178 A | 8/1995 | Esin et al. |
| 6,218,972 B1 | 4/2001 | Groshong |

(Continued)

FOREIGN PATENT DOCUMENTS

| CN | 103995626 A | 8/2014 |
| CN | 104182105 A | 12/2014 |

(Continued)

OTHER PUBLICATIONS

European Patent Office; Extended European Search Report; Application No. 19853507.2; dated Jun. 13, 2023; 7 pgs.
(Continued)

*Primary Examiner* — Ryan A Lubit
(74) *Attorney, Agent, or Firm* — Garlick & Markison; Timothy W. Markison; Shayne X. Short

(57) ABSTRACT

A computing device includes signal generation circuitry and also includes a location on the computing device that is operative to couple a signal generated by the signal generation circuitry into a user. For example, the computing device includes signal generation circuitry that generates a signal that includes information corresponding to a user and/or an application that is operative within the computing device. The signal generation circuitry couples the signal into the user from a location on the computing device based on a bodily portion of the user being in contact with or within sufficient proximity to the location on the computing device that facilitates coupling of the signal into the user. Also, the signal may be coupled via the user to another computing
(Continued)

device that includes a touchscreen display that is operative to detect and receive the signal.

20 Claims, 51 Drawing Sheets

Related U.S. Application Data continuation of application No. 17/139,514, filed on Dec. 31, 2020, now Pat. No. 11,320,860, which is a continuation of application No. 16/596,928, filed on Oct. 9, 2019, now Pat. No. 10,908,641.

(51) Int. Cl.
| | |
|---|---|
| *G06F 1/26* | (2006.01) |
| *G06F 3/041* | (2006.01) |
| *G06F 3/044* | (2006.01) |
| *G06F 3/14* | (2006.01) |
| *G06Q 10/109* | (2023.01) |
| *H04B 13/00* | (2006.01) |

(52) U.S. Cl.
CPC .............. *G06F 3/02* (2013.01); *G06F 3/0416* (2013.01); *G06F 3/0418* (2013.01); *G06F 3/044* (2013.01); *G06F 3/1423* (2013.01); *G06F 2203/04108* (2013.01); *G06Q 10/109* (2013.01); *H04B 13/005* (2013.01)

(58) Field of Classification Search
CPC ...... G06F 3/1423; G06F 1/1626; G06F 1/163; G06F 1/1643; G06F 1/266; G06F 2203/0383; G06F 2203/04108; G06F 2203/04808
See application file for complete search history.

(56) References Cited

U.S. PATENT DOCUMENTS

| | | | |
|---|---|---|---|
| 6,665,013 B1 | 12/2003 | Fossum et al. | |
| 7,476,233 B1 | 1/2009 | Wiener et al. | |
| 7,528,755 B2 | 5/2009 | Hammerschmidt | |
| 8,031,094 B2 | 10/2011 | Hotelling | |
| 8,089,289 B1 | 1/2012 | Kremin et al. | |
| 8,279,180 B2 | 10/2012 | Hotelling et al. | |
| 8,378,967 B2 * | 2/2013 | Noda | G06F 3/014 345/174 |
| 8,537,110 B2 | 9/2013 | Kruglick | |
| 8,547,114 B2 | 10/2013 | Kremin | |
| 8,587,535 B2 | 11/2013 | Oda et al. | |
| 8,625,726 B2 | 1/2014 | Kuan | |
| 8,657,681 B2 | 2/2014 | Kim | |
| 8,966,400 B2 | 2/2015 | Yeap | |
| 8,982,097 B1 | 3/2015 | Kuzo et al. | |
| 9,081,437 B2 | 7/2015 | Oda | |
| 9,201,547 B2 | 12/2015 | Elias | |
| 9,496,923 B2 * | 11/2016 | Han | G06F 3/04162 |
| 9,967,039 B2 * | 5/2018 | Kim | H04L 5/0048 |
| 10,007,335 B2 | 6/2018 | Lee | |
| 2003/0052657 A1 | 3/2003 | Koernle et al. | |
| 2005/0235758 A1 | 10/2005 | Kowal et al. | |
| 2007/0190940 A1 * | 8/2007 | Lee | H04B 13/005 455/41.1 |
| 2009/0319184 A1 * | 12/2009 | Teshima | H04B 13/005 701/431 |
| 2010/0094159 A1 * | 4/2010 | Hwang | H04B 13/005 455/41.1 |
| 2011/0063154 A1 | 3/2011 | Hotelling et al. | |
| 2011/0298745 A1 | 12/2011 | Souchkov | |
| 2012/0278031 A1 | 11/2012 | Oda | |
| 2013/0278447 A1 | 10/2013 | Kremin | |
| 2014/0327644 A1 | 11/2014 | Mohindra | |
| 2015/0087230 A1 | 3/2015 | Han | |
| 2015/0091847 A1 | 4/2015 | Chang | |
| 2015/0346889 A1 | 12/2015 | Chen | |
| 2015/0358088 A1 | 12/2015 | Eim | |
| 2016/0188049 A1 | 6/2016 | Yang et al. | |
| 2018/0157354 A1 | 6/2018 | Blondin et al. | |
| 2018/0275824 A1 | 9/2018 | Li | |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |
| KR | 1020110045651 A | 5/2011 |
| KR | 1020160127491 A | 11/2016 |

OTHER PUBLICATIONS

Baker; How delta-sigma ADCs work, Part 1; Analog Applications Journal; Oct. 1, 2011; 6 pgs.

Brian Pisani, Digital Filter Types in Delta-Sigma ADCs, Application Report SBAA230, May 2017, pp. 1-8, Texas Instruments Incorporated, Dallas, Texas.

International Searching Authority; International Search Report and Written Opinion; International Application No. PCT/US2020/054220; dated Jan. 27, 2021; 9 pgs.

\* cited by examiner computing device 12 computing device 14 computing device 18

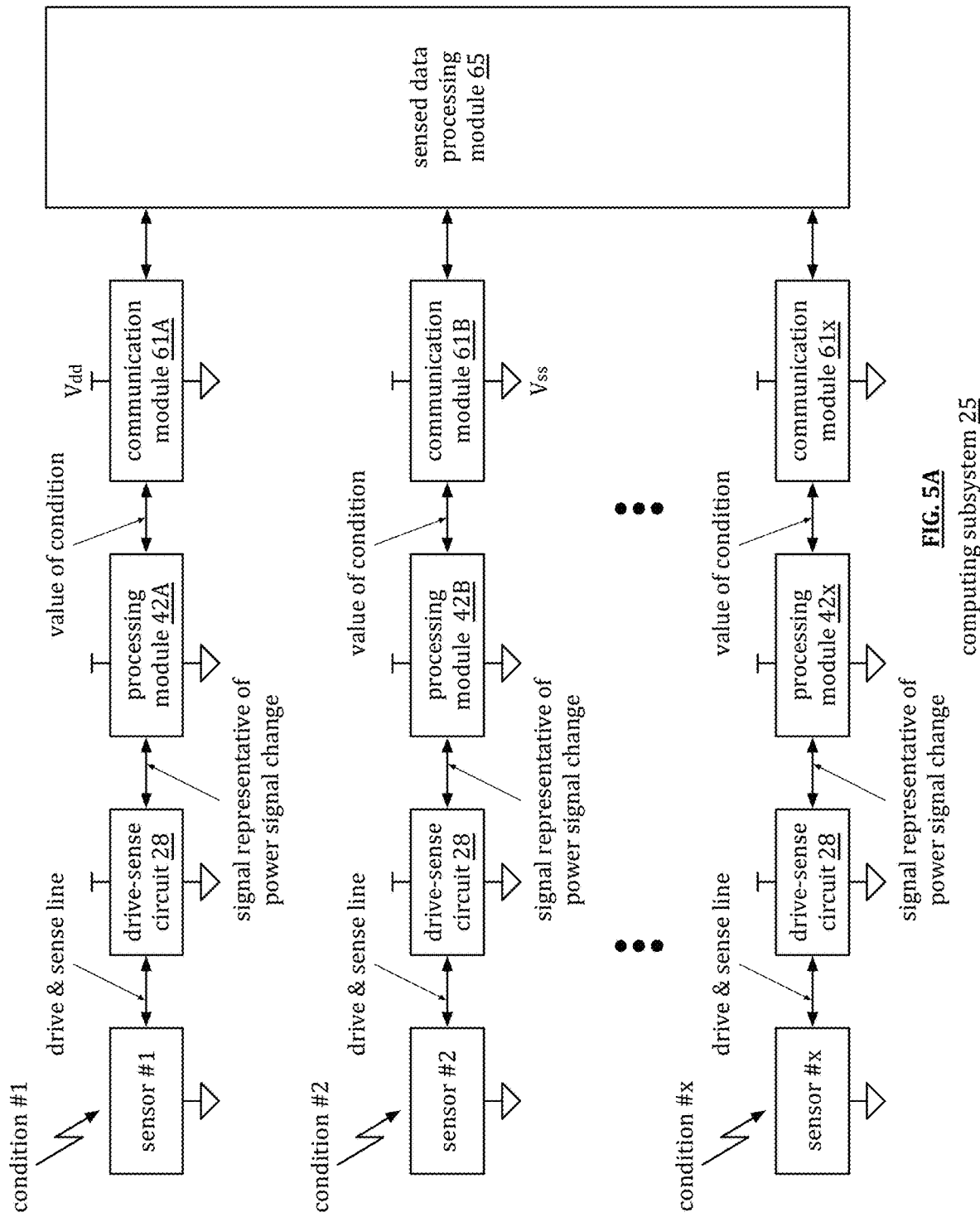

computing subsystem 25

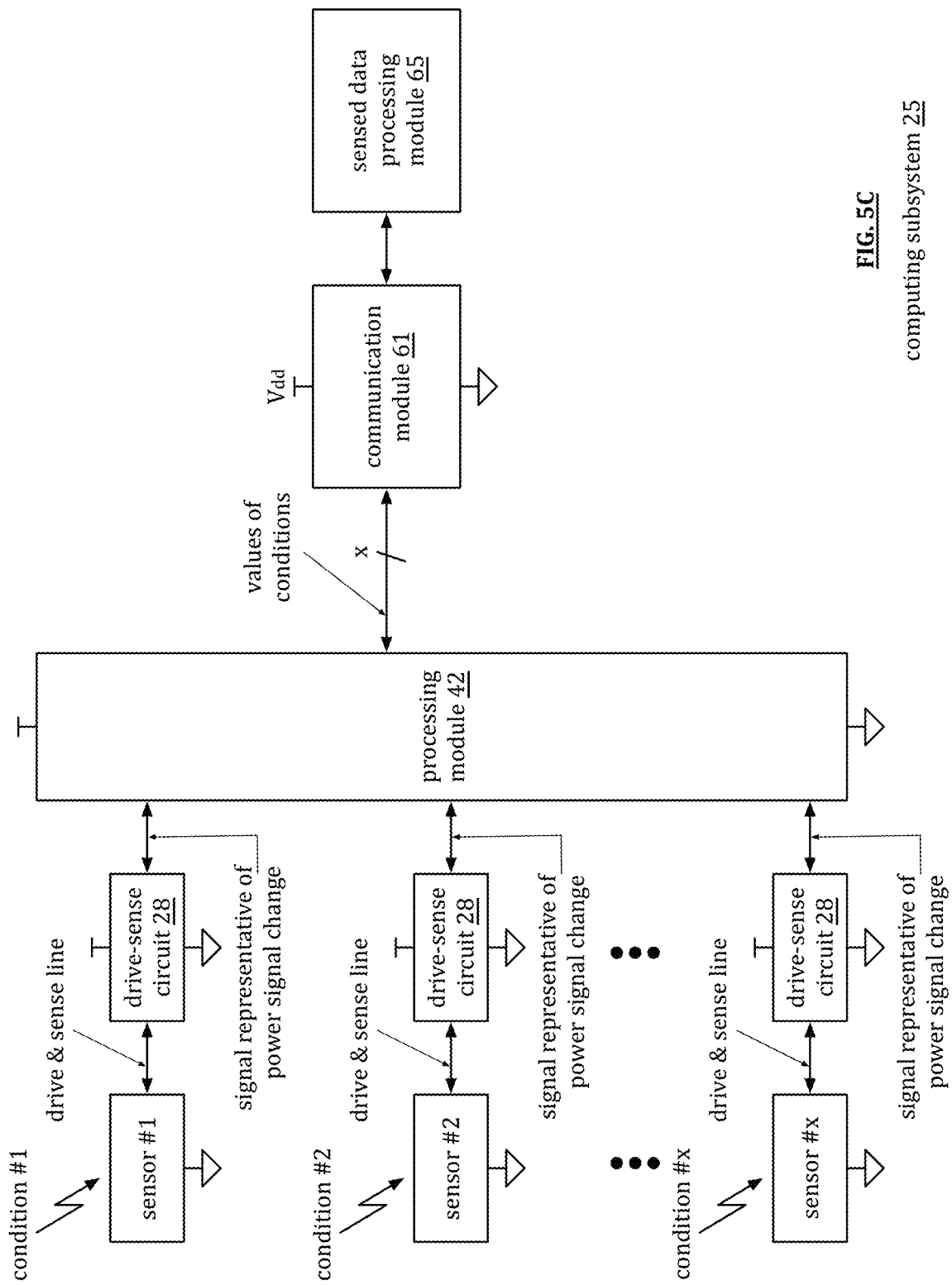

sensor graph power signal graph power signal graph power signal graph power signal graph power signal graph

1400

1500

1601

1602

1700
drive-sense circuit 28

2000

2100

2200

2300

2400

2500

2600

2700

2802

2801

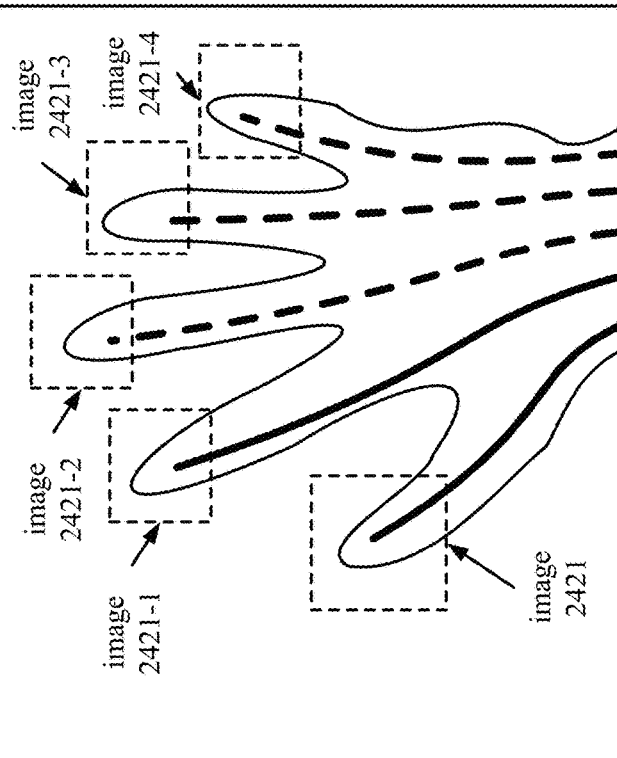

2903 active matrix – gate line scanning
3700

3800

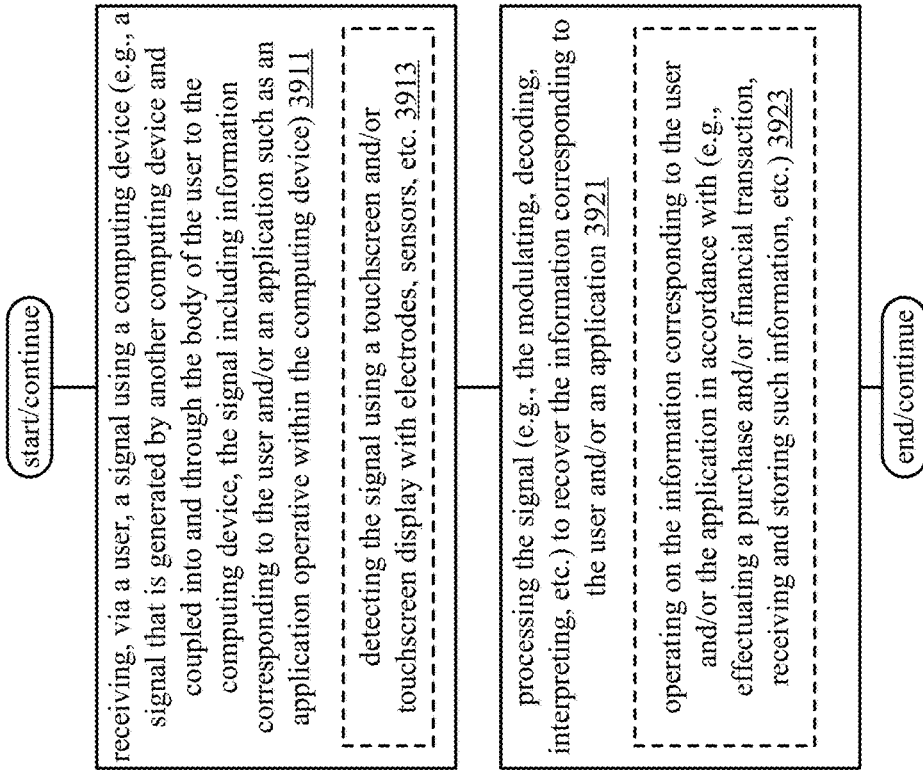
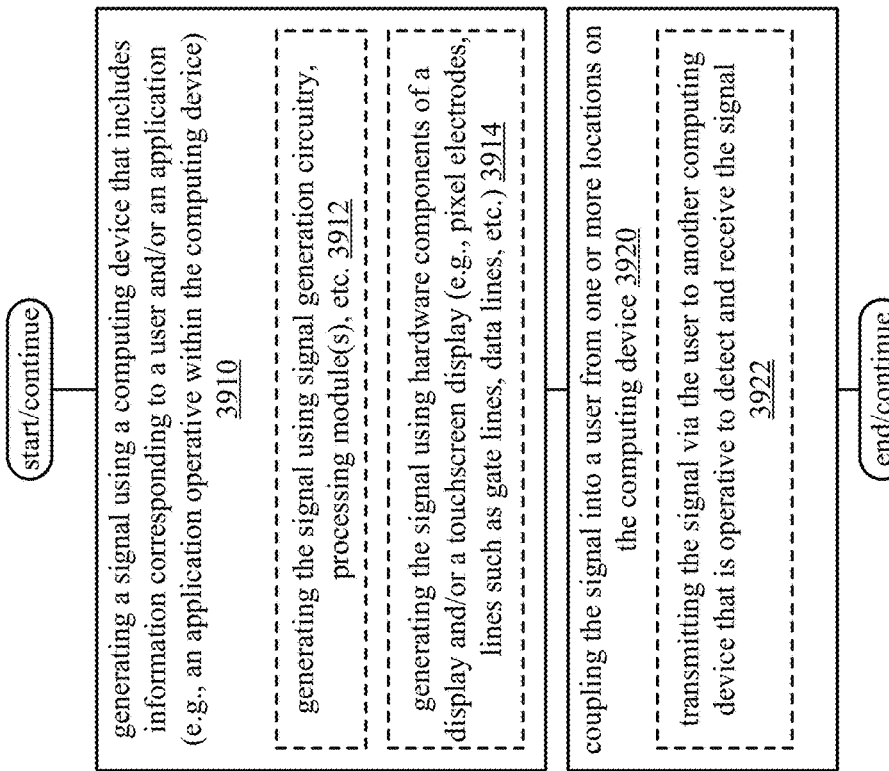

FIG. 40
4000 start/continue

↓ selecting one or more encoding schemes to be used to encode information into a signal to be generated by a display and/or a touchscreen display of a computing device 4010

- - - - - - - - - - - - - - - - - - - - - - - - - - - - - - - - - - - - - - - - -
| selecting the one or more encoding schemes from a number of encoding schemes that |
| operate using respective frequency patterns frequency pattern to convey data 4012 |
- - - - - - - - - - - - - - - - - - - - - - - - - - - - - - - - - - - - - - - - -

- - - - - - - - - - - - - - - - - - - - - - - - - - - - - - - - - - - - - - - - -
| facilitating agreement between the computing device and another computing device |
| (e.g., a recipient computing device) regarding the selected one or more encoding |
| schemes 4014 |
- - - - - - - - - - - - - - - - - - - - - - - - - - - - - - - - - - - - - - - - -

↓ operating the display and/or touchscreen display to generate one or more signals based on the one or more selected encoding schemes that includes information corresponding to a user and/or an application (e.g., an application operative within the computing device) 4020

↓ coupling the signal into a user from one or more locations on the display and/or touchscreen display of the computing device 4030

- - - - - - - - - - - - - - - - - - - - - - - - - - - - - - - - - - - - - - - - -
| transmitting the signal via the user to another computing device that is operative to |
| detect and receive the signal 4032 |
- - - - - - - - - - - - - - - - - - - - - - - - - - - - - - - - - - - - - - - - -

↓ end/continue

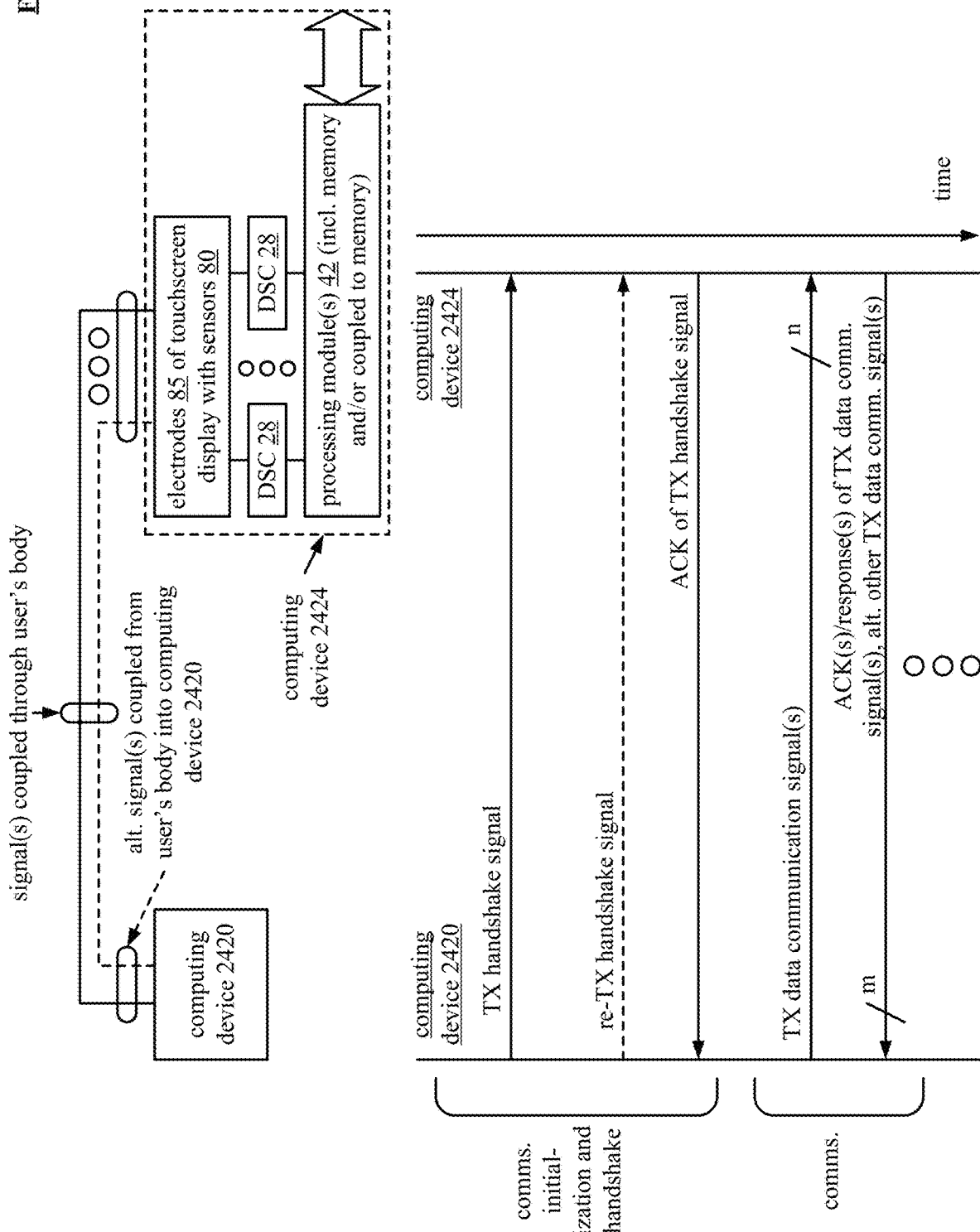

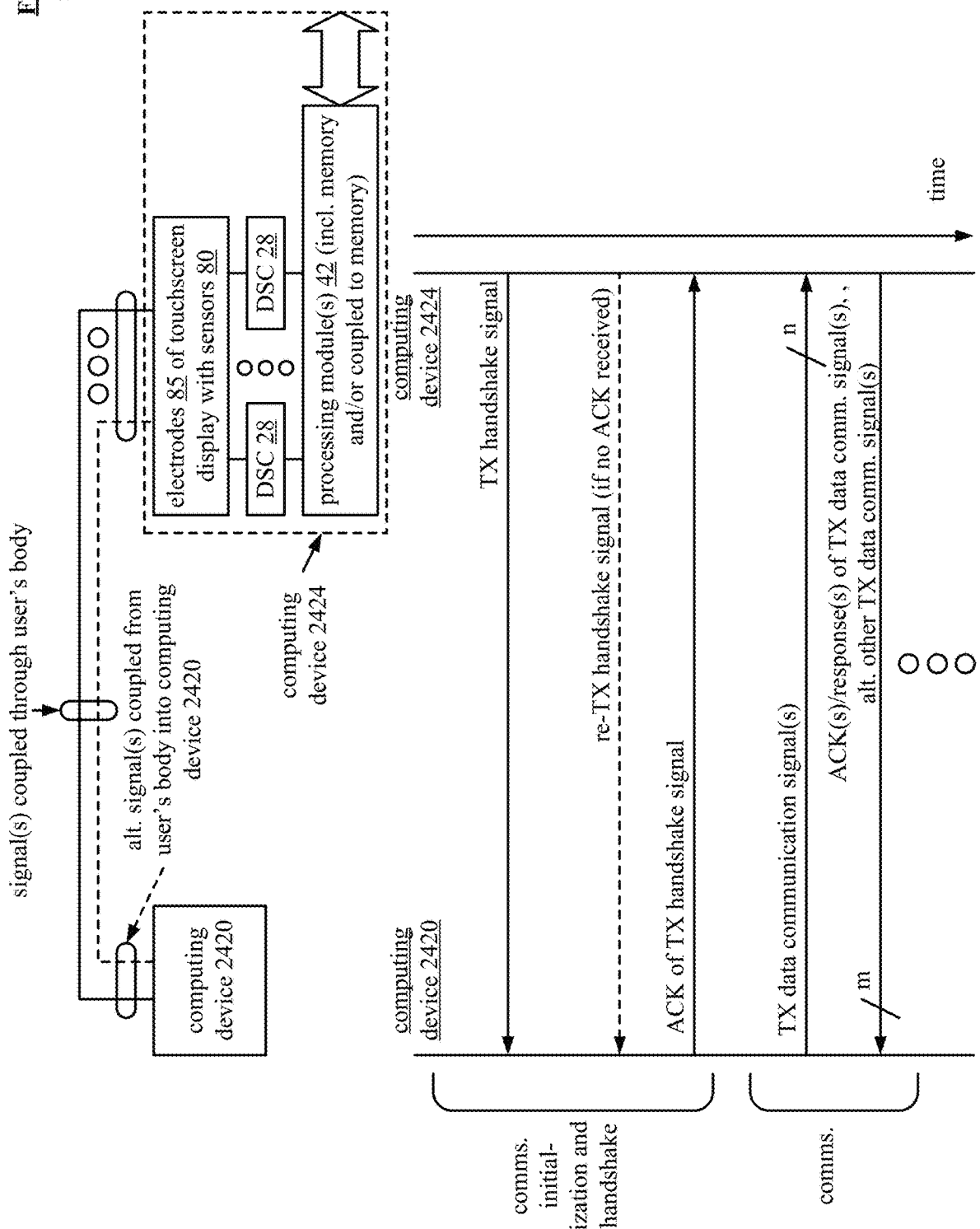

4300

4400

4600

4700

4800

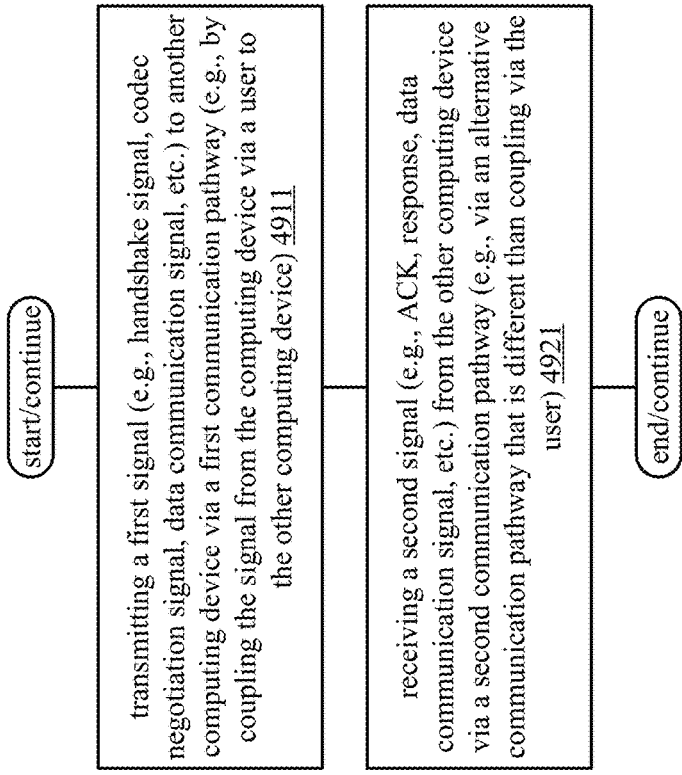
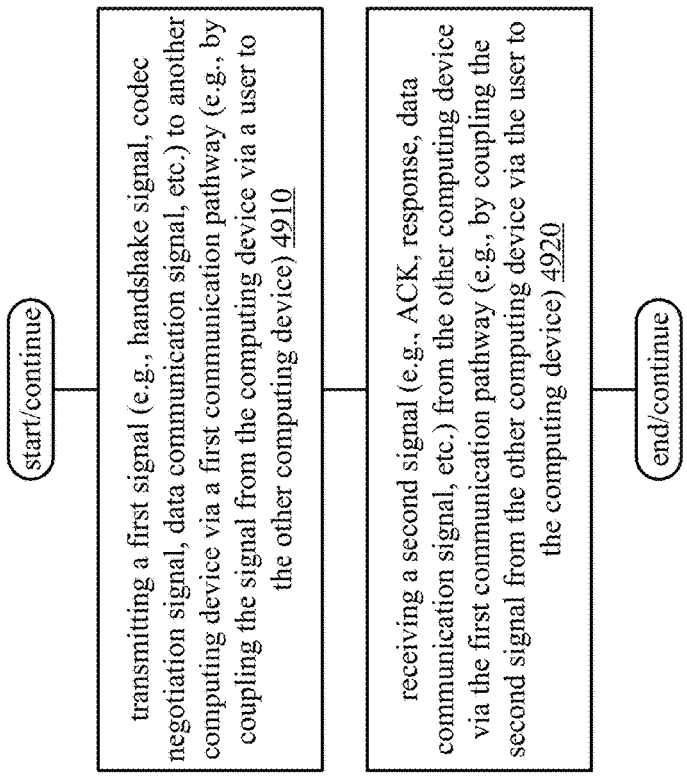

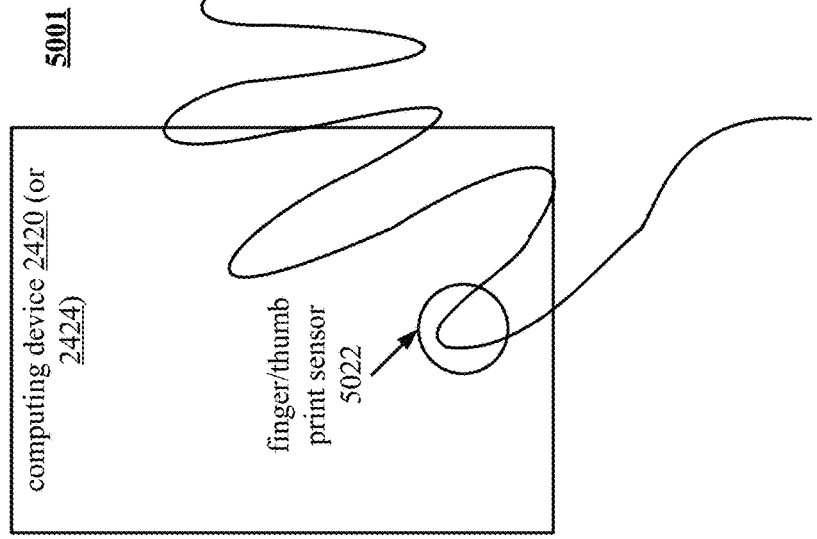
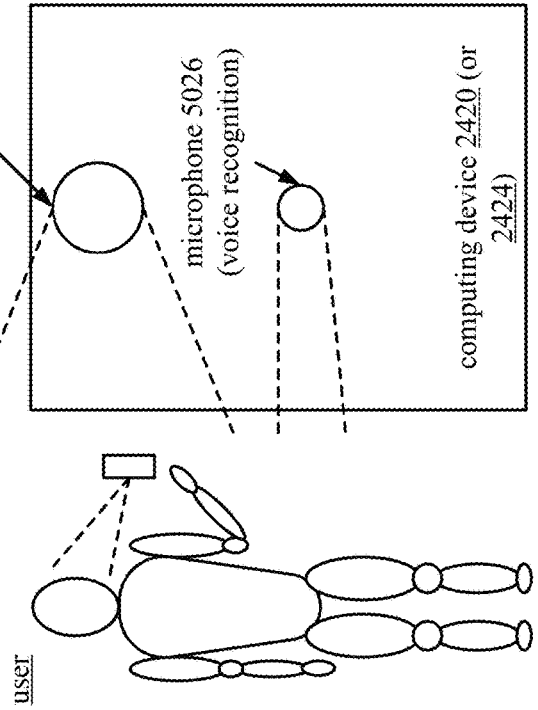
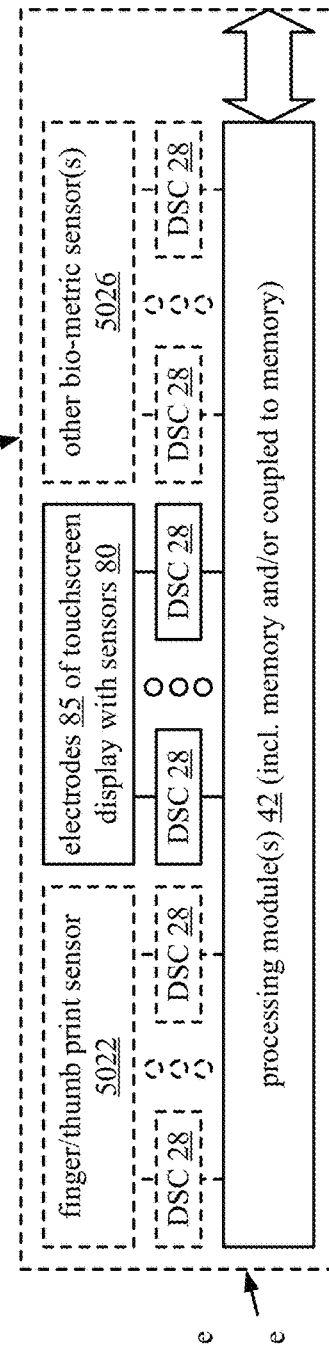
FIG. 50

5100

DISPLAY SCANNING FREQUENCY PATTERNS TO CONVEY DATA

CROSS REFERENCE TO RELATED PATENTS

The present U.S. Utility Patent Applications claims priority pursuant to 35 U.S.C. § 120 as a continuation of U.S. Utility application Ser. No. 17/461,377 entitled "Display scanning frequency patterns to convey data," filed Aug. 30, 2021, pending, and scheduled to issue as U.S. Pat. No. 11,709,561 on Jul. 25, 2023, which claims priority pursuant to 35 U.S.C. § 120 as a continuation of U.S. Utility application Ser. No. 17/139,514 entitled "Display generated data transmission from user device to touchscreen via user," filed Dec. 31, 2020, now issued as U.S. Pat. No. 11,320,860 on May 3, 2022, which claims priority pursuant to 35 U.S.C. § 120 as a continuation of U.S. Utility application Ser. No. 16/596,928 entitled "Display generated data transmission from user device to touchscreen via user," filed Oct. 9, 2019, now issued as U.S. Pat. No. 10,908,641 on Feb. 2, 2021, all of which are hereby incorporated herein by reference in their entirety and made part of the present U.S. Utility Patent Applications for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touchscreen. As yet another example, the computing device processes the sensor signals to determine various data points in a production line of a product.

BRIEF DESCRIPTION OF THE SEVERAL VIEWS OF THE DRAWING(S)

FIG. 5A is a schematic plot diagram of a computing subsystem in accordance with the present invention;

FIG. 5C is a schematic block diagram of another embodiment of a computing subsystem in accordance with the present invention;

FIG. 29A is a schematic block diagram of an embodiment of coupling of one or more signals from a computing device via a user, or alternatively, from a user into a computing device, in accordance with the present invention;

FIG. 29B is a schematic block diagram of another embodiment of coupling of one or more signals from a computing device via a user, or alternatively, from a user into a computing device, in accordance with the present invention;

Figure 31:
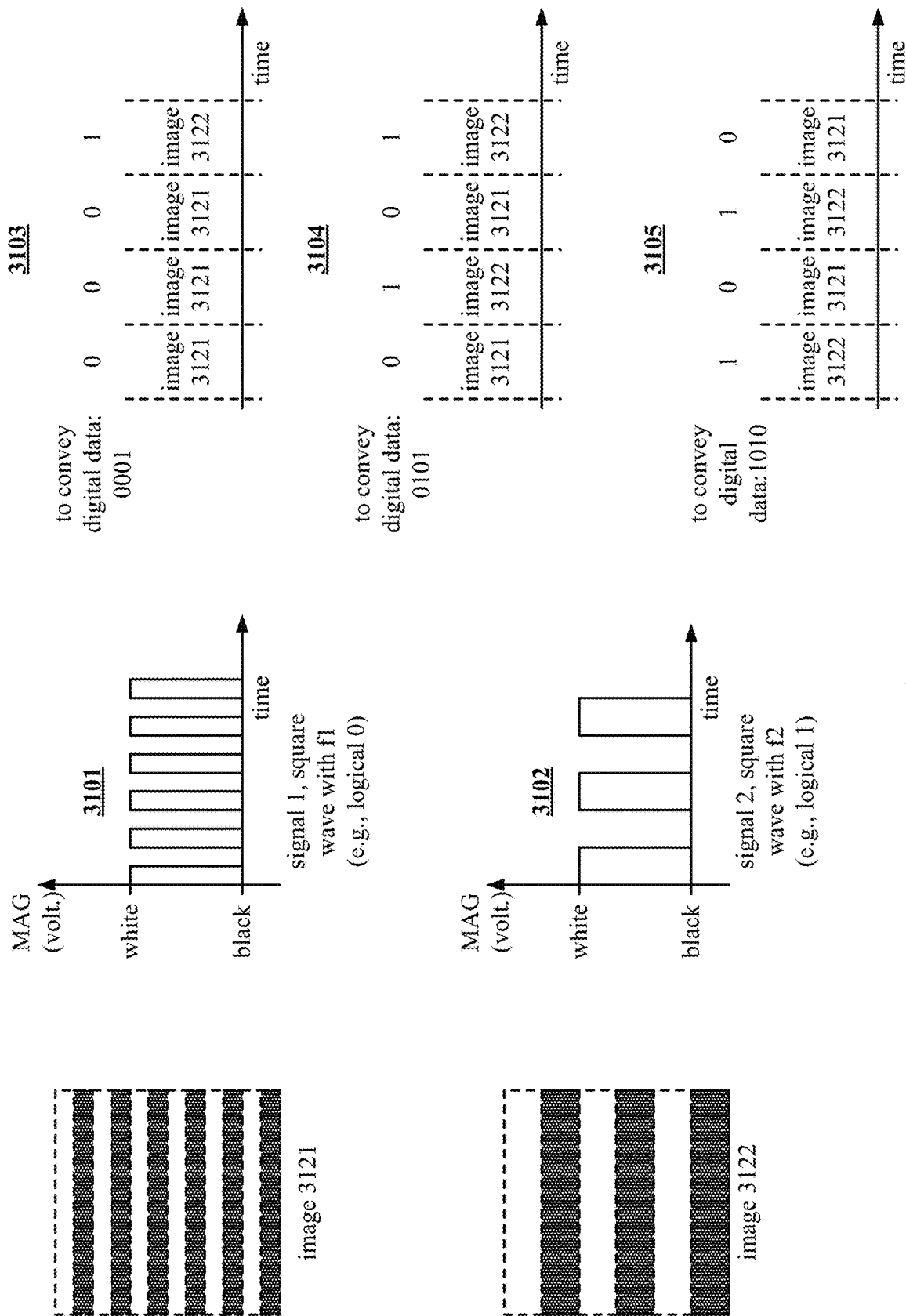
Figure 32:
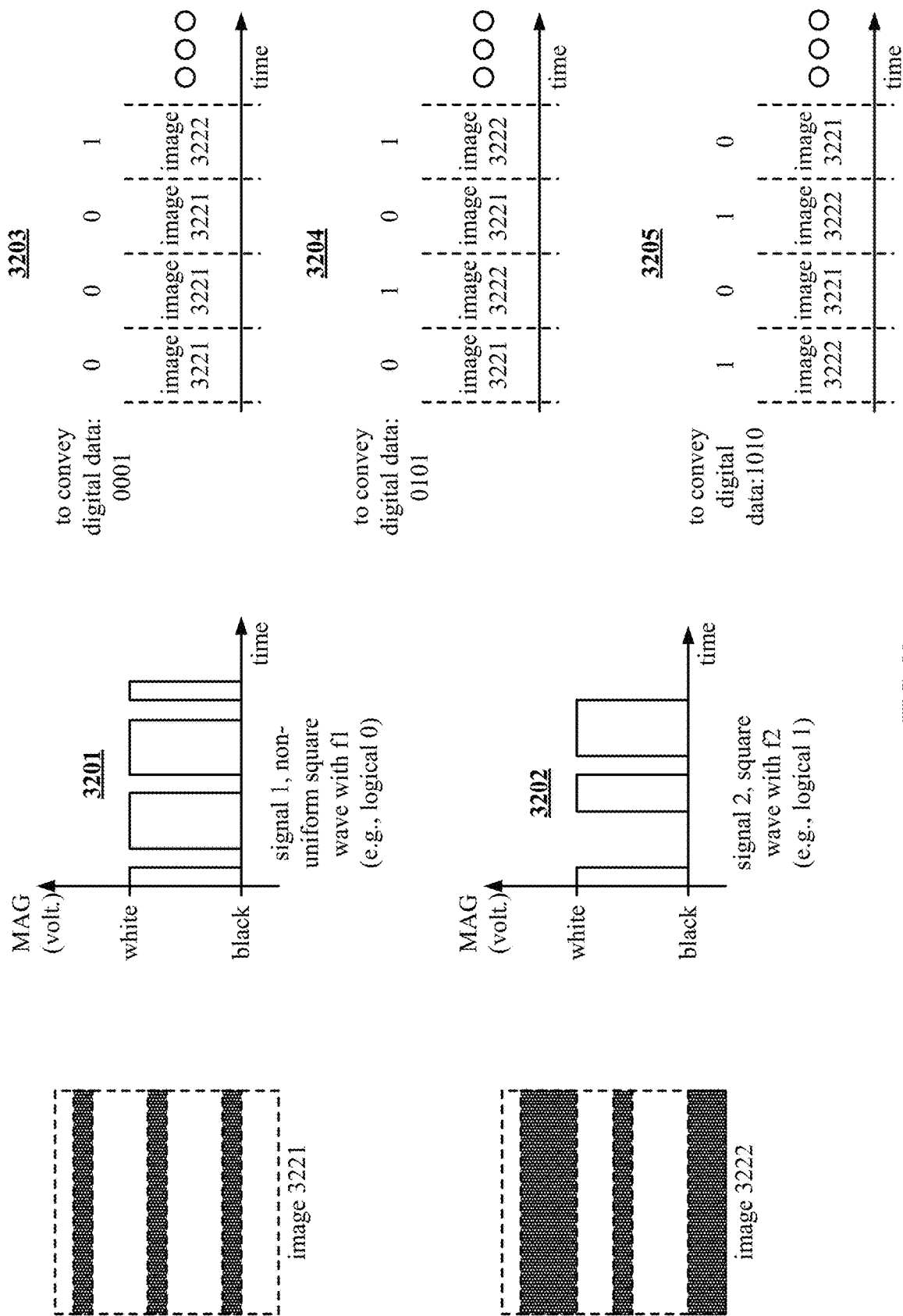
Figure 33:
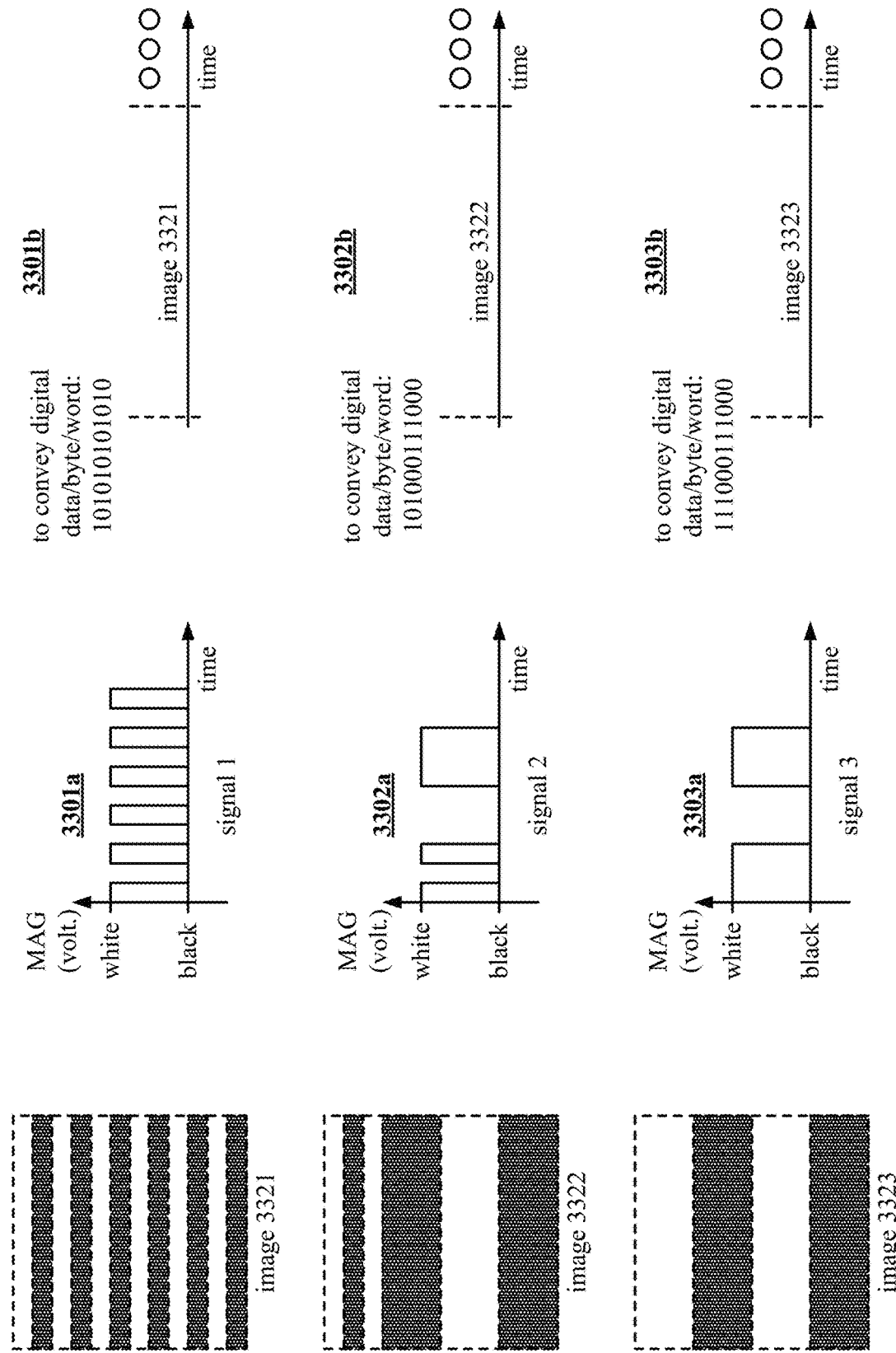
Figure 34:
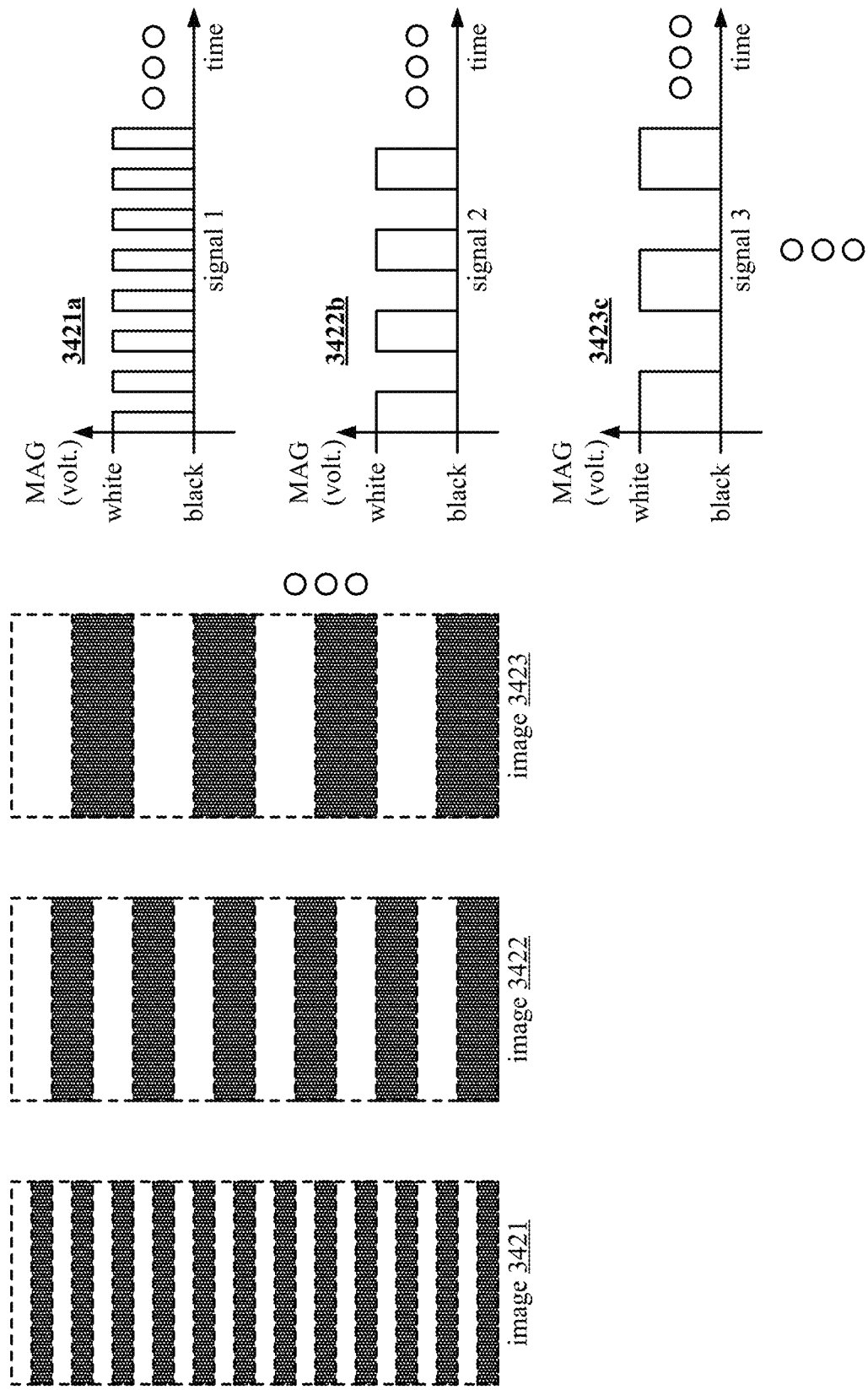
Figure 35:
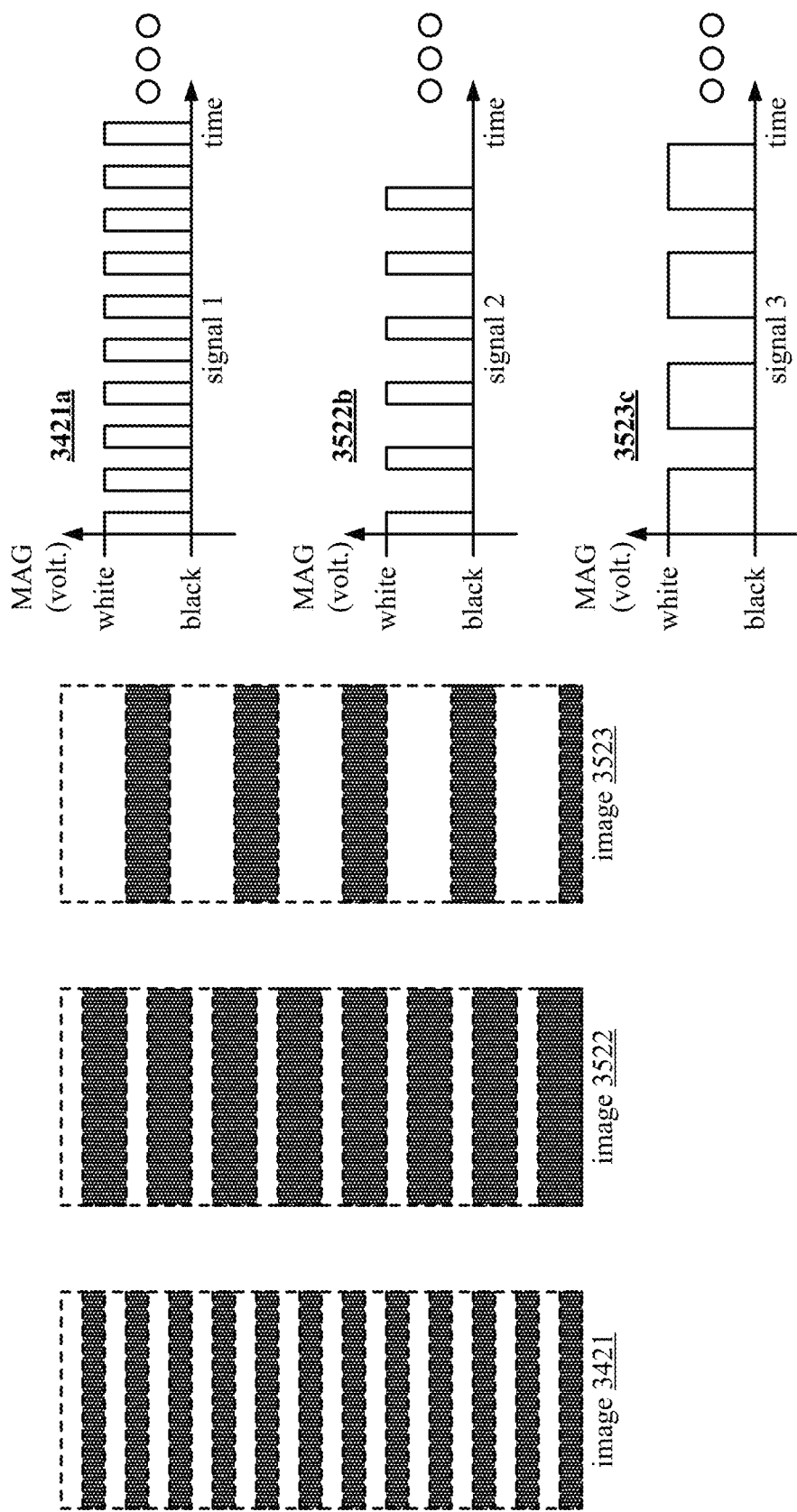
Figure 36:
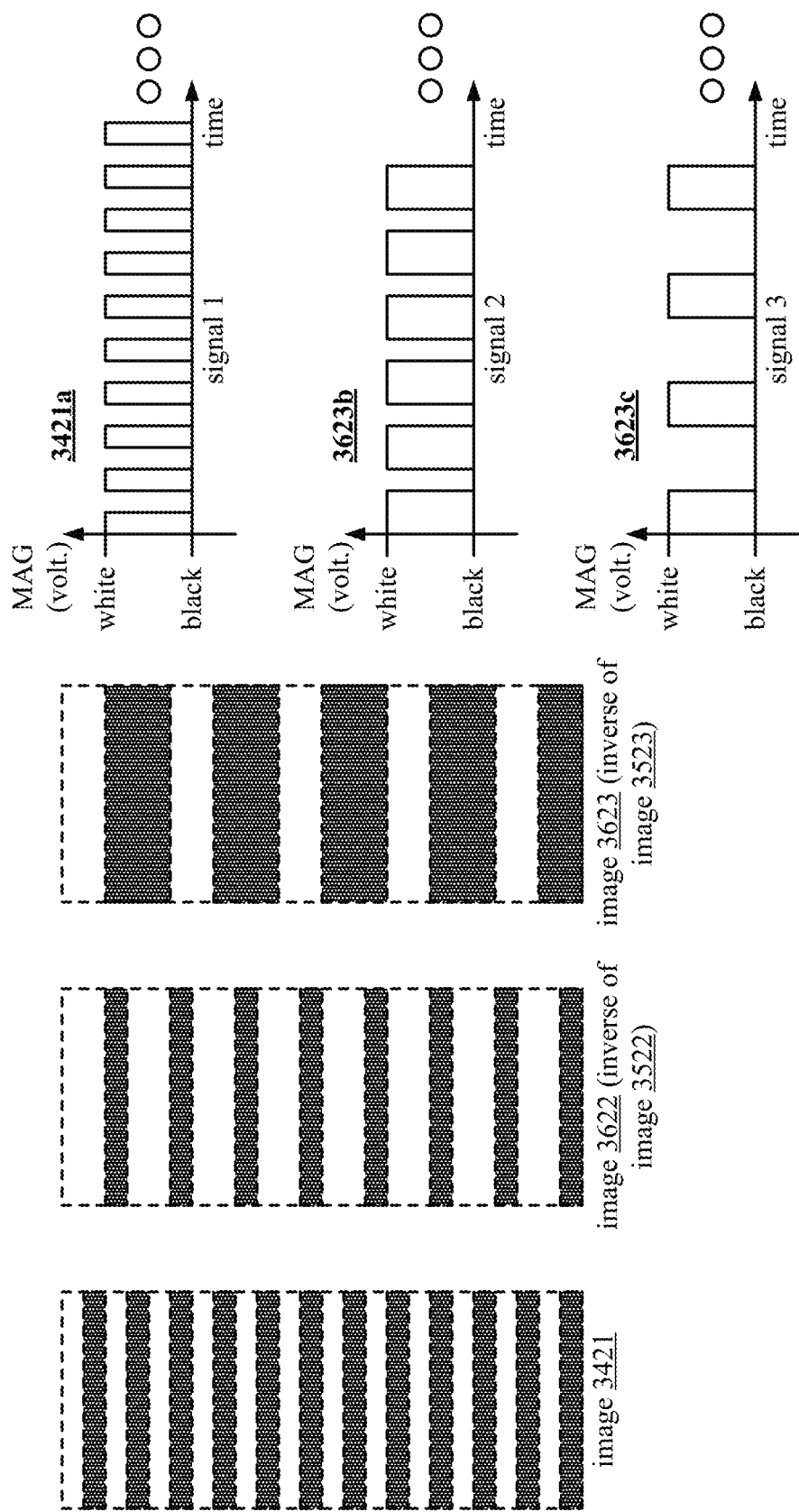
Figure 37:
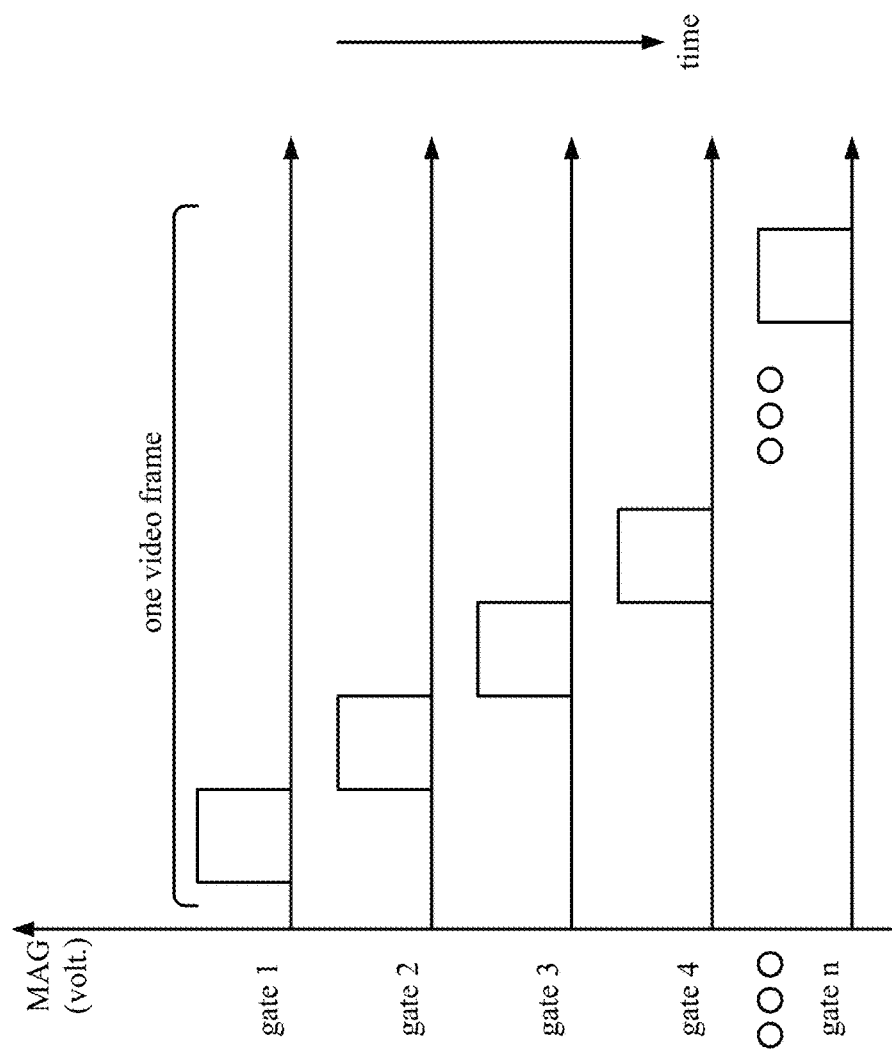
Figure 38:
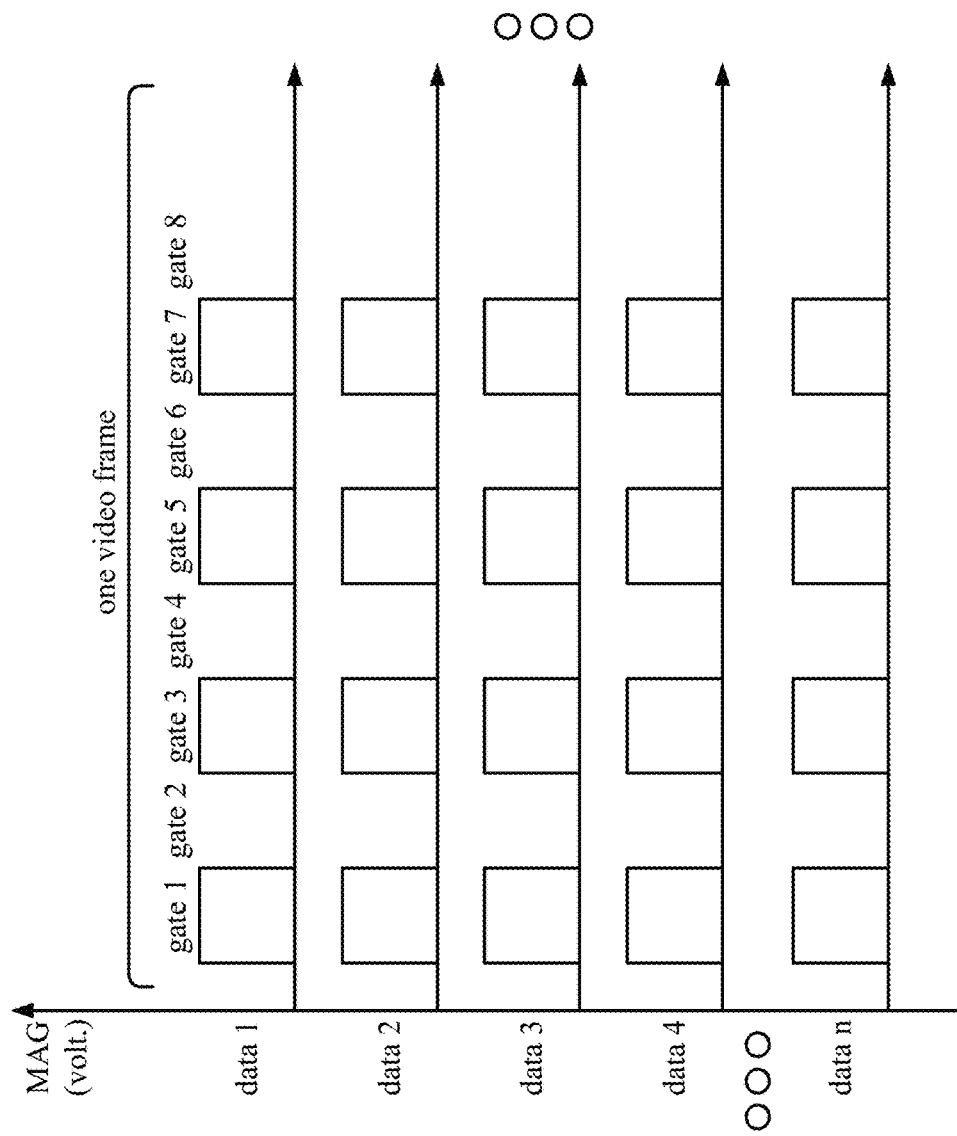
Figure 43:
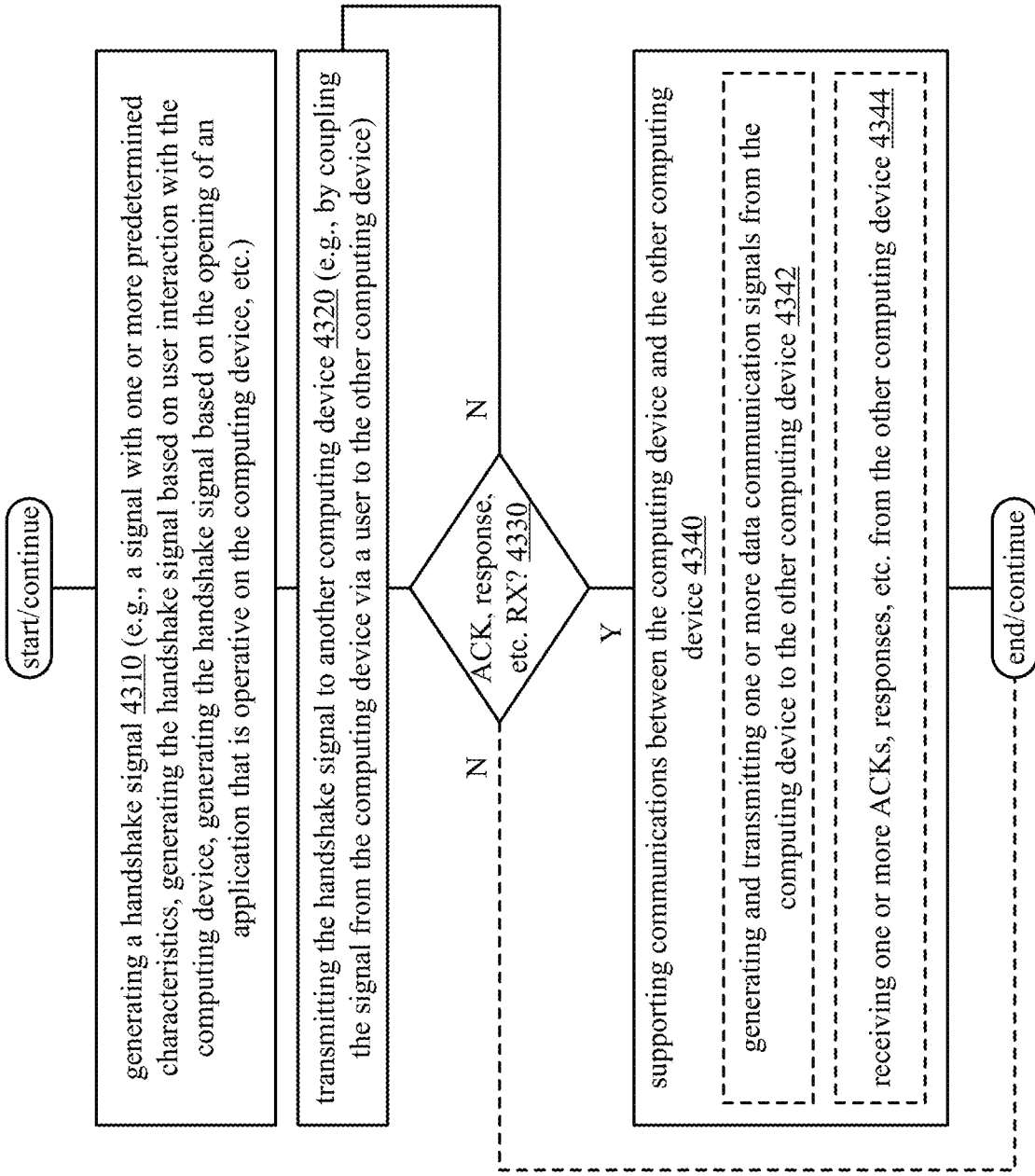
Figure 44:
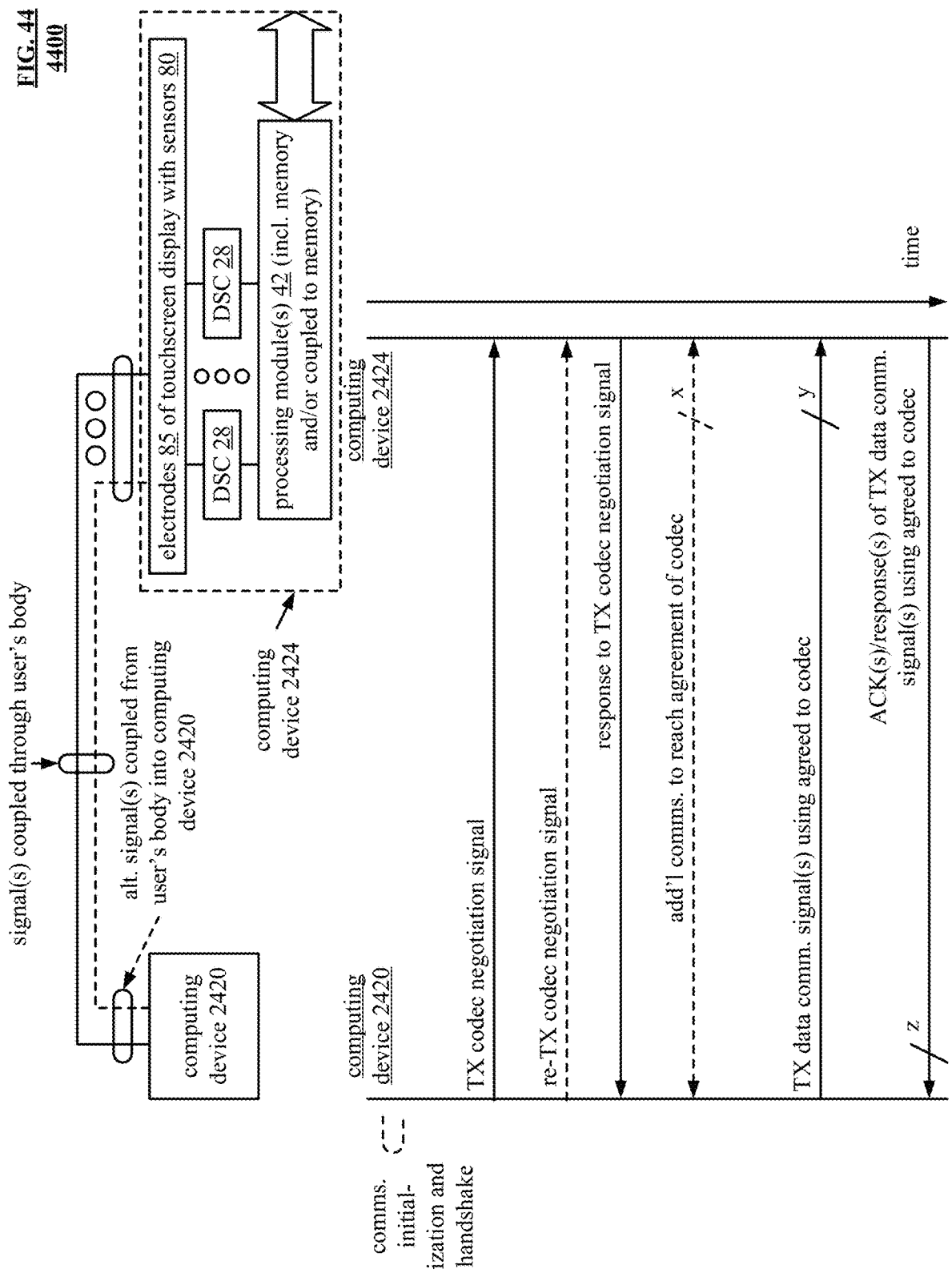
Figure 45:
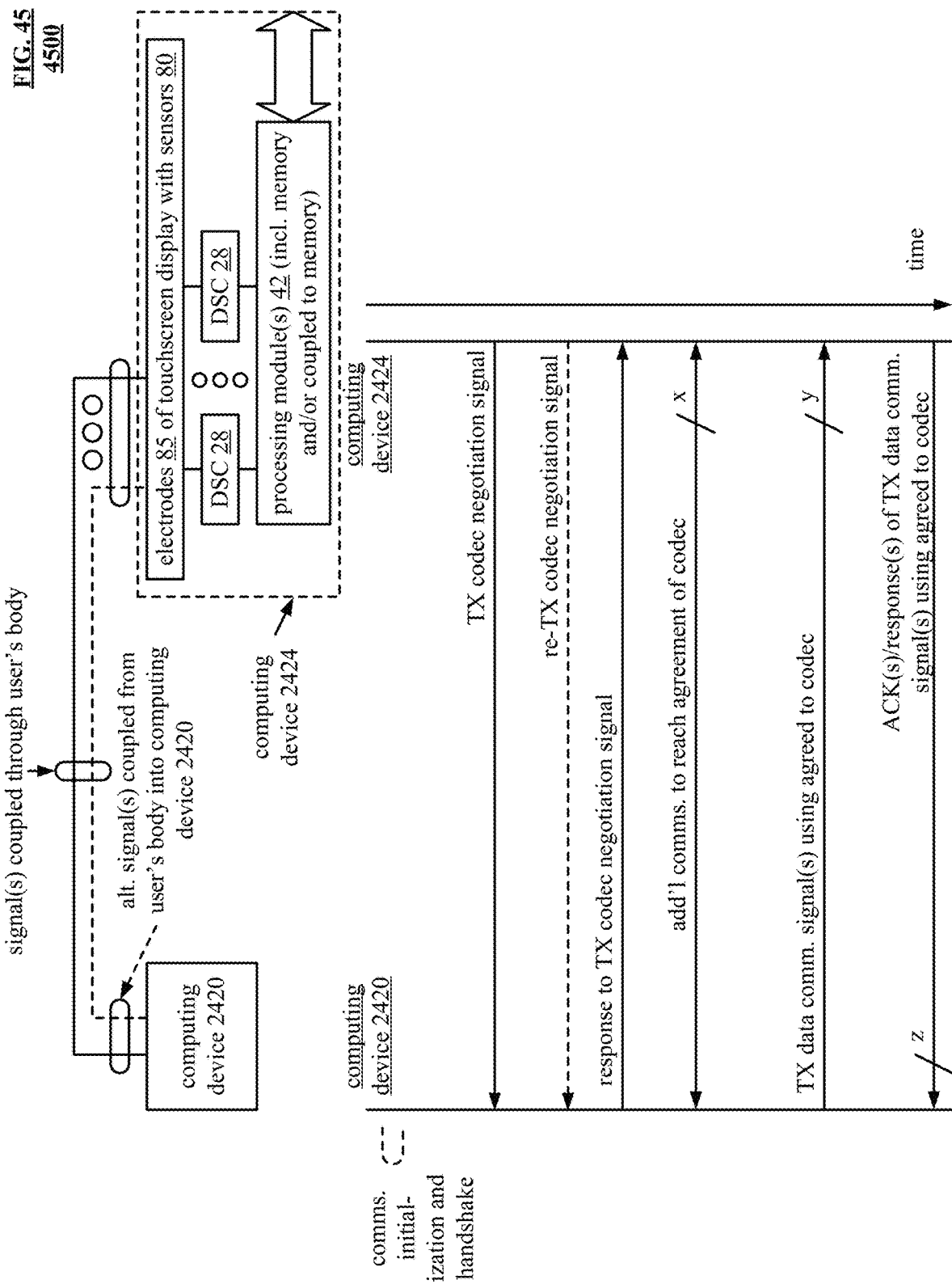
Figure 46:
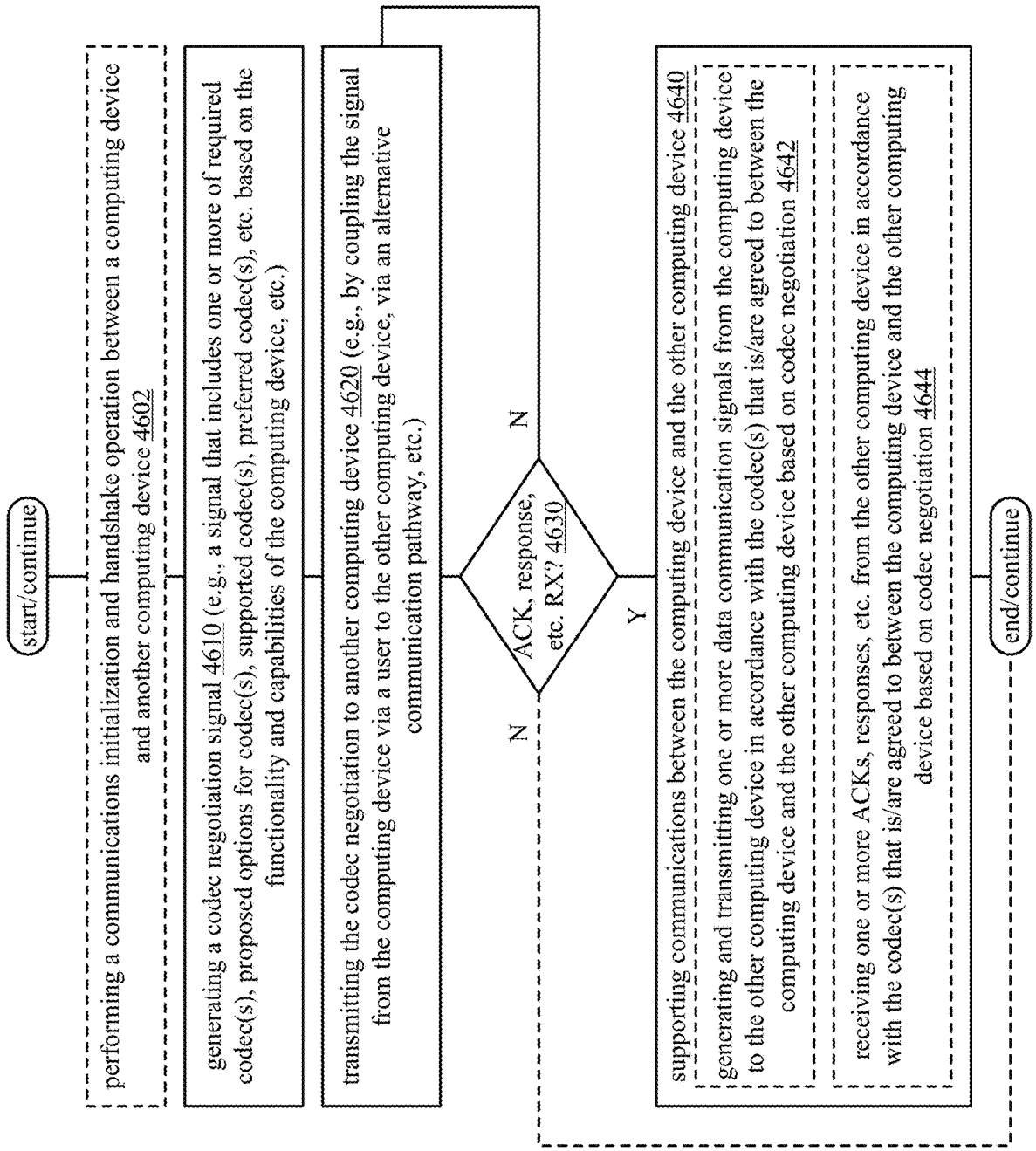
Figure 47:
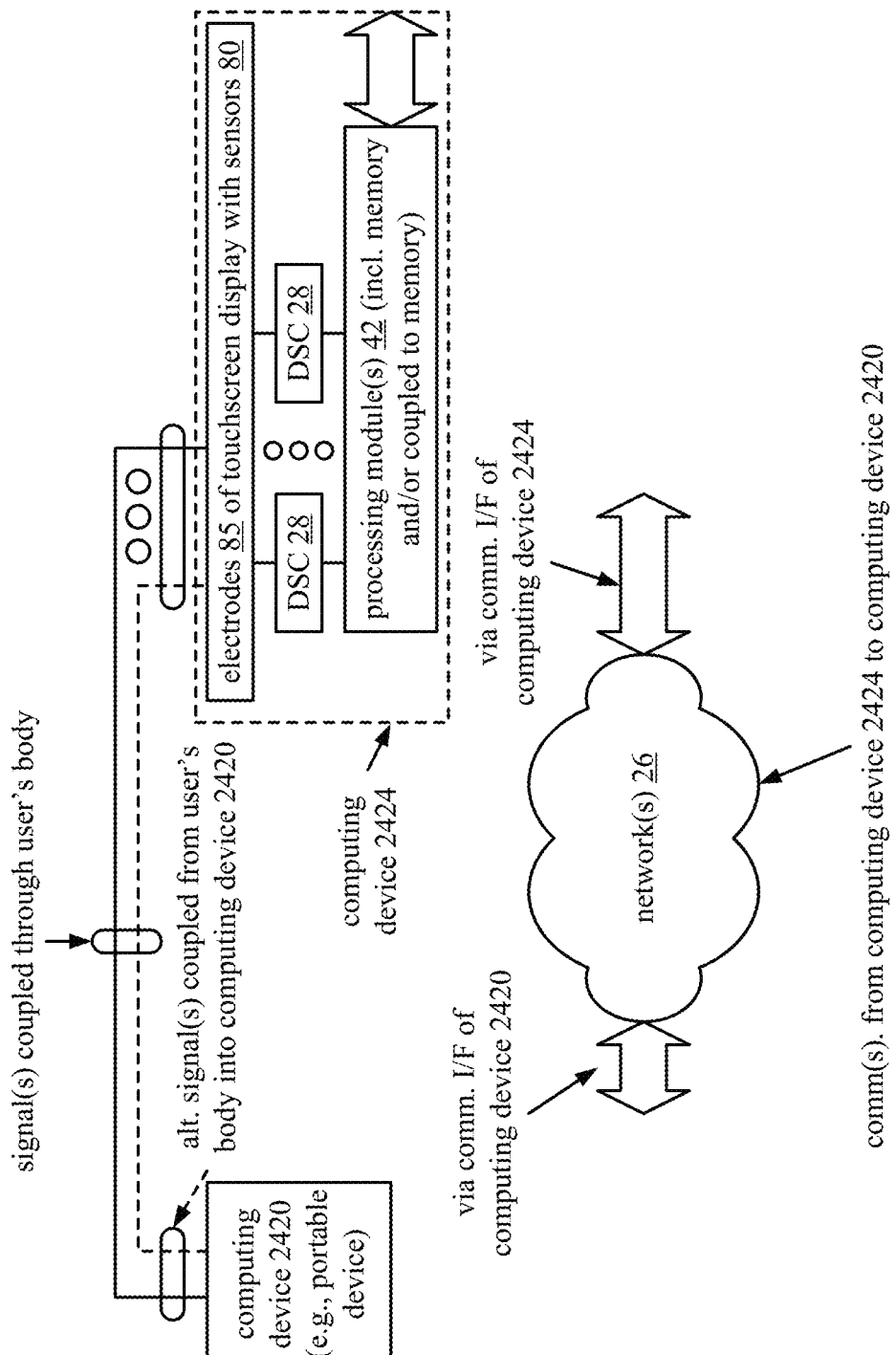
Figure 48:
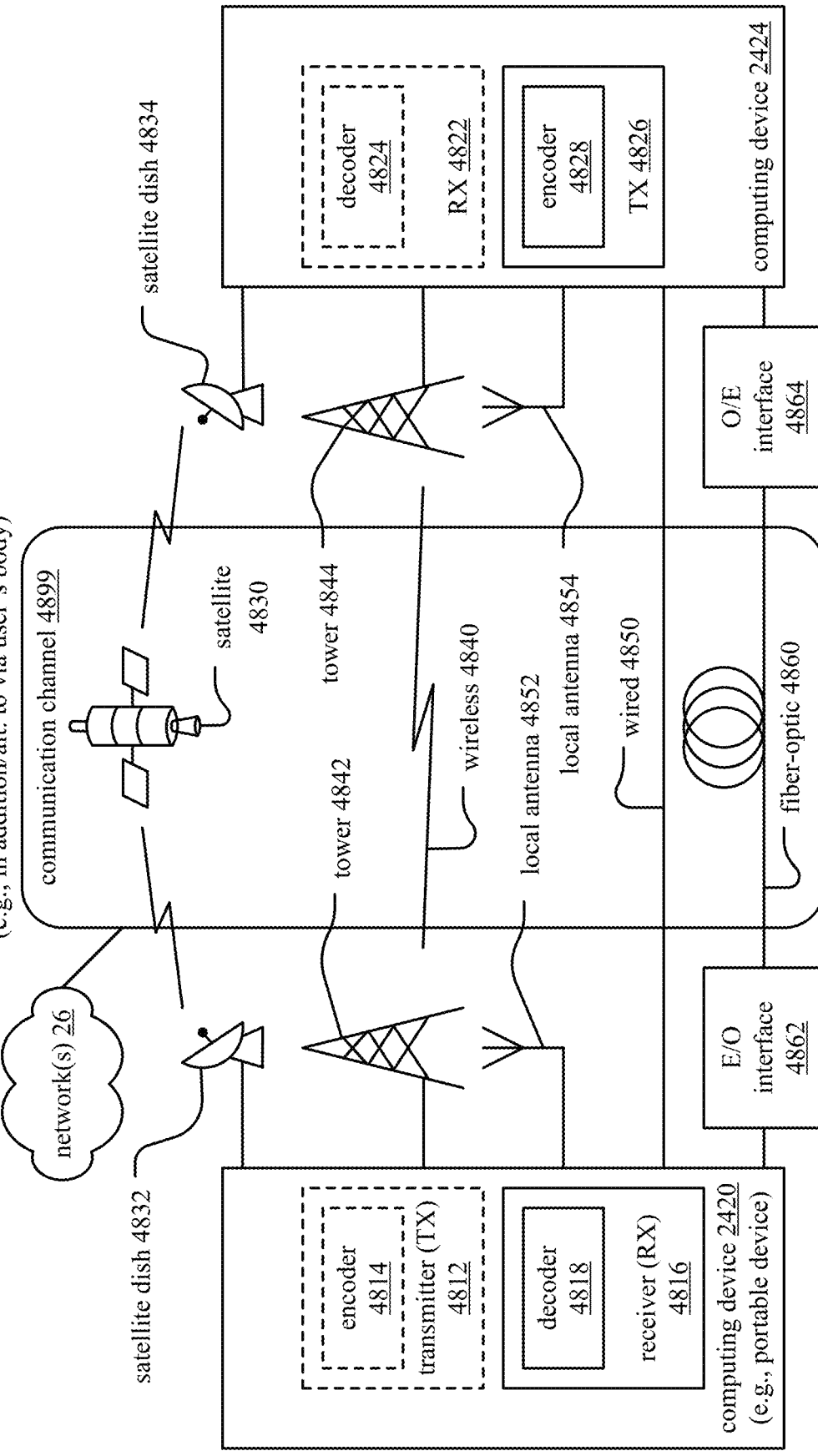
Figure 51:
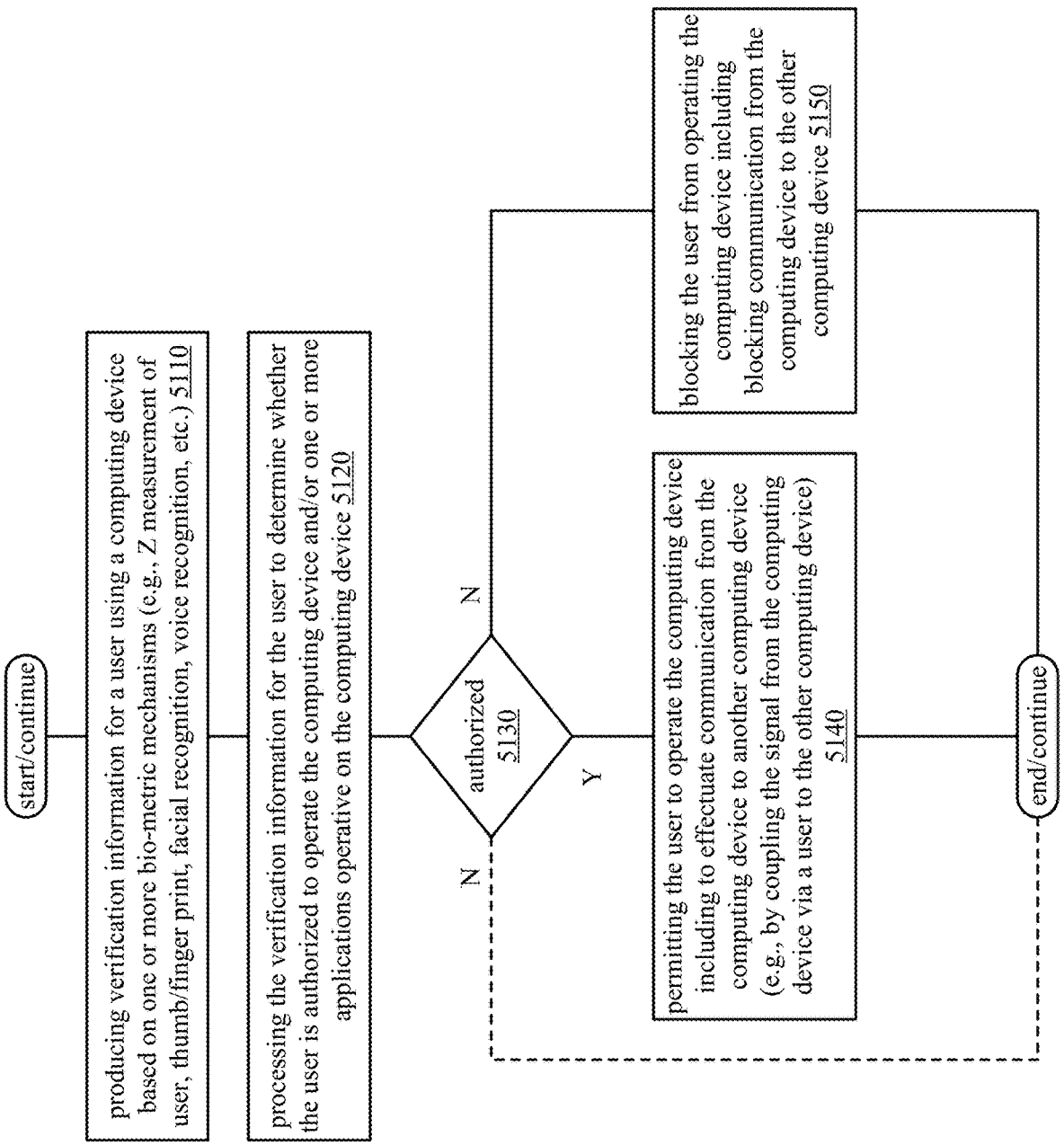

FIG. 31 is a schematic block diagram of an embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention;

FIG. 32 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention;

FIG. 33 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention;

FIG. 34 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention;

FIG. 35 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention;

FIG. 36 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention;

FIG. 37 is a schematic block diagram of an embodiment of active matrix-gate line scanning such as may be performed within a computing device that includes a display in accordance with the present invention;

FIG. 38 is a schematic block diagram of an embodiment of active matrix-data line scanning such as may be performed within a computing device that includes a display in accordance with the present invention;

FIG. 39A is a schematic block diagram of an embodiment of a method for execution by one or more computing devices in accordance with the present invention;

FIG. 39B is a schematic block diagram of another embodiment of a method for execution by one or more computing devices in accordance with the present invention;

FIG. 40 is a schematic block diagram of another embodiment of a method for execution by one or more computing devices in accordance with the present invention;

FIG. 41 is a schematic block diagram of an embodiment of user device and touchscreen communication initialization and handshake as performed within a system operative to facilitate coupling of one or more signals from a first computing device via a user to a second computing device in accordance with the present invention;

FIG. 42 is a schematic block diagram of another embodiment of user device and touchscreen communication initialization and handshake as performed within a system operative to facilitate coupling of one or more signals from a first computing device via a user to a second computing device in accordance with the present invention;

FIG. 43 is a schematic block diagram of another embodiment of a method for execution by one or more computing devices in accordance with the present invention;

FIG. 44 is a schematic block diagram of an embodiment of user device and touchscreen codec negotiation as performed within a system operative to facilitate coupling of one or more signals from a first computing device via a user to a second computing device in accordance with the present invention;

FIG. 45 is a schematic block diagram of an embodiment of user device and touchscreen codec negotiation as performed within a system operative to facilitate coupling of one or more signals from a first computing device via a user to a second computing device in accordance with the present invention;

FIG. 46 is a schematic block diagram of another embodiment of a method for execution by one or more computing devices in accordance with the present invention;

FIG. 47 is a schematic block diagram of an embodiment of touchscreen to user device communication pathways as performed within a system operative to facilitate coupling of one or more signals from a first computing device via a user to a second computing device in accordance with the present invention;

FIG. 48 is a schematic block diagram of another embodiment of touchscreen to user computing device communication pathways as performed within a system operative to facilitate coupling of one or more signals from a first computing device via a user to a second computing device in accordance with the present invention;

FIG. 49A is a schematic block diagram of another embodiment of a method for execution by one or more computing devices in accordance with the present invention;

FIG. 49B is a schematic block diagram of another embodiment of a method for execution by one or more computing devices in accordance with the present invention;

FIG. 50 is a schematic block diagram of embodiments of user device and touchscreen security based on user biometric characterization for use within a system operative to facilitate coupling of one or more signals from a first computing device via a user to a second computing device in accordance with the present invention; and FIG. 51 is a schematic block diagram of another embodiment of a method for execution by one or more computing devices in accordance with the present invention.

DETAILED DESCRIPTION OF THE INVENTION

Figure 1:
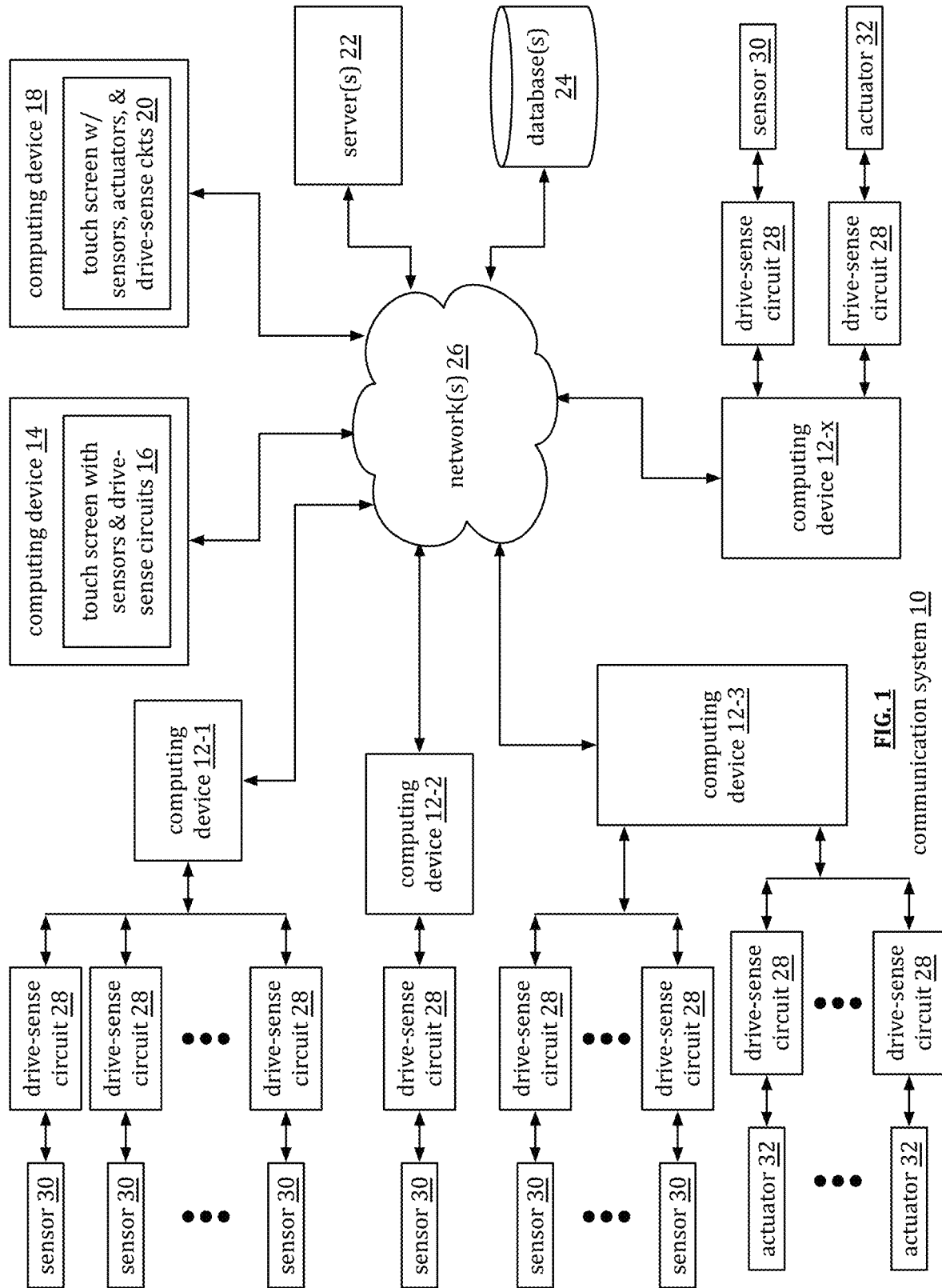
FIG. 1 is a schematic block diagram of an embodiment of a communication system in accordance with the present invention.

FIG. 1 is a schematic block diagram of an embodiment of a communication system 10 that includes a plurality of computing devices 12-10, one or more servers 22, one or more databases 24, one or more networks 26, a plurality of drive-sense circuits 28, a plurality of sensors 30, and a plurality of actuators 32. Computing devices 14 include a touchscreen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

Figure 2:
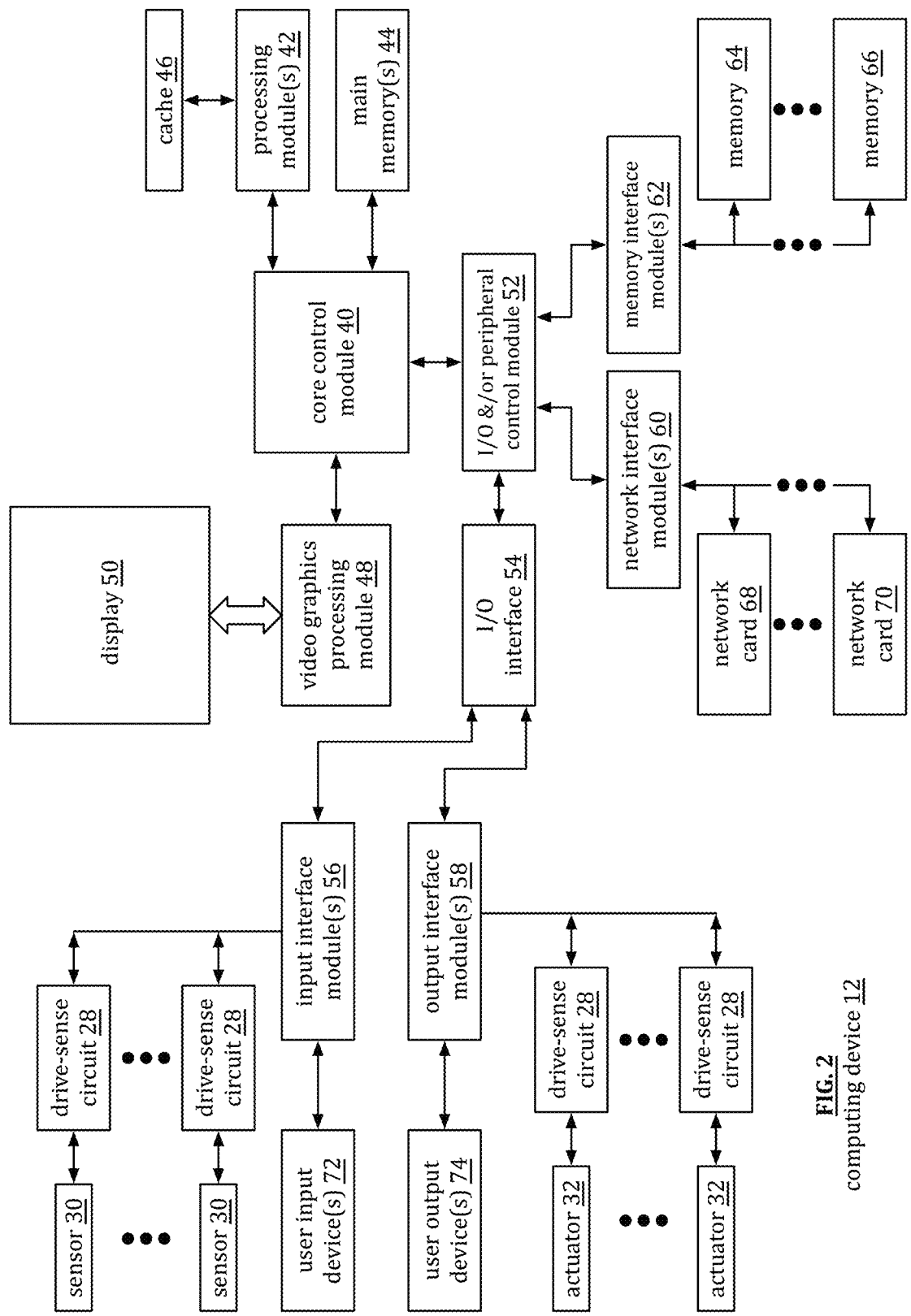
FIG. 2 is a schematic block diagram of an embodiment of a computing device in accordance with the present invention.

FIG. 2 is a schematic block diagram of an embodiment of a computing device 12 (e.g., any one of 12-1 through 12-x). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
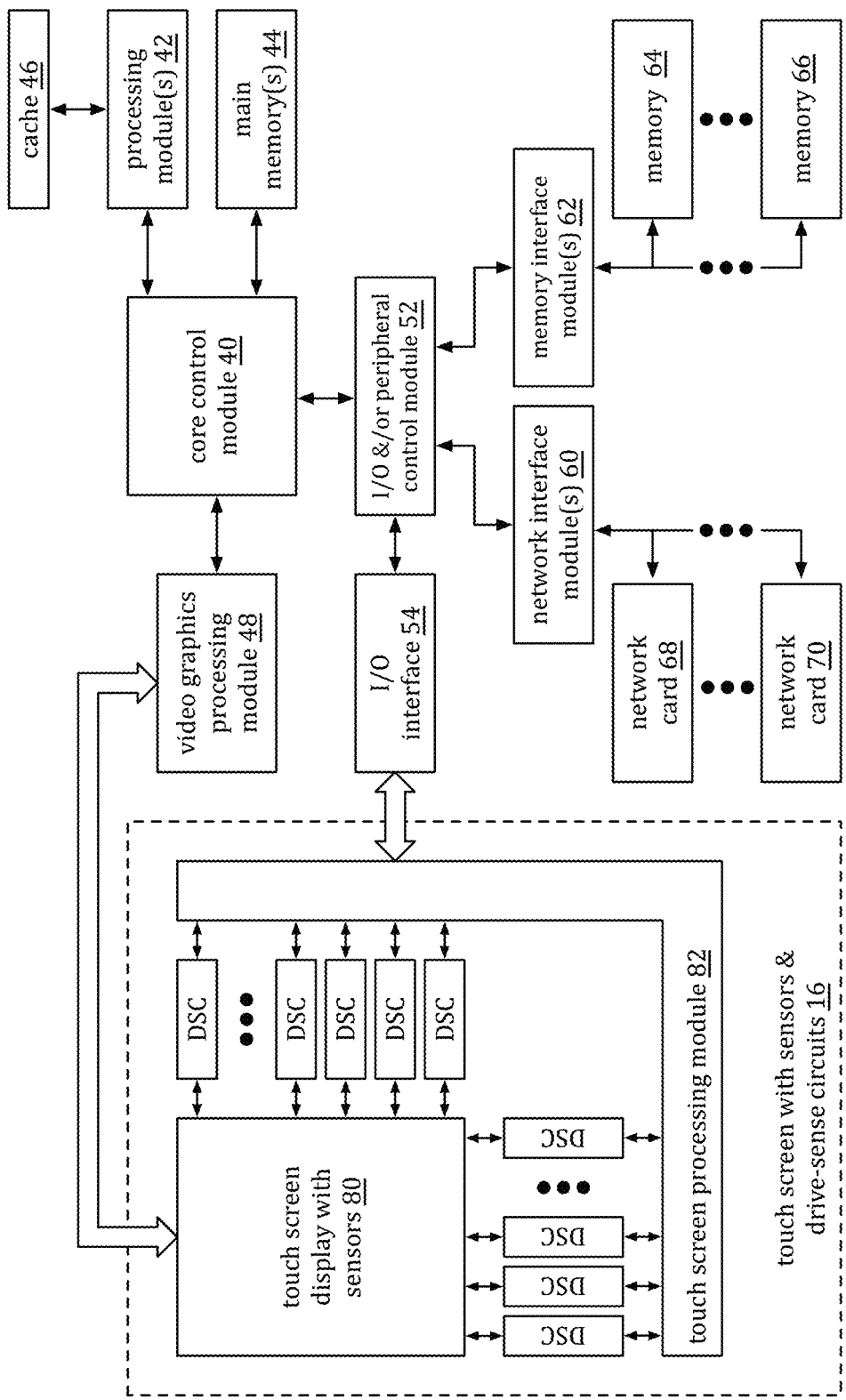
FIG. 3 is a schematic block diagram of another embodiment of a computing device in accordance with the present invention.

FIG. 3 is a schematic block diagram of another embodiment of a computing device 14 that includes a core control module 40, one or more processing modules 42, one or more main memories 44, cache memory 46, a video graphics processing module 48, a touchscreen 16, an Input-Output (I/O) peripheral control module 52, one or more input interface modules 56, one or more output interface modules 58, one or more network interface modules 60, and one or more memory interface modules 62. The touchscreen 16 includes a touchscreen display 80, a plurality of sensors 30, a plurality of drive-sense circuits (DSC), and a touchscreen processing module 82.

Computing device 14 operates similarly to computing device 12 of FIG. 2 with the addition of a touchscreen as an input device. The touchscreen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touchscreen processing module 82, which may be a separate processing module or integrated into the processing module 42.

The touchscreen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
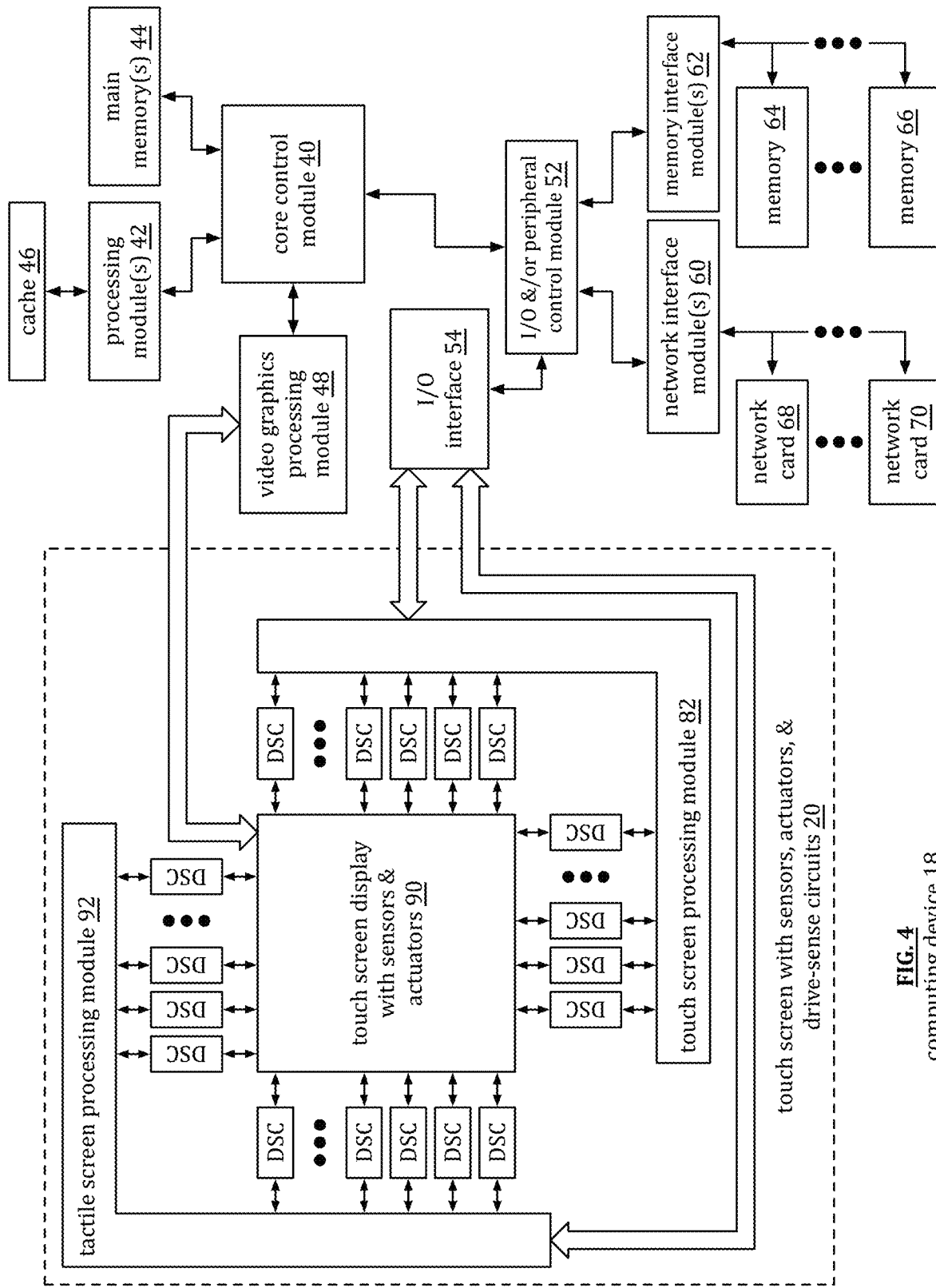
FIG. 4 is a schematic block diagram of another embodiment of a computing device in accordance with the present invention.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touchscreen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one or more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a standalone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

Figure 5B:
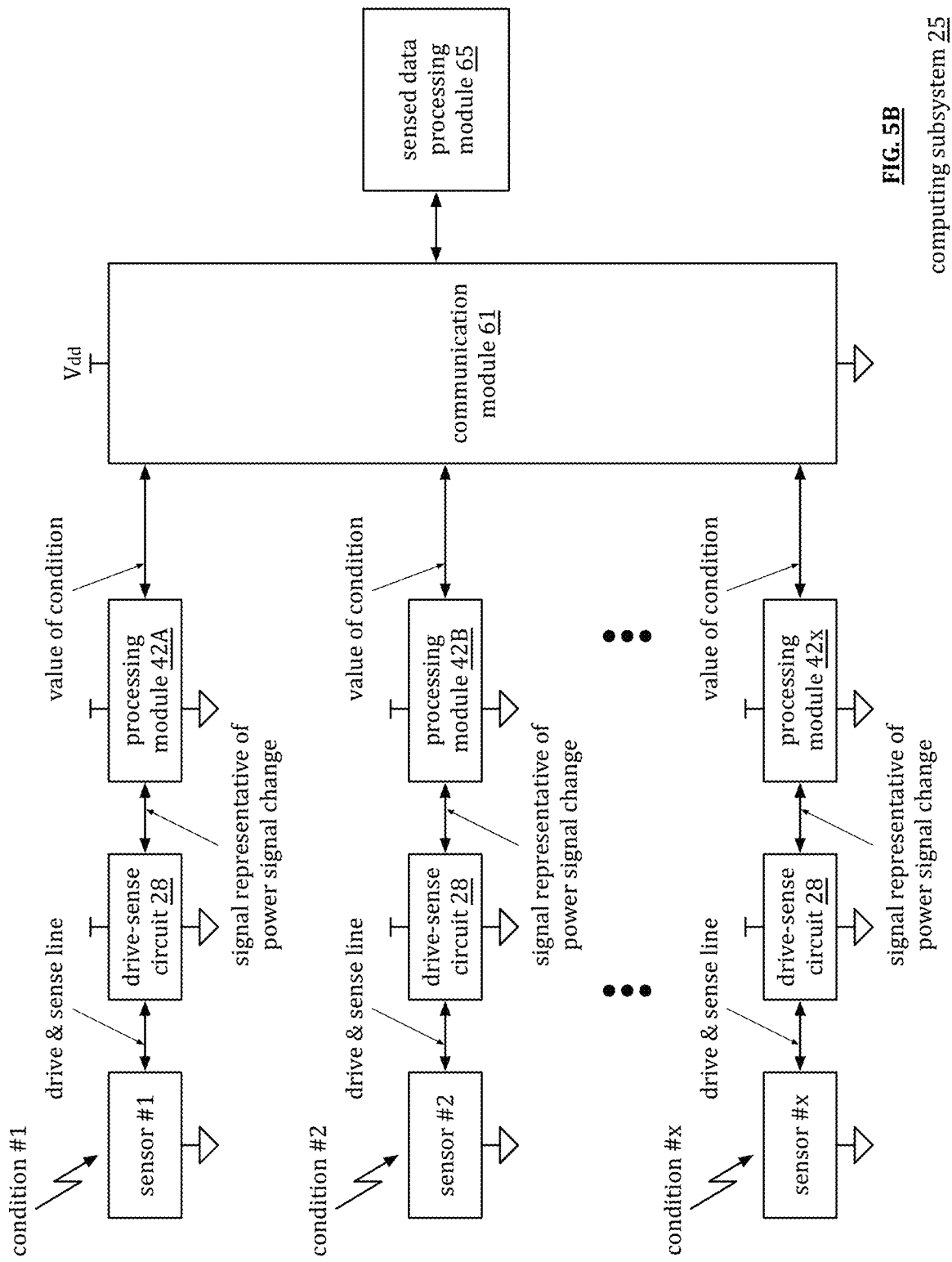
FIG. 5B is a schematic block diagram of another embodiment of a computing subsystem in accordance with the present invention.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

Figure 5D:
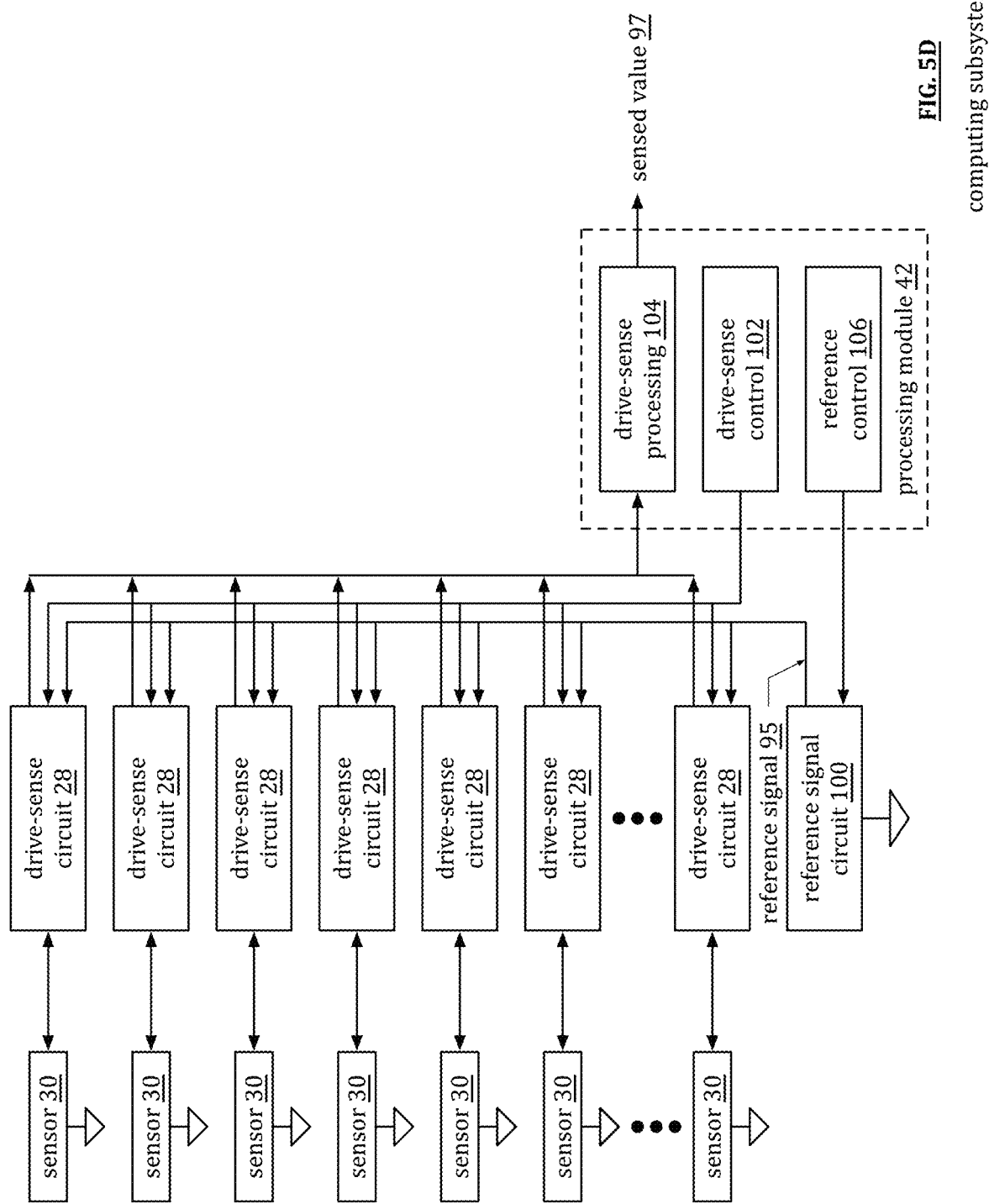
FIG. 5D is a schematic block diagram of another embodiment of a computing subsystem in accordance with the present invention.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
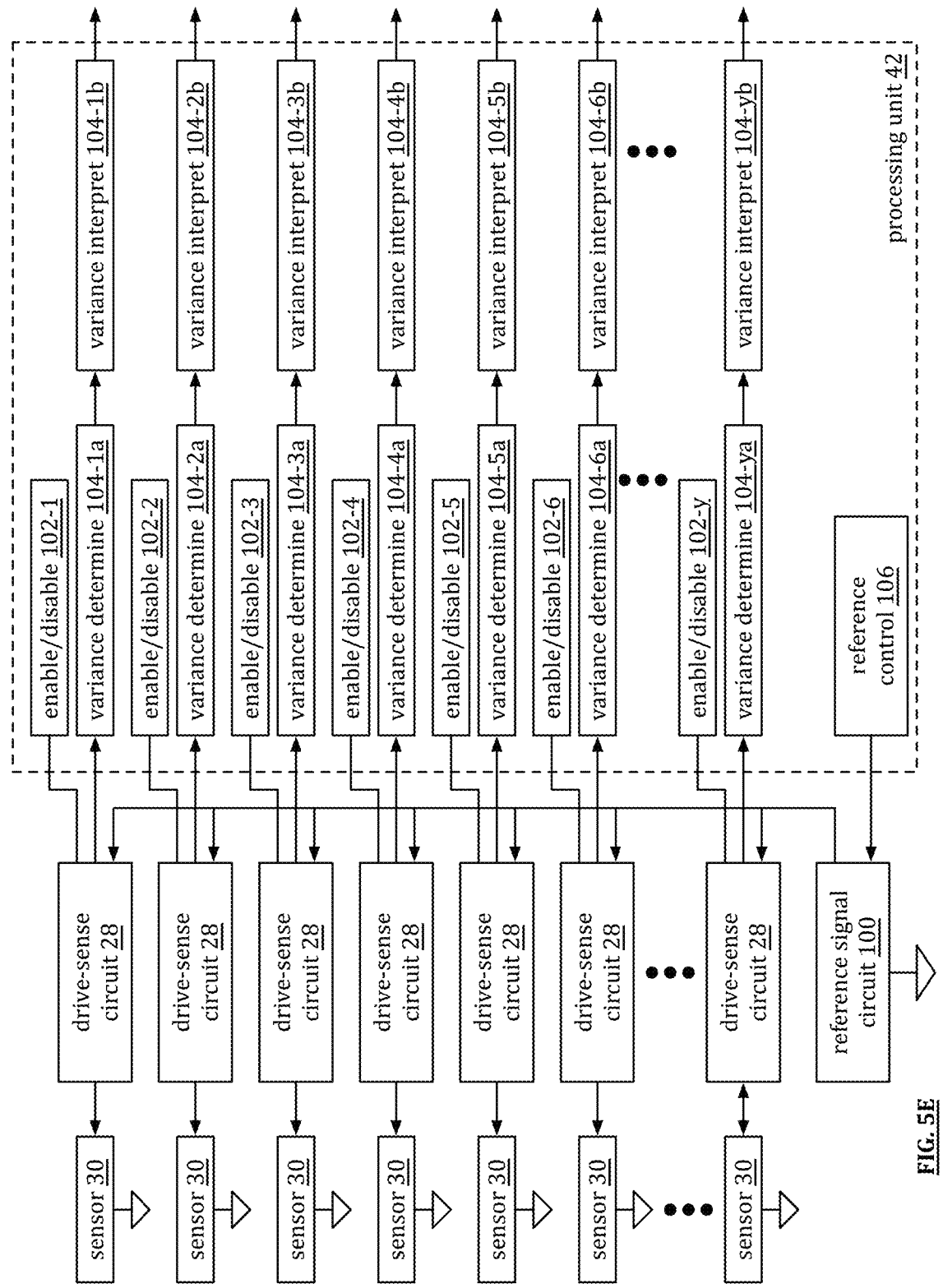
FIG. 5E is a schematic block diagram of another embodiment of a computing subsystem in accordance with the present invention.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through y and variance interpreting modules 104-2a through y. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1b interprets the difference to determine a specific value for the sensed physical condition.

As a specific example, the variance determining module 104-1a receives a digital signal of 1001 0110 (150 in decimal) that is representative of a sensed physical condition (e.g., temperature) sensed by a sensor from the corresponding drive-sense circuit 28. With 8-bits, there are 28 (256) possible signals representing the sensed physical condition. Assume that the units for temperature is Celsius and a digital value of 0100 0000 (64 in decimal) represents the known value for 25 degree Celsius. The variance determining module 104-b1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-b1 then determines the sensed value based on the difference and the known value. In this example, the sensed value equals 25+86*(100/256)= 25+33.6=58.6 degrees Celsius.

Figure 6A:
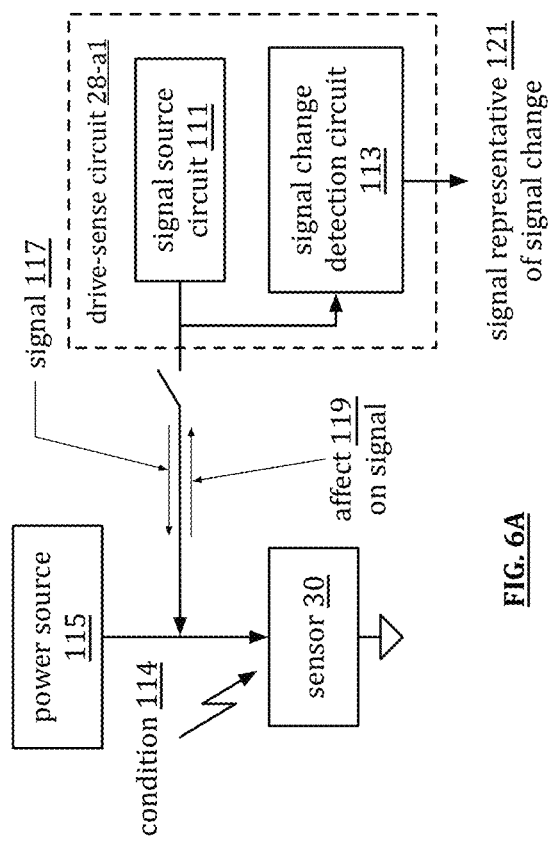
FIG. 6A is a schematic block diagram of another embodiment of a drive sense circuit in accordance with the present invention.
Figure 6:
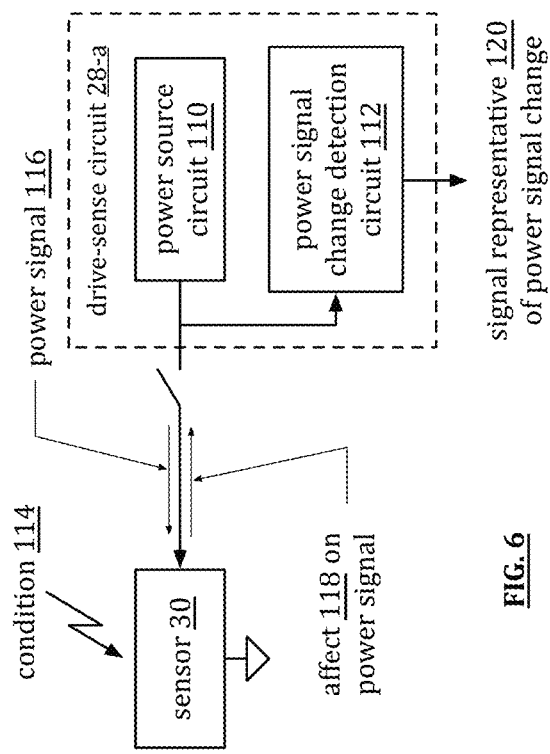
FIG. 6 is a schematic block diagram of a drive center circuit in accordance with the present invention.

FIG. 6 is a schematic block diagram of a drive center circuit 28-a coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

Figure 7:
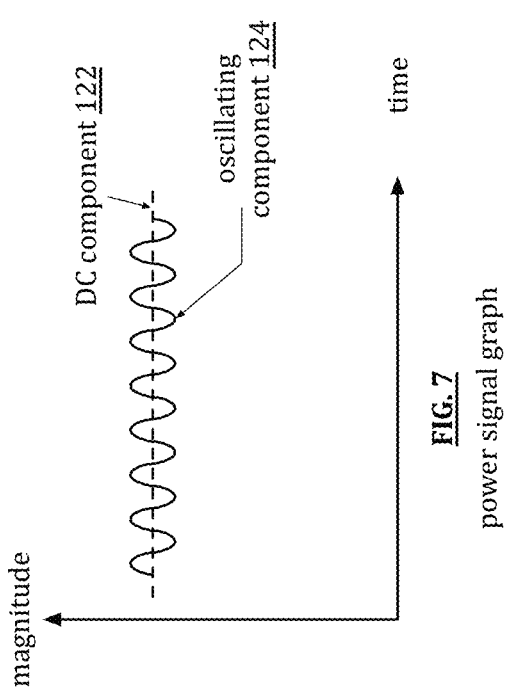
FIG. 7 is an example of a power signal graph in accordance with the present invention.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-*a*1 coupled to a sensor 30. The drive sense-sense circuit 28-*a*1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor.

The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

Figure 8:
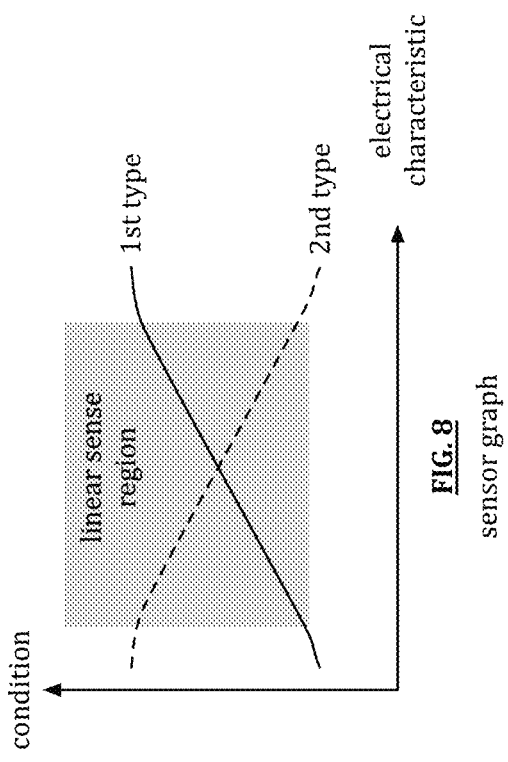
FIG. 8 is an example of a sensor graph in accordance with the present invention.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases. As an example of a second type, a capacitance touch sensor decreases in capacitance as a touch is sensed.

Figure 9:
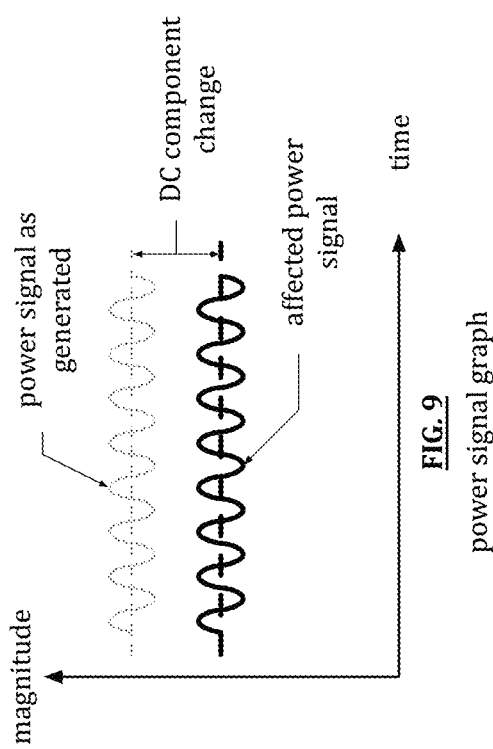
FIG. 9 is a schematic block diagram of another example of a power signal graph in accordance with the present invention.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

Figure 10:
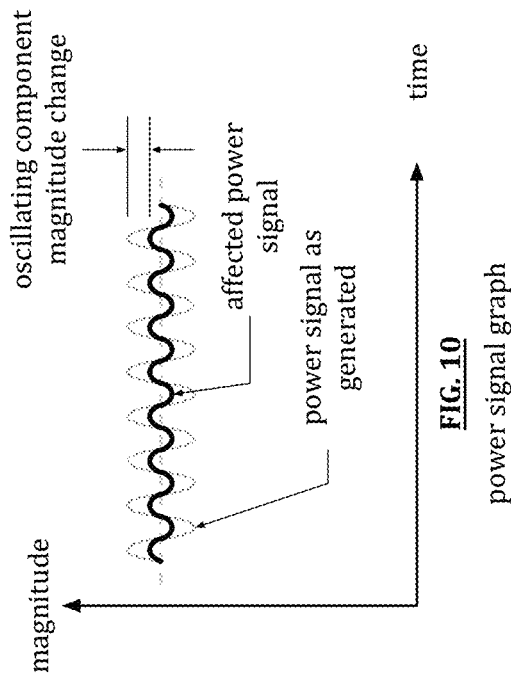
FIG. 10 is a schematic block diagram of another example of a power signal graph in accordance with the present invention.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

Figure 11A:
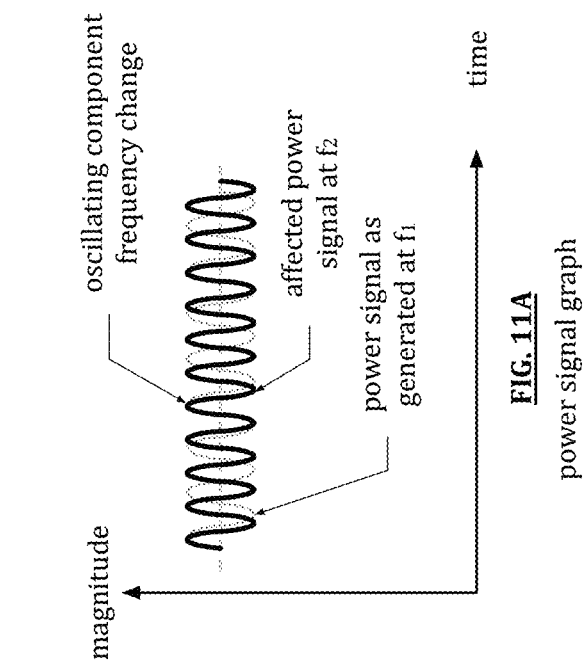
FIG. 11A is a schematic block diagram of another example of a power signal graph in accordance with the present invention.
Figure 11:
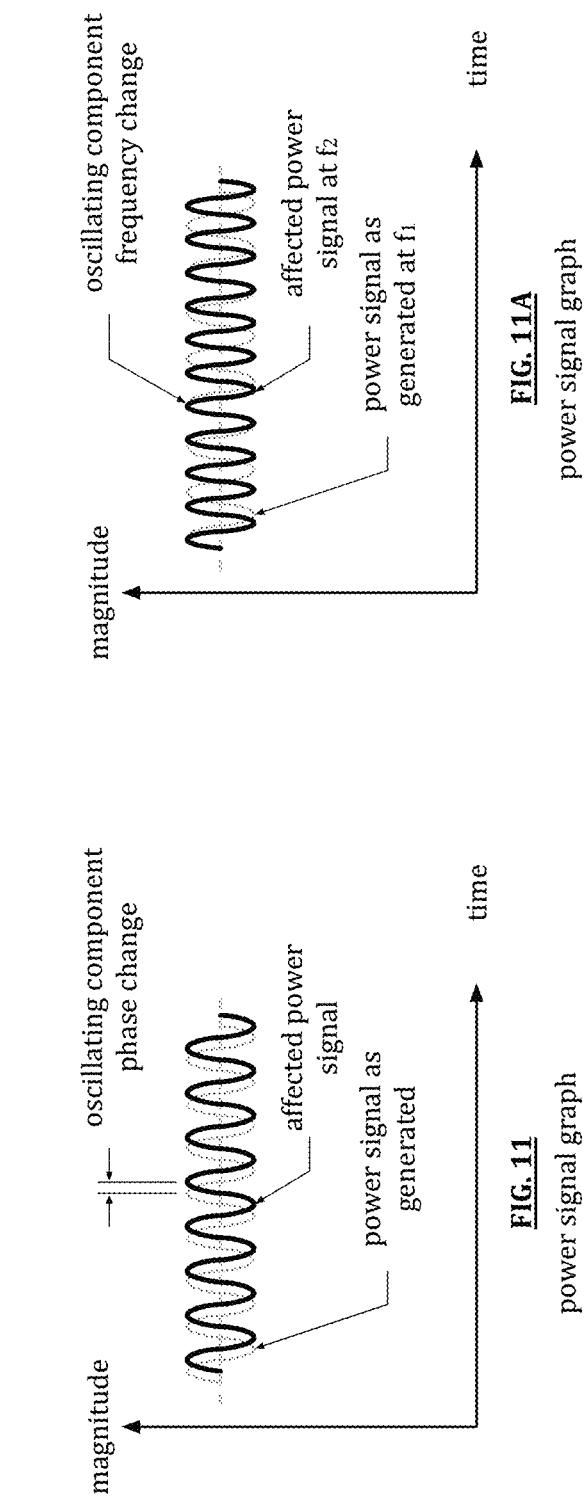
FIG. 11 is a schematic block diagram of another example of a power signal graph in accordance with the present invention.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

Figure 12:
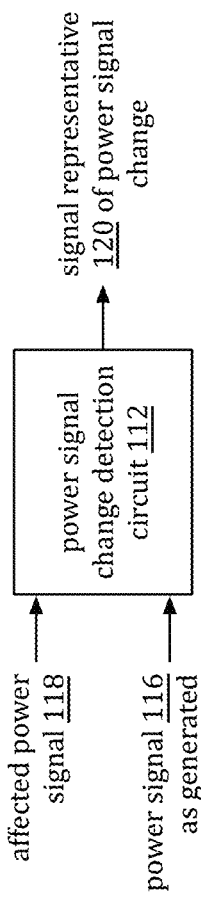
FIG. 12 is a schematic block diagram of an embodiment of a power signal change detection circuit in accordance with the present invention.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

Figure 13:
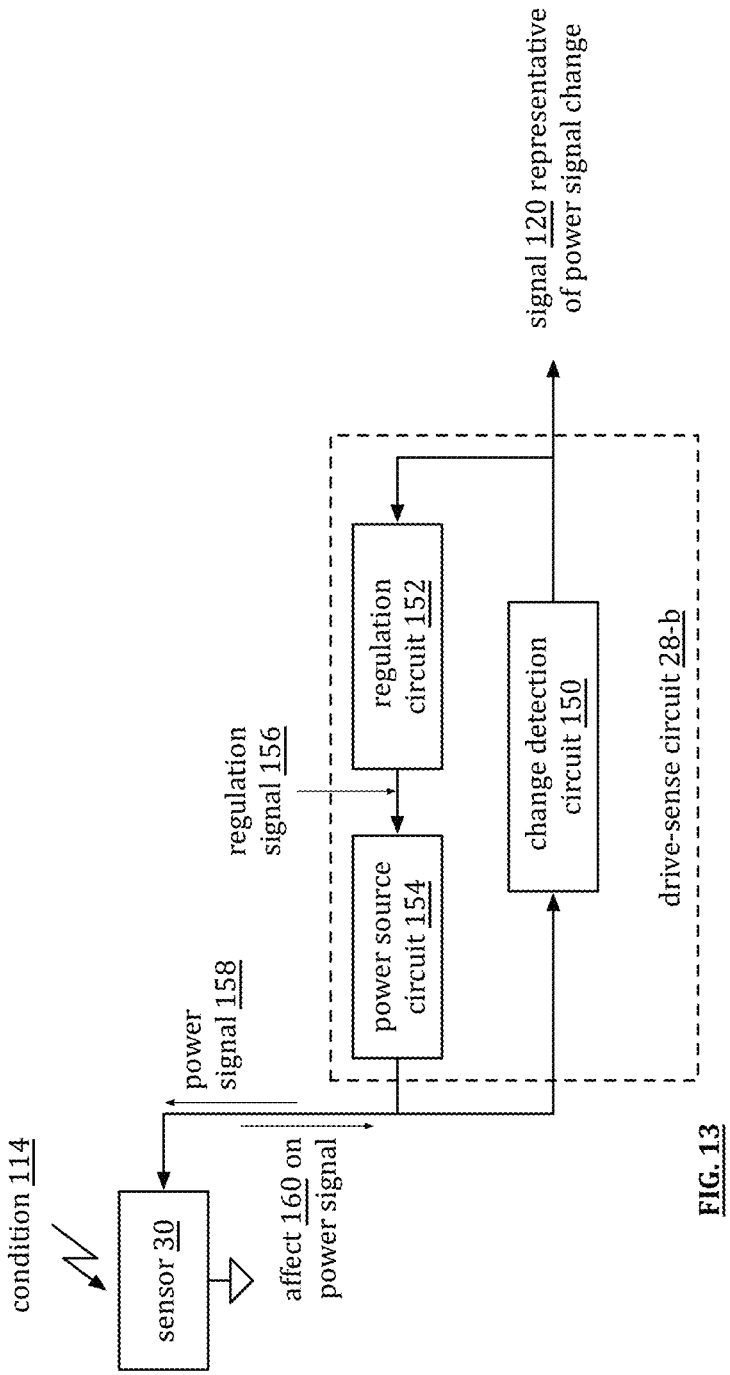
FIG. 13 is a schematic block diagram of another embodiment of a drive-sense circuit in accordance with the present invention.

FIG. 13 is a schematic block diagram of another embodiment of a drive sense circuit 28-b includes a change detection circuit 150, a regulation circuit 152, and a power source circuit 154. The drive-sense circuit 28-b is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits (DSCs) are described in U.S. Utility patent application Ser. No. 16/113,379, entitled "DRIVE SENSE CIRCUIT WITH DRIVE-SENSE LINE," filed Aug. 27, 2018, now U.S. Pat. No. 11,099,032 issued on Aug. 24, 2021. Any instantiation of a drive-sense circuit as described herein may also be implemented using any of the various implementations of various drive-sense circuits (DSCs) described in U.S. Utility patent application Ser. No. 16/113,379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a computing device is configured to perform forward error correction (FEC) and/or error checking and correction (ECC) code of one or more bits to generate one or more coded bits. Examples of FEC and/or ECC may include turbo code, convolutional code, trellis coded modulation (TCM), trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient computing devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC, note that any additional signal that is coupled into a line, an electrode, a touch sensor, a bus, a communication link, a battery, a load, an electrical coupling or connection, etc. associated with that DSC is also detectable. For example, a DSC that is associated with such a line, an electrode, a touch sensor, a bus, a communication link, a battery, a load, an electrical coupling or connection, etc. is configured to detect any signal from one or more other lines, electrodes, touch sensors, buses, communication links, loads, electrical couplings or connections, etc. that get coupled into that line, electrode, touch sensor, bus, communication link, a battery, load, electrical coupling or connection, etc.

Note that the different respective signals that are driven and simultaneously sensed by one or more DSCs may be are differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

Moreover, with respect to any embodiment, diagram, example, etc. that includes more than one DSC, note that the DSCs may be implemented in a variety of manners. For example, all of the DSCs may be of the same type, implementation, configuration, etc. In another example, the first DSC may be of a first type, implementation, configuration, etc., and a second DSC may be of a second type, implementation, configuration, etc. that is different than the first DSC. Considering a specific example, a first DSC may be implemented to detect change of impedance associated with a line, an electrode, a touch sensor, a bus, a communication link, an electrical coupling or connection, etc. associated with that first DSC, while a second DSC may be implemented to detect change of voltage associated with a line, an electrode, a touch sensor, a bus, a communication link, an electrical coupling or connection, etc. associated with that second DSC. In addition, note that a third DSC may be implemented to detect change of a current associated with a line, an electrode, a touch sensor, a bus, a communication link, an electrical coupling or connection, etc. associated with that DSC. In general, while a common reference may be used generally to show a DSC or multiple instantiations of a DSC within a given embodiment, diagram, example, etc., note that any particular DSC may be implemented in accordance with any manner as described herein, such as described in U.S. Utility patent application Ser. No. 16/113,379, etc. and/or their equivalents.

Note that certain of the following diagrams show a computing device (e.g., alternatively referred to as device; the terms computing device and device may be used interchangeably) one or more processing modules. In certain instances, the one or more processing modules is configured to communicate with and interact with one or more other devices including one or more of DSCs, one or more components associated with a DSC, one or more components associated with a display, a touchscreen display with sensors, etc., one or more other components associated with display, a touchscreen display with sensors, etc. Note that any such implementation of one or more processing modules may include integrated memory and/or be coupled to other memory. At least some of the memory stores operational instructions to be executed by the one or more processing modules. In addition, note that the one or more processing modules may interface with one or more other computing devices, components, elements, etc. via one or more communication links, networks, communication pathways, channels, etc. (e.g., such as via one or more communication interfaces of the computing device, such as may be integrated into the one or more processing modules or be implemented as a separate component, circuitry, etc.).

In addition, when a DSC is implemented to communicate with and interact with another element, the DSC is configured simultaneously to transmit and receive one or more signals with the element. For example, a DSC is configured simultaneously to sense and to drive one or more signals to the one element. During transmission of a signal from a DSC, that same DSC is configured simultaneously to sense the signal being transmitted from the DSC and any other signal may be coupled into the signal that is being transmitted from the DSC.

Figure 14:
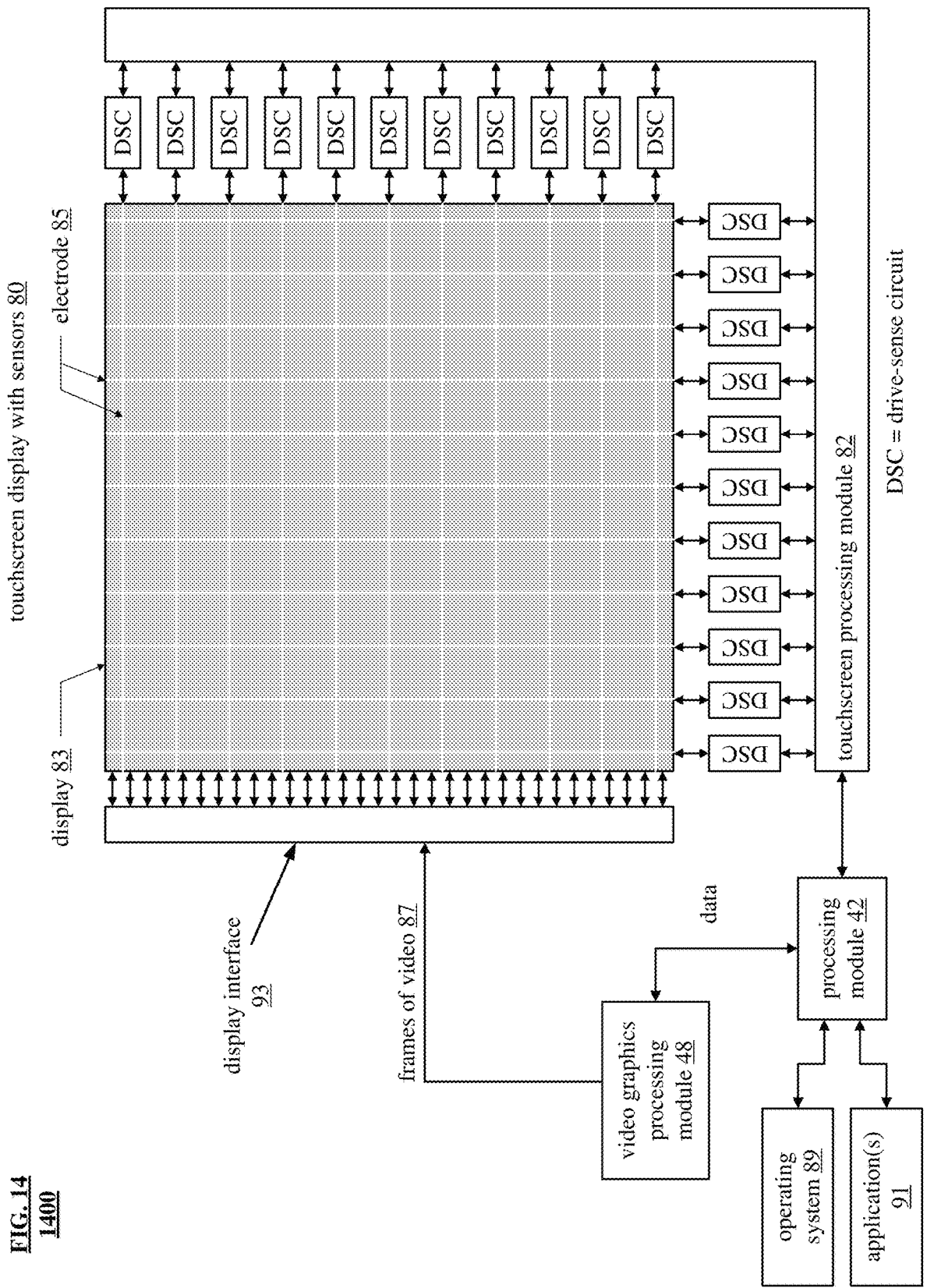
FIG. 14 is a schematic block diagram of an embodiment of a touchscreen display in accordance with the present invention.

FIG. 14 is a schematic block diagram of an embodiment 1400 of a touchscreen display in accordance with the present invention. this diagram includes a schematic block diagram of an embodiment of a touchscreen display 80 that includes a plurality of drive-sense circuits (DSCs), a touchscreen processing module 82, a display 83, and a plurality of electrodes 85 (e.g., the electrodes operate as the sensors or sensor components into which touch and/or proximity may be detected in the touchscreen display 80). The touchscreen display 80 is coupled to a processing module 42, a video graphics processing module 48, and a display interface 93, which are components of a computing device (e.g., one or more of computing devices 14-18), an interactive display, or other device that includes a touchscreen display. An interactive display functions to provide users with an interactive experience (e.g., touch the screen to obtain information, be entertained, etc.). For example, a store provides interactive displays for customers to find certain products, to obtain coupons, to enter contests, etc.

In some examples, note that display functionality and touchscreen functionality are both provided by a combined device that may be referred to as a touchscreen display with sensors 80. However, in other examples, note that touchscreen functionality and display functionality are provided by separate devices, namely, the display 83 and a touchscreen that is implemented separately from the display 83. Generally speaking, different implementations may include display functionality and touchscreen functionality within a combined device such as a touchscreen display with sensors 80, or separately using a display 83 and a touchscreen.

There are a variety of other devices that may be implemented to include a touchscreen display. For example, a vending machine includes a touchscreen display to select and/or pay for an item. Another example of a device having a touchscreen display is an Automated Teller Machine (ATM). As yet another example, an automobile includes a touchscreen display for entertainment media control, navigation, climate control, etc.

The touchscreen display 80 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list. Other screen sizes, resolutions, aspect ratios, etc. may be implemented within other various displays.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or > 80 |
| Full HD | 1920 | 1080 | 1:1 | 16:9 | 32, 40, 43, 50, 55, 60, 65, 70, 75, &/or > 80 |
| HD | 960 | 720 | 4:3 | 16:9 | 32, 40, 43, 50, 55, 60, 65, 70, 75, &/or > 80 |
| HD | 1440 | 1080 | 4:3 | 16:9 | 32, 40, 43, 50, 55, 60, 65, 70, 75, &/or > 80 |
| HD | 1280 | 1080 | 3:2 | 16:9 | 32, 40, 43, 50, 55, 60, 65, 70, 75, &/or > 80 |
| QHD (quad HD) | 2560 | 1440 | 1:1 | 16:9 | 32, 40, 43, 50, 55, 60, 65, 70, 75, &/or > 80 |
| UHD (Ultra HD) or 4K | 3840 | 2160 | 1:1 | 16:9 | 32, 40, 43, 50, 55, 60, 65, 70, 75, &/or > 80 |
| 8K | 7680 | 4320 | 1:1 | 16:9 | 32, 40, 43, 50, 55, 60, 65, 70, 75, &/or > 80 |
| HD and above | 1280 ->= 7680 | 720 ->= 4320 | 1:1, 2:3, etc. | 2:3 | 50, 55, 60, 65, 70, 75, &/or > 80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touchscreen display. The electrodes 85 are distributed throughout the display area or where touchscreen functionality is desired. For example, a first group of the electrodes are arranged in rows and a second group of electrodes are arranged in columns. As will be discussed in greater detail with reference to one or more of FIGS. 18, 19, 20, and 21, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touchscreen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

In certain examples, one or more images are displayed so as to facilitate communication of data from a first computing device to a second computing device via a user. For example, one or more images are displayed on the touchscreen display with sensors 80, and when a user is in contact with the one or more images that are displayed on the touchscreen display with sensors 80, one or more signals that are associated with the one or more images are coupled via the user to another computing device. In some examples, the touchscreen display with sensors 80 is implemented within a portable device, such as a cell phone, a smart phone, a tablet, and/or any other such device that includes a touching display with sensors 80. Also, in some examples, note that the computing device that is displaying one or more images that are coupled via the user to another computing device does not include a touchscreen display with sensors 80, but merely a display that is implemented to display one or more images. In accordance with operation of the display, whether implemented as it display alone for a touchscreen display with sensors, as the one or more images are displayed, and when the user is in contact with the display (e.g., such as touching the one or more images with a digit of a hand, such as found, fingers, etc.) or is was within sufficient proximity to facilitate coupling of one or more signals that are associated with a lot of images, then the signals are coupled via the user to another computing device.

When the display 83 is implemented as a touchscreen display with sensors 80, while the display 83 is rendering the frames of video into visible images, the drive-sense circuits (DSC) provide sensor signals to the electrodes 85. When the touchscreen (e.g., which may alternatively be referred to as screen) is touched, capacitance of the electrodes 85 proximal to the touch (i.e., directly or close by) is changed. The DSCs detect the capacitance change for affected electrodes and provide the detected change to the touchscreen processing module 82.

The touchscreen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 15:
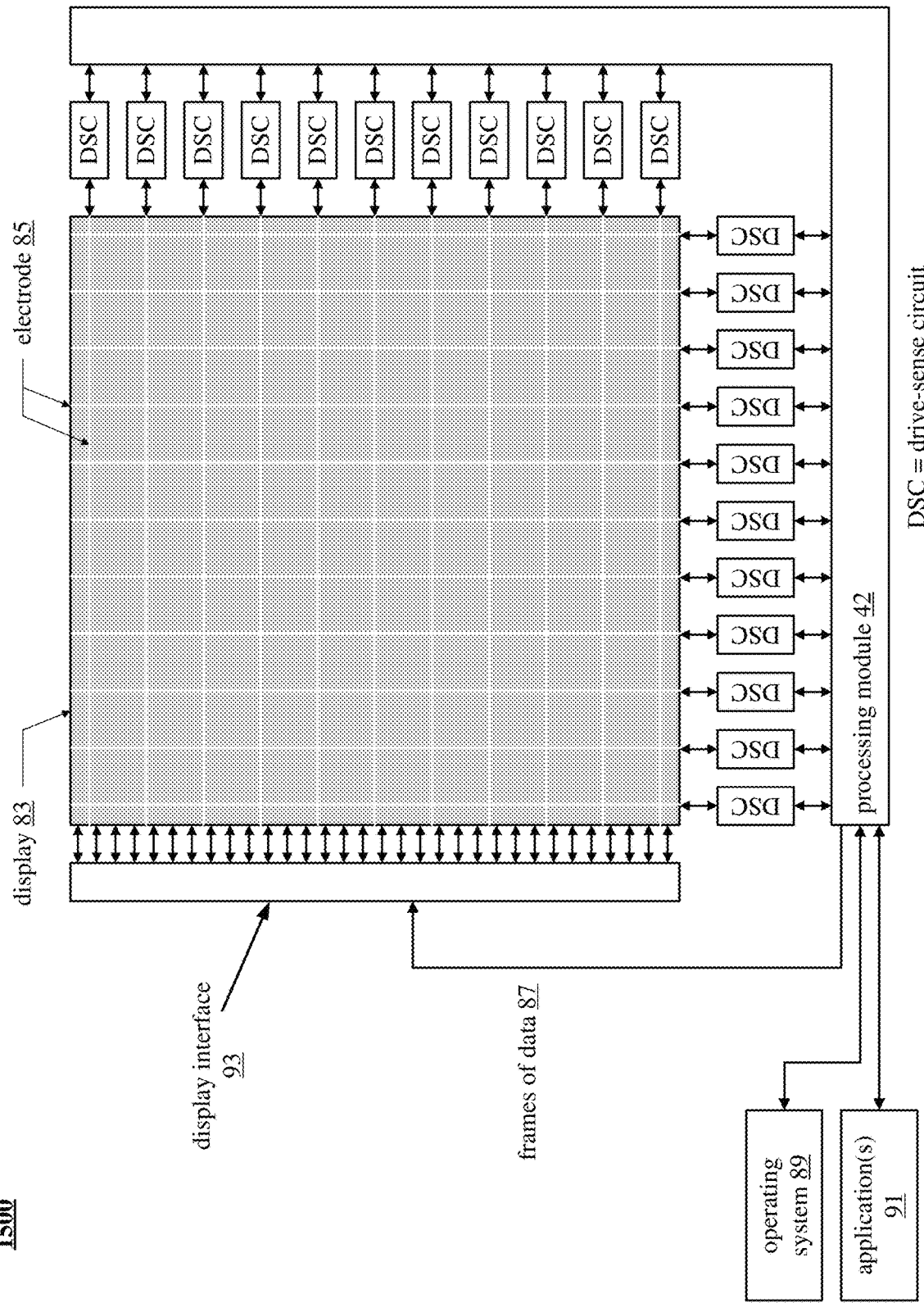
FIG. 15 is a schematic block diagram of another embodiment of a touchscreen display in accordance with the present invention.

FIG. 15 is a schematic block diagram of another embodiment 1500 of a touchscreen display in accordance with the present invention. This diagram includes a schematic block diagram of another embodiment of a touchscreen display 80 that includes a plurality of drive-sense circuits (DSC), the processing module 42, a display 83, and a plurality of electrodes 85. The processing module 42 is executing an operating system 89 and one or more user applications 91 to produce frames of data 87. The processing module 42 provides the frames of data 87 to the display interface 93. The touchscreen display 80 operates similarly to the touchscreen display 80 of FIG. 14 with the above noted differences.

Figure 16A:
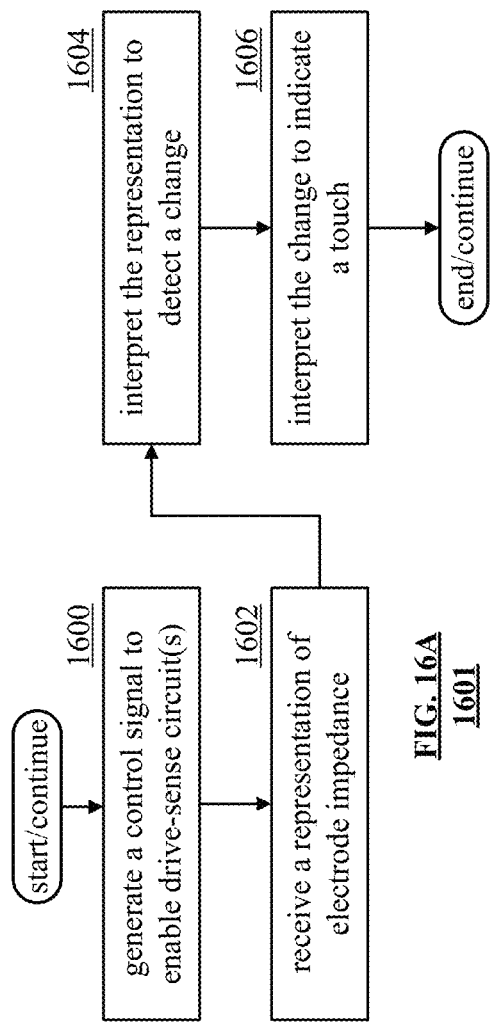
FIG. 16A is a logic diagram of an embodiment of a method for sensing a touch on a touchscreen display in accordance with the present invention.

FIG. 16A is a logic diagram of an embodiment of a method 1601 for sensing a touch on a touchscreen display in accordance with the present invention. This diagram includes a logic diagram of an embodiment of a method 1601 for execution by one or more computing devices for sensing a touch on a touchscreen display that is executed by one or more processing modules of one or various types (e.g., 42, 82, and/or 48 of the previous figures). The method 1601 begins at step 1600 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method 1601 continues at step 1602 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method 1601 continues at step 1604 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode of a user or other element. As another example, a decrease in mutual capacitance (e.g., the capacitance between a row electrode and a column electrode) is also indicative of a touch and/or presence of a user or other element near the electrodes. The processing module does this for each representation of the impedance of the electrode it receives. Note that the representation of the impedance is a digital value, an analog signal, an impedance value, and/or any other analog or digital way of representing a sensor's impedance.

The method 1601 continues at step 1606 where the processing module interprets the change in the impedance to indicate a touch and/or presence of a user or other element of the touchscreen display in an area corresponding to the electrode. For each change in impedance detected, the processing module indicates a touch and/or presence of a user or other element. Further processing may be done to determine if the touch is a desired touch or an undesired touch.

Figure 16B:
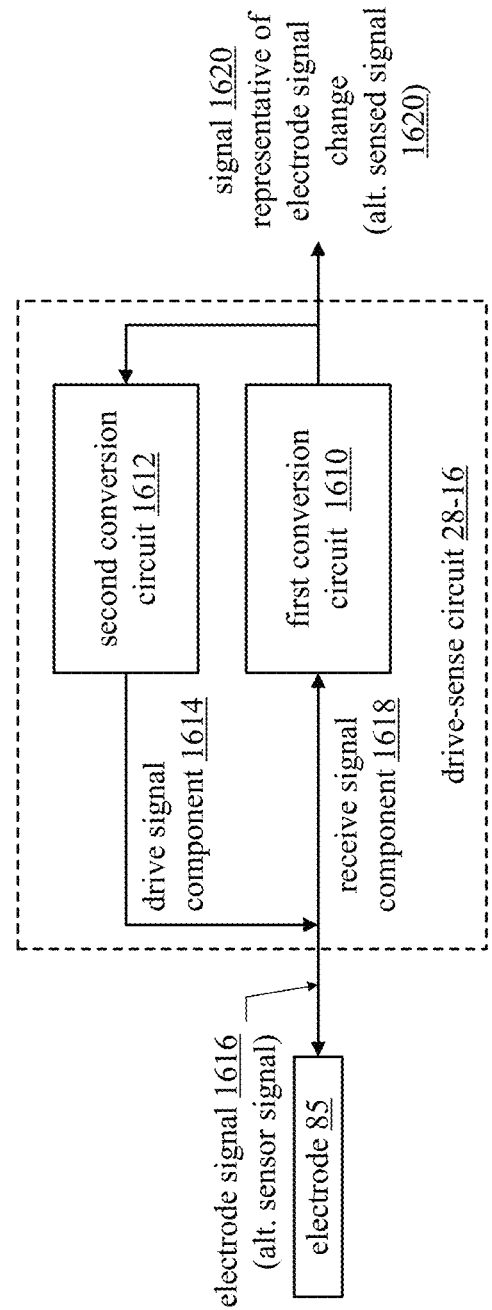
FIG. 16B is a schematic block diagram of an embodiment of a drive sense circuit in accordance with the present invention.

FIG. 16B is a schematic block diagram of an embodiment 1602 of a drive sense circuit in accordance with the present invention. This diagram includes a schematic block diagram of an embodiment of a drive sense circuit 28-16 that includes a first conversion circuit 1610 and a second conversion circuit 1612. The first conversion circuit 1610 converts an electrode signal 1616 (alternatively a sensor signal, such as when the electrode 85 includes a sensor, etc.) into a signal 1620 that is representative of the electrode signal and/or change thereof (e.g., note that such a signal may alternatively be referred to as a sensor signal, a signal representative of a sensor signal and or change thereof, etc. such as when the electrode 85 includes a sensor, etc.). The second conversion circuit 1612 generates the drive signal component 1614 from the sensed signal 1612. As an example, the first conversion circuit 1610 functions to keep the electrode signal 1616 substantially constant (e.g., substantially matching a reference signal) by creating the signal 1620 to correspond to changes in a receive signal component 1618 of the sensor signal. The second conversion circuit 1612 functions to generate a drive signal component 1614 of the sensor signal based on the signal 1620 substantially to compensate for changes in the receive signal component 1618 such that the electrode signal 1616 remains substantially constant.

In an example, the electrode signal 1616 (e.g., which may be viewed as a power signal, a drive signal, a sensor signal, etc. such as in accordance with other examples, embodiments, diagrams, etc. herein) is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 1610 adjusts the signal 1620 based on the receive signal component 1618, which is indicative of the impedance of the electrode and change thereof. The second conversion circuit 1612 adjusts the regulated current based on the changes to the signal 1620.

As another example, the electrode signal 1616 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 1610 adjusts the signal 1620 based on the receive signal component 1618, which is indicative of the impedance of the electrode and change thereof. The second conversion circuit 1612 adjusts the regulated voltage based on the changes to the signal 1620.

Figure 17:
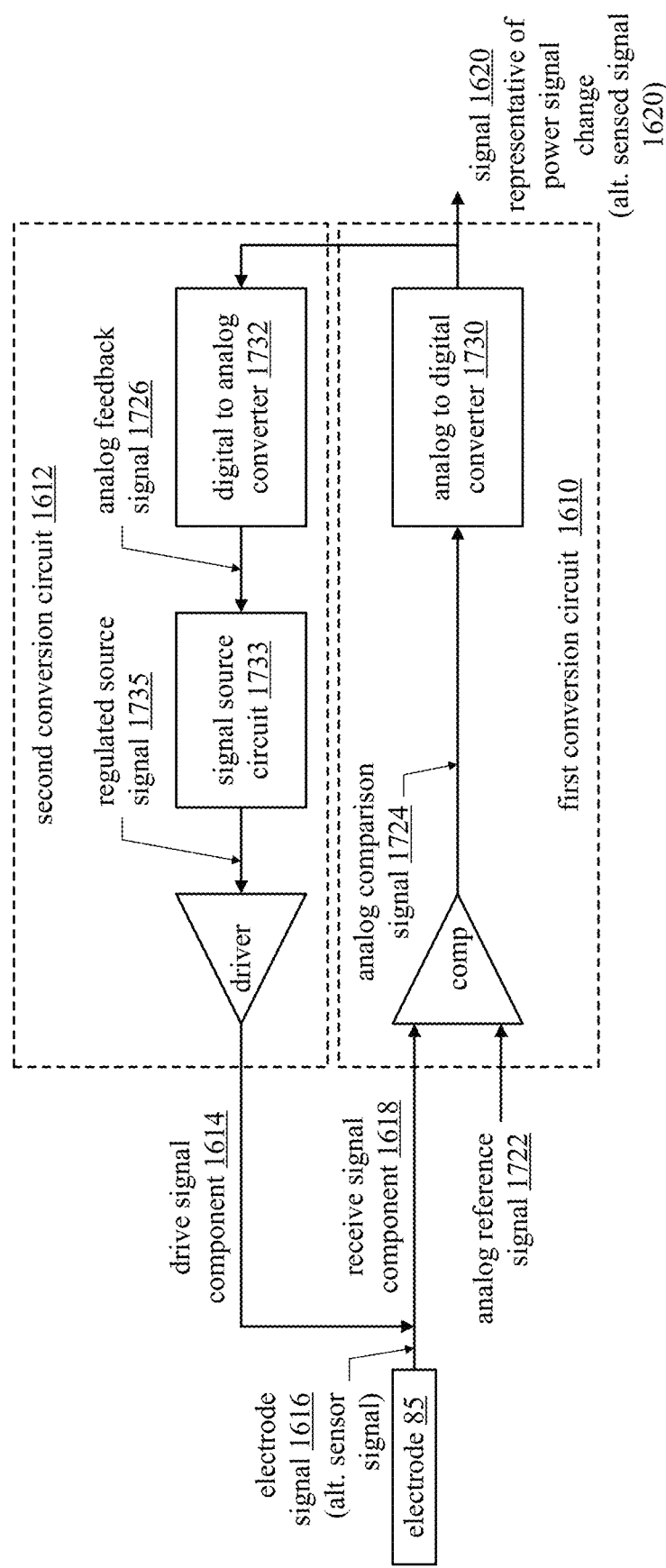
FIG. 17 is a schematic block diagram of another embodiment of a drive sense circuit in accordance with the present invention.

FIG. 17 is a schematic block diagram of another embodiment 1700 of a drive sense circuit in accordance with the present invention. this diagram includes a schematic block diagram of another embodiment of a drive sense circuit 28 that includes a first conversion circuit 1610 and a second conversion circuit 1612. The first conversion circuit 1610 includes a comparator (comp) and an analog to digital converter 1730. The second conversion circuit 1612 includes a digital to analog converter 1732, a signal source circuit 1733, and a driver.

In an example of operation, the comparator compares the electrode signal 116 (alternatively, a sensor signal, etc.) to an analog reference signal 1722 to produce an analog comparison signal 1724. The analog reference signal 1724 includes a DC component and/or an oscillating component. As such, the electrode signal 1716 will have a substantially matching DC component and/or oscillating component. An example of an analog reference signal 1722 is also described in greater detail with reference to FIG. 7 such as with respect to a power signal graph.

The analog to digital converter 1730 converts the analog comparison signal 1724 into the signal 1620. The analog to digital converter (ADC) 1730 may be implemented in a variety of ways. For example, the (ADC) 1730 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 1732 may be a sigma-delta DAC, a pulse width modulator DAC, a binary weighted DAC, a successive approximation DAC, and/or a thermometer-coded DAC.

The digital to analog converter (DAC) 1732 converts the signal 1620 into an analog feedback signal 1726. The signal source circuit 1733 (e.g., a dependent current source, a linear regulator, a DC-DC power supply, etc.) generates a regulated source signal 1735 (e.g., a regulated current signal or a regulated voltage signal) based on the analog feedback signal 1726. The driver increases power of the regulated source signal 1735 to produce the drive signal component 1614.

Figure 18:
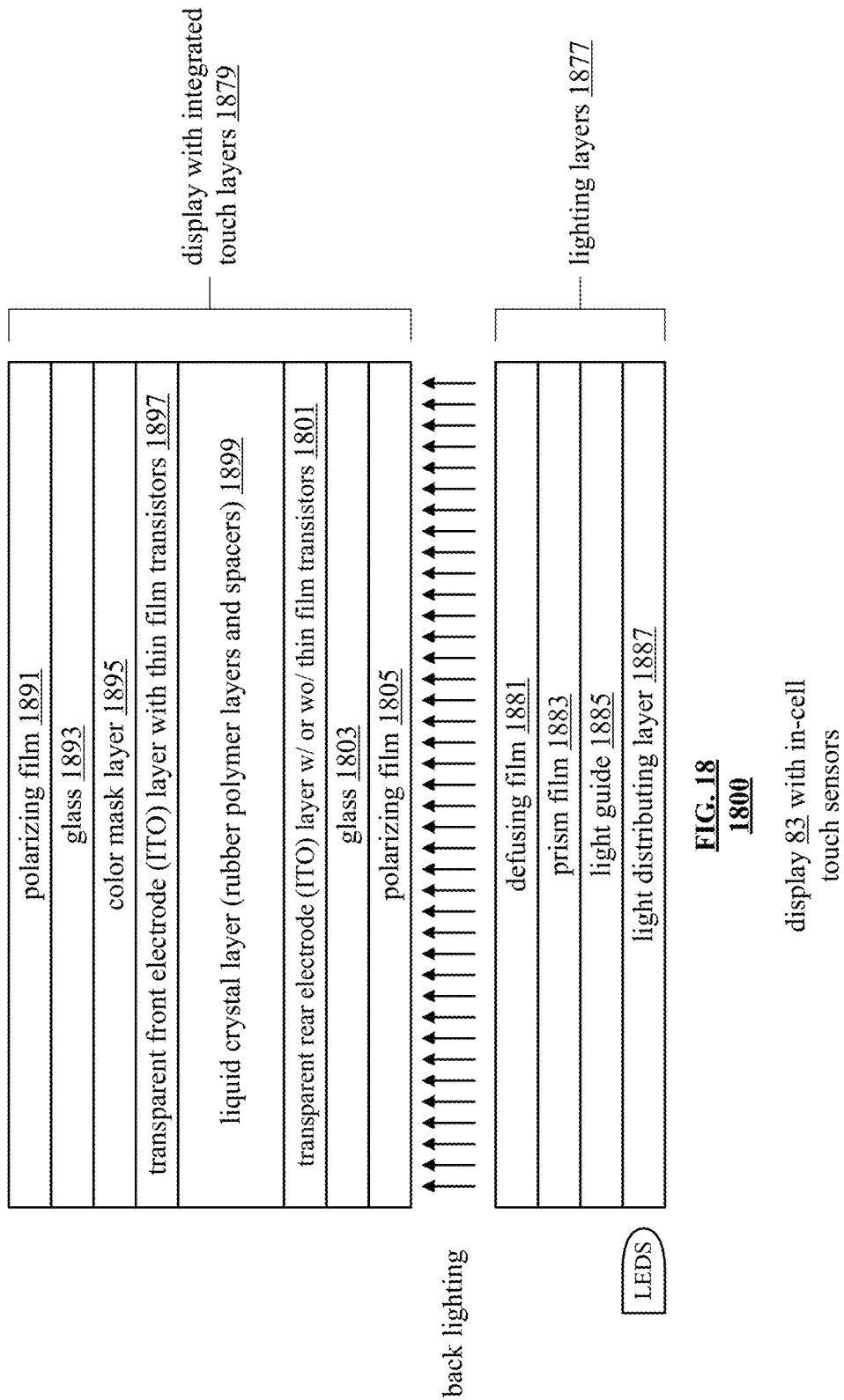
FIG. 18 is a cross section schematic block diagram of an example of a touchscreen display with in-cell touch sensors in accordance with the present invention.

FIG. 18 is a cross section schematic block diagram of an example 1800 of a touchscreen display with in-cell touch sensors in accordance with the present invention. This diagram includes a cross section schematic block diagram of an example of a display 83 (e.g., such as a touchscreen display with sensors 83) with in-cell touch sensors, which includes lighting layers 1877 and display with integrated touch sensing layers 1879. The lighting layers 1877 include a light distributing layer 1887, a light guide layer 1885, a prism film layer 1883, and a defusing film layer 1881. The display with integrated touch sensing layers 1879 include a rear polarizing film layer 1805, a glass layer 1803, a rear transparent electrode layer with thin film transistors 1801 (which may be two or more separate layers), a liquid crystal layer (e.g., a rubber polymer layer with spacers) 1899, a front electrode layer with thin film transistors 1897, a color mask layer 1895, a glass layer 1893, and a front polarizing film layer 1891. Note that one or more protective layers may be applied over the polarizing film layer 1891.

In an example of operation, a row of LEDs (light emitted diodes), or other light source, projects light into the light distributing player 1887, which projects the light towards the light guide 1885. The light guide includes a plurality of holes that let's some light components pass at differing angles. The prism film layer 1883 increases perpendicularity of the light components, which are then defused by the defusing film layer 1881 to provide a substantially even back lighting for the display with integrated touch sense layers 1879.

The two polarizing film layers 1805 and 1891 are orientated to block the light (i.e., provide black light). The front and rear electrode layers 1897 and 1801 provide an electric field at a sub-pixel level to orientate liquid crystals in the liquid crystal layer 1899 to twist the light. When the electric field is off, or is very low, the liquid crystals are orientated in a first manner (e.g., end-to-end) that does not twist the light, thus, for the sub-pixel, the two polarizing film layers 1805 and 1891 are blocking the light. As the electric field is increased, the orientation of the liquid crystals change such that the two polarizing film layers 1805 and 1891 pass the light (e.g., white light). When the liquid crystals are in a second orientation (e.g., side by side), intensity of the light is at its highest point.

The color mask layer 1895 includes three sub-pixel color masks (red, green, and blue) for each pixel of the display, which includes a plurality of pixels (e.g., 1440×1080). As the electric field produced by electrodes change the orientations of the liquid crystals at the sub-pixel level, the light is twisted to produce varying sub-pixel brightness. The sub-pixel light passes through its corresponding sub-pixel color mask to produce a color component for the pixel. The varying brightness of the three sub-pixel colors (red, green, and blue), collectively produce a single color to the human eye. For example, a blue shirt has a 12% red component, a 20% green component, and 55% blue component.

The in-cell touch sense functionality uses the existing layers of the display layers 1879 to provide capacitance-based sensors. For instance, one or more of the transparent front and rear electrode layers 1897 and 1801 are used to provide row electrodes and column electrodes. Various examples of creating row and column electrodes from one or more of the transparent front and rear electrode layers 1897 and 1801 is discussed in some of the subsequent figures.

Figure 19:
FIG. 19 is a schematic block diagram of an example of a transparent electrode layer with thin film transistors in accordance with the present invention.

FIG. 19 is a schematic block diagram of an example 1900 of a transparent electrode layer with thin film transistors in accordance with the present invention. This diagram includes a schematic block diagram of an example of a transparent electrode layer 1897 and/or 1801 with thin film transistors (TFT). Sub-pixel electrodes are formed on the transparent electrode layer and each sub-pixel electrode is coupled to a thin film transistor (TFT). Three sub-pixels (R-red, G-green, and B-blue) form a pixel. The gates of the TFTs associated with a row of sub-electrodes are coupled to a common gate line. In this example, each of the four rows has its own gate line. The drains (or sources) of the TFTs associated with a column of sub-electrodes are coupled to a common R, B, or G data line. The sources (or drains) of the TFTs are coupled to its corresponding sub-electrode.

In an example of operation, one gate line is activated at a time and RGB data for each pixel of the corresponding row is placed on the RGB data lines. At the next time interval, another gate line is activated and the RGB data for the pixels of that row is placed on the RGB data lines. For 1080 rows and a refresh rate of 60 Hz, each row is activated for about 15 microseconds each time it is activated, which is 60 times per second. When the sub-pixels of a row are not activated, the liquid crystal layer holds at least some of the charge to keep an orientation of the liquid crystals.

Figure 20:
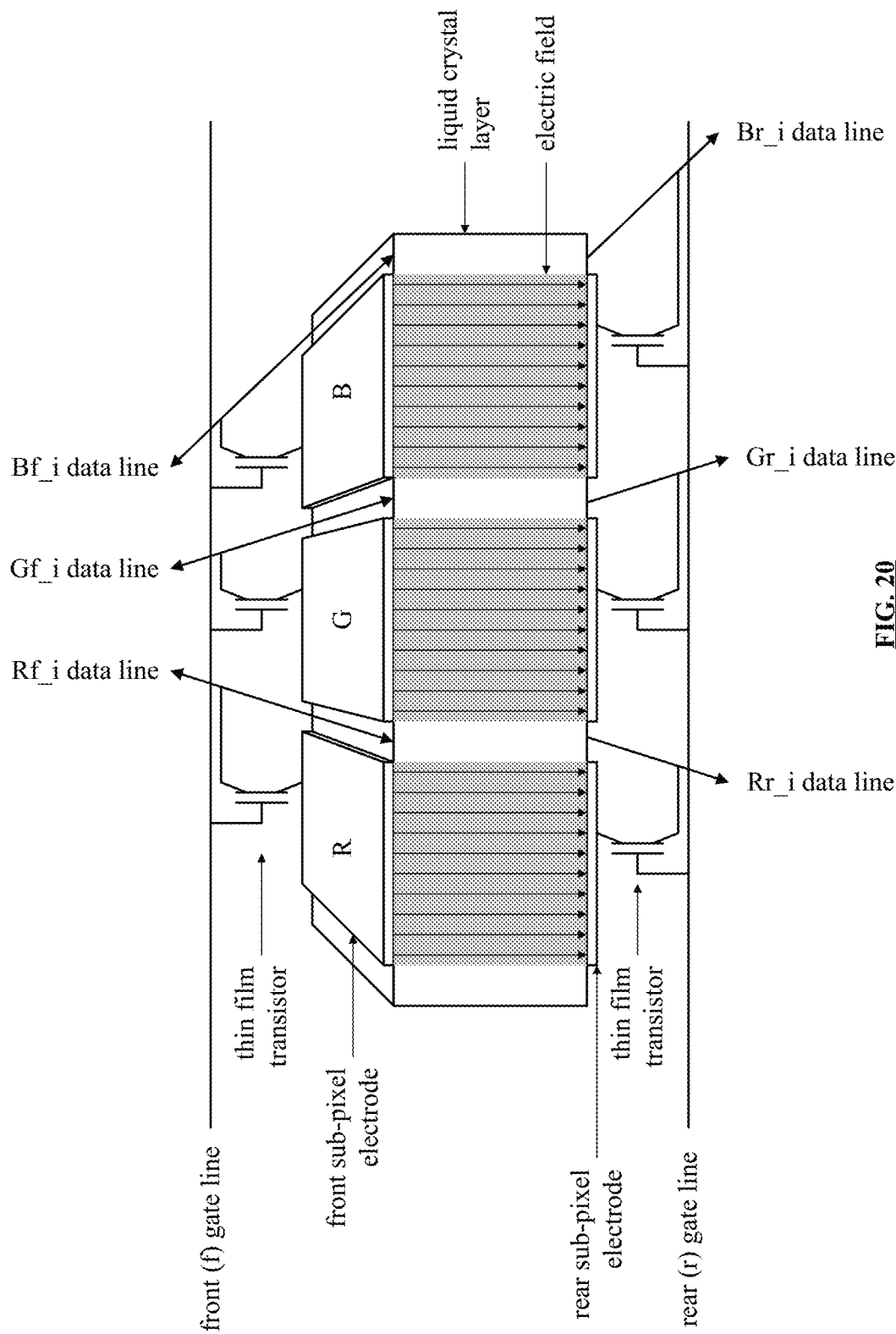
FIG. 20 is a schematic block diagram of an example of a pixel with three sub-pixels in accordance with the present invention.

FIG. 20 is a schematic block diagram of an example 2000 of a pixel with three sub-pixels in accordance with the present invention. This diagram includes a schematic block diagram of an example of a pixel with three sub-pixels (R-red, G-green, and B-blue). In this example, the front sub-pixel electrodes are formed in the front transparent conductor layer 1897 and the rear sub-pixel electrodes are formed in the rear transparent conductor layer 1801. Each front and rear sub-pixel electrode is coupled to a corresponding thin film transistor. The thin film transistors coupled to the top sub-pixel electrodes are coupled to a front (f) gate line and to front R, G, and B data lines. The thin film transistors coupled to the bottom sub-pixel electrodes are coupled to a rear (f) gate line and to rear R, G, and B data lines.

To create an electric field between related sub-pixel electrodes, a differential gate signal is applied to the front and rear gate lines and differential R, G, and B data signals are applied to the front and rear R, G, and B data lines. For example, for the red (R) sub-pixel, the thin film transistors are activated by the signal on the gate lines. The electric field created by the red sub-pixel electrodes is depending on the front and rear Red data signals. As a specific example, a large differential voltage creates a large electric field, which twists the light towards maximum light passing and increases the red component of the pixel.

The gate lines and data lines are non-transparent wires (e.g., copper) that are positioned between the sub-pixel electrodes such that they are hidden from human sight. The non-transparent wires may be on the same layer as the sub-pixel electrodes or on different layers and coupled using vias.

Figure 21:
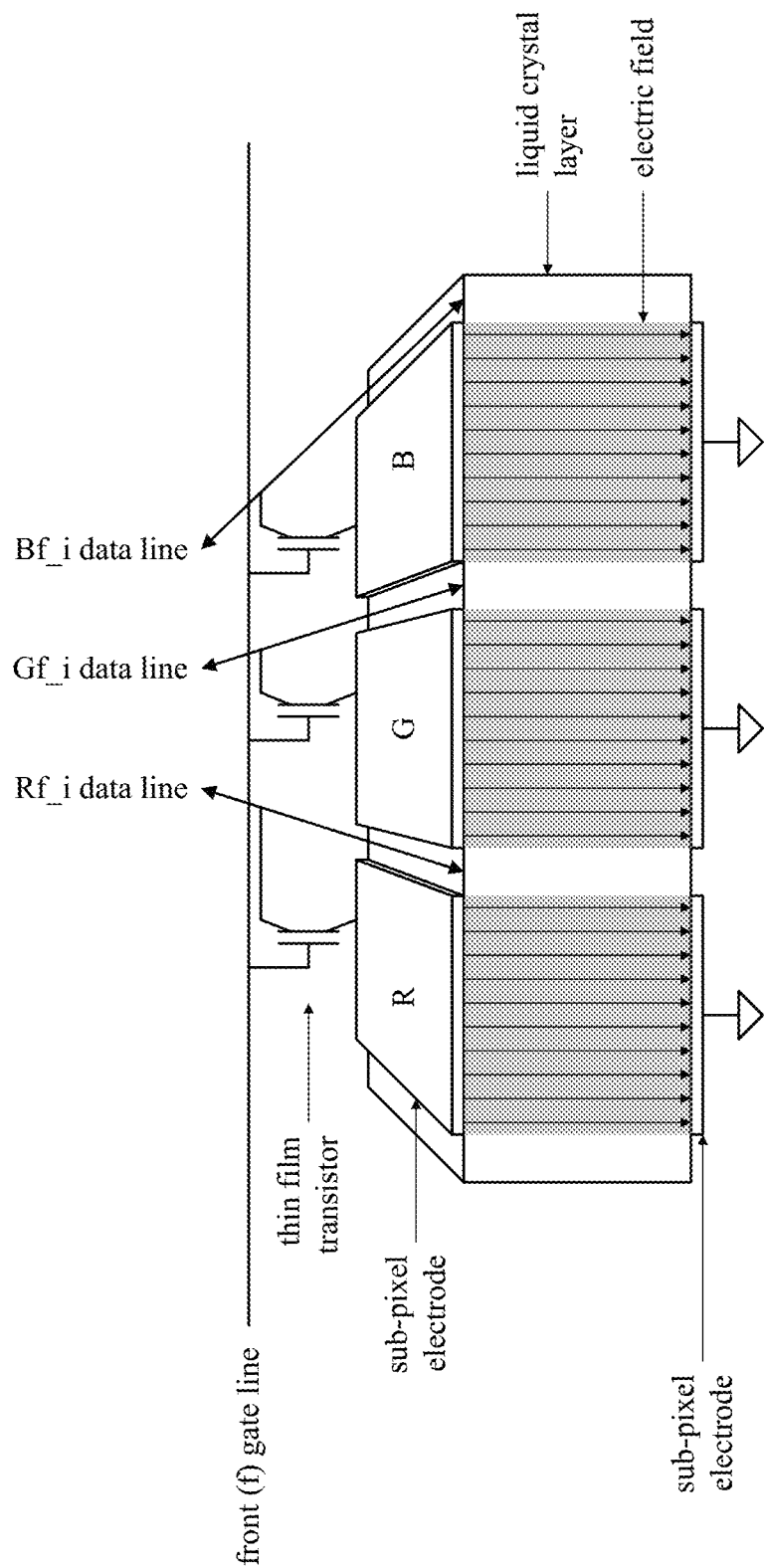
FIG. 21 is a schematic block diagram of another example of a pixel with three sub-pixels in accordance with the present invention.

FIG. 21 is a schematic block diagram of another example 2100 of a pixel with three sub-pixels in accordance with the present invention. This diagram includes a schematic block diagram of another example of a pixel with three sub-pixels (R-red, G-green, and B-blue). In this example, the front sub-pixel electrodes are formed in the front transparent conductor layer 1897 and the rear sub-pixel electrodes are formed in the rear transparent conductor layer 1801. Each front sub-pixel electrode is coupled to a corresponding thin film transistor. The thin film transistors coupled to the top sub-pixel electrodes are coupled to a front (f) gate line and to front R, G, and B data lines. Each rear sub-pixel electrode is coupled to a common voltage reference (e.g., ground, which may be a common ground plane or a segmented common ground plane (e.g., separate ground planes coupled together to form a common ground plane)).

To create an electric field between related sub-pixel electrodes, a single-ended gate signal is applied to the front gate lines and a single-ended R, G, and B data signals are applied to the front R, G, and B data lines. For example, for the red (R) sub-pixel, the thin film transistors are activated by the signal on the gate lines. The electric field created by the red sub-pixel electrodes is depending on the front Red data signals.

Note that any of the various examples provided herein, or their equivalent, or other examples of computing devices operative to display one or more images may be used to facilitate communication of data from a first computing device to a second computing device via a user. Generally speaking, any desired image, when generated by a display 83, will correspondingly operate the components within the display 83 such as the RGB data lines, the gate lines, the sub-pixel electrodes, and/or any of the respective other components within the display 83 such as may include one or more of their respective components of the lighting layers 1877 and/or display with integrated touch sensing layers 1879 such as described with reference to FIG. 18. As these various components operate to effectuate one or more images to be displayed on the display 83 may be viewed as components of one or more signal generators (alternatively referred to as signal generation circuitry or signal generation circuitries) operative to generate one or more signals to be coupled from a first computing device via a user to a second computing device. For example, as the actual components within the display 83 are operative to render one or more images, one or more signals are generated in accordance with operation of those components, and when a user is in contact with the display 83 or within sufficient proximity to the display 83 so as to facilitate coupling of those signals from the computing device that includes the display 83 to the user, then one or more signals that are associated with one or more images that are displayed on the display 83 may be coupled from the computing device that includes the display 83 via the user to another computing device.

Note also that while certain examples described herein use a liquid crystal display (LCD) for illustration, in general, if any matrix addressed display may be implemented and operative to generate one or more signals, such as may be based on one or more images, as described herein. For example, regardless of the particular technology implemented for a particular display (e.g., whether it be a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS), etc.), such a display that is a matrix addressed display is operative to support the functionality and capability as described herein including the generation of one or more signals, such as may be based on one or more images, as described herein.

Figure 22:
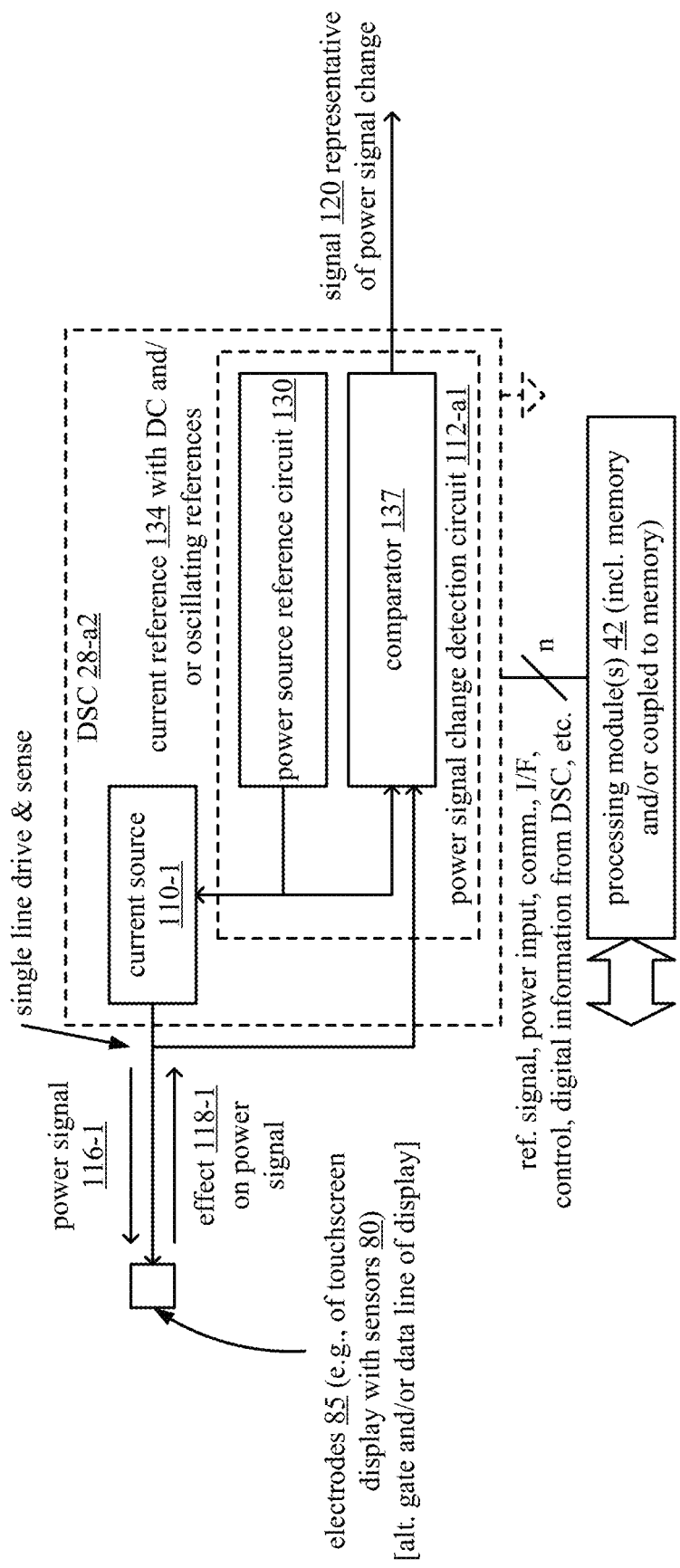
FIG. 22 is a schematic block diagram of an embodiment of a DSC that is interactive with an electrode in accordance with the present invention.

FIG. 22 is a schematic block diagram of an embodiment 2200 of a DSC that is interactive with an electrode in accordance with the present invention. Similar to other diagrams, examples, embodiments, etc. herein, the DSC 28-*a*2 of this diagram is in communication with one or more processing modules 42. The DSC 28-*a*2 is configured to provide a signal (e.g., a power signal, an electrode signal, transmit signal, a monitoring signal, etc.) to the electrode 85 via a single line and simultaneously to sense that signal via the single line. In some examples, sensing the signal includes detection of an electrical characteristic of the electrode that is based on a response of the electrode 85 to that signal. Examples of such an electrical characteristic may include detection of an impedance of the electrode 85 such as a change of capacitance of the electrode 85, detection of one or more signals coupled into the electrode 85 such as from one or more other electrodes, and/or other electrical characteristics. In addition, note that the electrode 85 may be implemented in a capacitive imaging glove in certain examples.

In some examples, the DSC 28-*a*2 is configured to provide the signal to the electrode to perform any one or more of capacitive imaging of an element (e.g., such as a glove, sock, a bodysuit, or any portion of a capacitive imaging component associated with the user and/or operative to be worn and/or used by a user) that includes the electrode (e.g., such as a capacitive imaging glove, a capacitive imaging sock, a capacitive imaging bodysuit, or any portion of a capacitive imaging component associated with the user and/or operative to be worn and/or used by a user), digit movement detection such as based on a competitive imaging glove, inter-digit movement detection such as based on a competitive imaging glove, movement detection within a three-dimensional (3-D) space, and/or other purpose(s).

This embodiment of a DSC 28-*a*2 includes a current source 110-1 and a power signal change detection circuit 112-*a*1. The power signal change detection circuit 112-*a*1 includes a power source reference circuit 130 and a comparator 132. The current source 110-1 may be an independent current source, a dependent current source, a current mirror circuit, etc.

In an example of operation, the power source reference circuit 130 provides a current reference 134 with DC and oscillating components to the current source 110-1. The current source generates a current as the power signal 116 based on the current reference 134. An electrical characteristic of the electrode 85 has an effect on the current power signal 116. For example, if the impedance of the electrode 85 decreases and the current power signal 116 remains substantially unchanged, the voltage across the electrode 85 is decreased.

The comparator 132 compares the current reference 134 with the affected power signal 118 to produce the signal 120 that is representative of the change to the power signal. For example, the current reference signal 134 corresponds to a given current (I) times a given impedance (Z). The current reference generates the power signal to produce the given current (I). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

Figure 23:
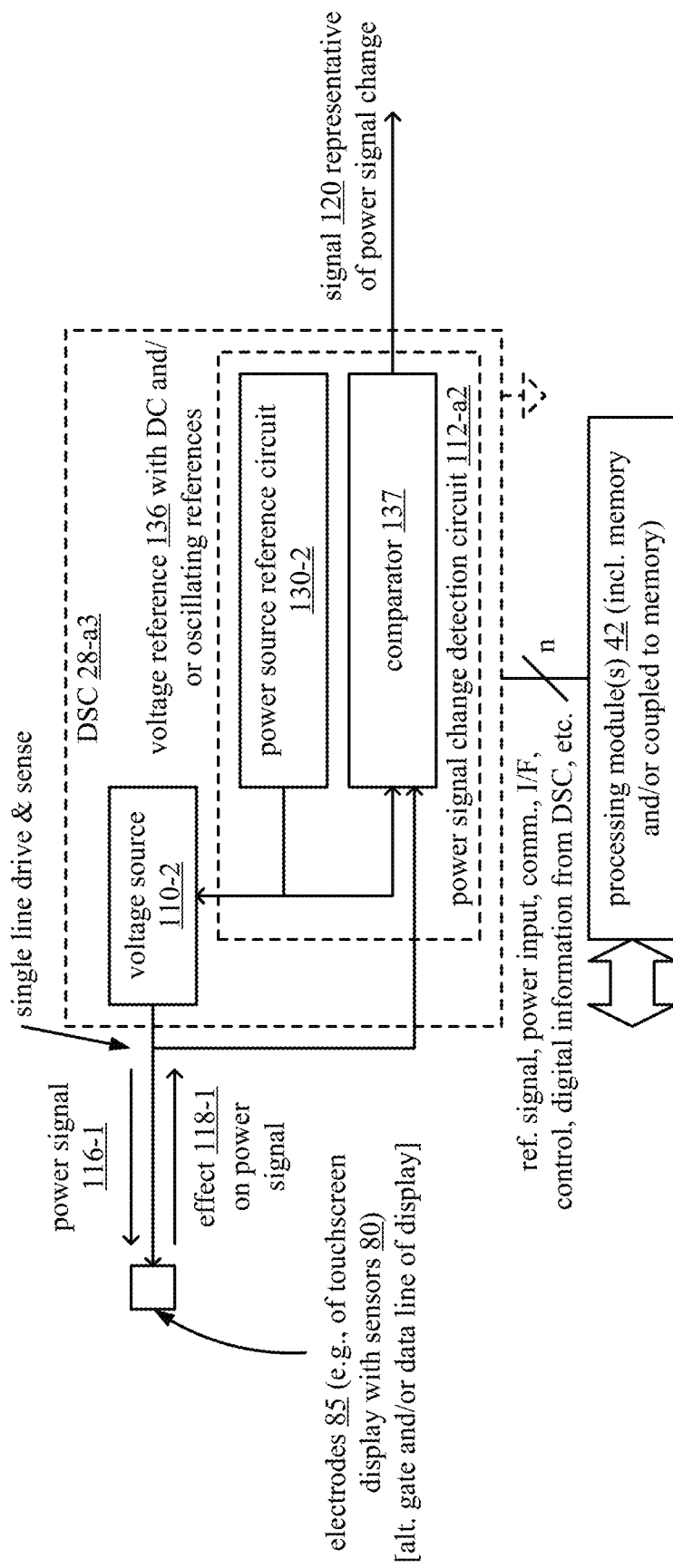
FIG. 23 is a schematic block diagram of another embodiment of a DSC that is interactive with an electrode in accordance with the present invention.

FIG. 23 is a schematic block diagram of another embodiment 2300 of a DSC that is interactive with an electrode in accordance with the present invention. Similar to other diagrams, examples, embodiments, etc. herein, the DSC 28-*a*3 of this diagram is in communication with one or more processing modules 42. Similar to the previous diagram, although providing a different embodiment of the DSC, the DSC 28-*a*3 is configured to provide a signal to the electrode 85 via a single line and simultaneously to sense that signal via the single line. In some examples, sensing the signal includes detection of an electrical characteristic of the electrode 85 that is based on a response of the electrode 85 to that signal. Examples of such an electrical characteristic may include detection of an impedance of the electrode 85 such as a change of capacitance of the electrode 85, detection of one or more signals coupled into the electrode 85 such as from one or more other electrodes, and/or other electrical characteristics. In addition, note that the electrode 85 may be implemented in a capacitive imaging glove in certain examples.

This embodiment of a DSC 28-*a*3 includes a voltage source 110-2 and a power signal change detection circuit 112-*a*2. The power signal change detection circuit 112-*a*2 includes a power source reference circuit 130-2 and a comparator 132-2. The voltage source 110-2 may be a battery, a linear regulator, a DC-DC converter, etc.

In an example of operation, the power source reference circuit 130-2 provides a voltage reference 136 with DC and oscillating components to the voltage source 110-2. The voltage source generates a voltage as the power signal 116 based on the voltage reference 136. An electrical characteristic of the electrode 85 has an effect on the voltage power signal 116. For example, if the impedance of the electrode 85 decreases and the voltage power signal 116 remains substantially unchanged, the current through the electrode 85 is increased.

The comparator 132 compares the voltage reference 136 with the affected power signal 118 to produce the signal 120 that is representative of the change to the power signal. For example, the voltage reference signal 134 corresponds to a given voltage (V) divided by a given impedance (Z). The voltage reference generates the power signal to produce the given voltage (V). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

Figure 24:
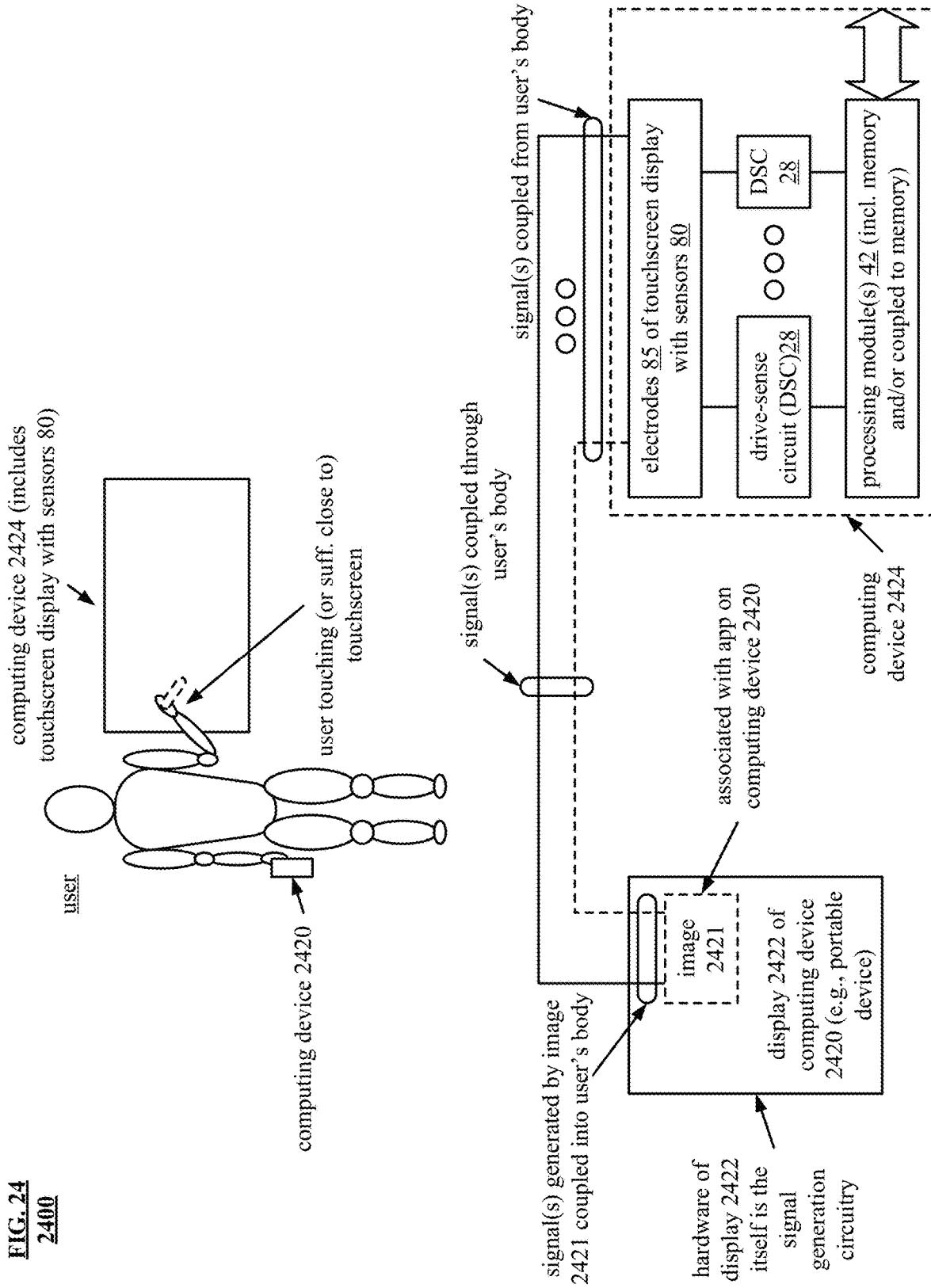
FIG. 24 is a schematic block diagram of an embodiment of computing devices within a system operative to facilitate coupling of one or more signals from a first computing device via a user to a second computing device in accordance with the present invention.

FIG. 24 is a schematic block diagram of an embodiment 2400 of computing devices within a system operative to facilitate coupling of one or more signals from a first computing device via a user to a second computing device in accordance with the present invention. In this diagram, a user is operative to interact with different respective computing devices. The user interacts with computing device 2420 and also computing device 2424 that includes a touchscreen display with sensors 80. The computing device 2420 may be any of a variety of types including any one or more of a portable device, cell phone, smartphone, tablet, etc. In certain examples, the computing device 2420 is a device capable to be transported with the user as the user moves and changes location. However, note that in other examples, the computing device 2420 is a stationary device having a fixed location and not being a portable device per se, such as a desktop computer, a television, a set-top box, etc. such as a device that substantially remains in a given location.

As the user interacts with the computing device 2424, such as touching the touchscreen display with sensors 80 with a finger, hand, a stylus, e-pen, and/or another appropriate device to interact therewith, etc., or is within sufficiently close proximity to facilitate coupling from the user to the deep lights 2424 and a touchscreen display with sensors 80 thereof, the computing device 2424 is operative to receive input from the user.

In an example of operation and implementation, the computing device 2420 includes a display 2422 that is operative to display one or more images thereon. The user interacts with the one or more images that are generated on the display 2422, and based on such interaction, one or more signals associated with one or more images are coupled through the user from the computing device 2420 to the computing device 2424. As described herein, when a display such as within computing device 2420 is operative to produce one or more images thereon, the hardware components of the computing device 2420 generate various signals to effectuate the rendering of the one or more images on the display 2422 of the computing device 2420. For example, in accordance with operation of the display 2422 to render the one or more images thereon, the actual hard work components of the display 2422 themselves (e.g., such as the gate lines, the data lines, the sub-pixel electrodes, etc.) include signal generation circuitry that is configured to generate the one or more signals to be coupled into the user's body. These signals are coupled via the user's body from the computing device 2420 to the computing device 2424. The touchscreen display with sensors 80 of the computing device 2420 is configured to detect the one or more signals that are coupled via the user from the computing device 2420.

In certain samples, the computing device 2424 is implemented to include a number of electrodes 85 of the touchscreen display with sensors 80 such that each respective electrode 85 is connected to or communicatively coupled to a respective drive-sense circuit (DSC) 28. For example, a first electrode 85 is connected to or communicatively coupled to a first DSC 28, a second electrode 85 is connected to or communicatively coupled to a second DSC 28, etc.

In this diagram as well as others here and, one or more processing modules 42 is configured to communicate with and interact with the DSC 28. This diagram particularly shows the one or more processing modules 42 implemented to communicate with and interact with a first DSC 28 and up to an nth DSC 28, where n is a positive integer greater than or equal to 2, that are respectively connected to and/or coupled to electrodes 85.

Note that the communication and interaction between the one or more processing modules 42 and any given one of the DSCs 28 may be implemented in via any desired number of communication pathways (e.g., generally n communication pathways, where n is a positive integer greater than or equal to one). The one or more processing modules 42 is coupled to at least one DSC 28 (e.g., a first DSC 28 associated with a first electrode 85 and a second DSC 28 associated with a second electrode 85). Note that the one or more processing modules 42 may include integrated memory and/or be coupled to other memory. At least some of the memory stores operational instructions to be executed by the one or more processing modules 42. In addition, note that the one or more processing modules 42 may interface with one or more other devices, components, elements, etc. via one or more communication links, networks, communication pathways, channels, etc. (e.g., such as via one or more communication interfaces of the computing device 2420, such as may be integrated into the one or more processing modules 42 or be implemented as a separate component, circuitry, etc.).

Considering one of the DSCs 28, the DSC 28 is configured to provide a signal to an electrode 85. Note that the DSC 28 is configured to provide the signal to the electrode and also simultaneously to sense the signal that is provided to the electrode including detecting any change of the signal. For example, a DSC 28 is configured to provide a signal to the electrode 85 to which it is connected or coupled and simultaneously sense that signal including any change thereof. For example, the DSC 28 is configured to sense a signal that is capacitively coupled between the electrodes 85 including any change of the signal. In some examples, the DSC 28 is also configured to sense a signal that is capacitively coupled into an electrode 85 after having been coupled via the user from the computing device 2420.

Generally speaking, a DSC 28 is configured to provide a signal having any of a variety of characteristics such as a signal that includes only a DC component, a signal that includes only an AC component, or a signal that includes both a DC and AC component.

In addition, in some examples, the one or more processing modules 42 is configured to provide a reference signal to the DSC 28, facilitate communication with the DSC 28, perform interfacing and control of the operation of one or more components of the DSC 28, receive digital information from the DSC 28 that may be used for a variety of purposes detecting, identifying, processing, etc. one or more signals that have been coupled from the computing device 2420 via the user to the computing device 2424 and also to interpret those one or more signals. Note that these one or more signals may be used to convey any of a variety of types of information from the computing device 2420 via the user to the computing device 2424.

Examples of some types of information that may be conveyed within these one or more signals may include any one or more of user identification information related to the user, name of the user, etc., financial related information such as payment information, credit card information, banking information, etc., shipping information such as a personal address, a business address, etc. to which one or more selected or purchase products are to be shipped, etc., and/or contact information associated with the user such as phone number, e-mail address, physical address, business card information, a web link such as a Universal Resource Location (URL), etc. Generally speaking, such one or more signals may be generated and produced to include any desired information to be conveyed from the computing device 2420 to the computing device 2424 via the user.

Other examples of other types of information that may be conveyed within these one or more signals may include any one or more of information from the computing device 2420 that is desired to be displayed on the display of the computing device 2424. For example, consider the computing device 2420 as including information therein that the user would like to display it on another screen, such as the display of the computing device 2424. Examples of such information may include personal health monitoring information, such as may be collected and provided by a smart device such as a smart watch, which monitors any one or more characteristics of the user. Examples of such characteristics may include any one or more of heart rate, EKG patterns, number of steps during a given period of time, the number of hours of sleep within a given period of time, etc. The user of such a smart device may desire to have information collected by that smart device to be displayed on another screen, such as the display of the computing device 2424.

Even other examples of types of information may be conveyed within these one or more signals may include instructional information. For example, the information provided from the computing device 2420 to the computing device 2424 may include instructional information from the computing device 2420 that is operative to instruct the computing device 2424 to perform some operation. For example, the instruction may include the direction for the computing device 2424 to retrieve information from a database, server, via one or more networks 26, such as the Internet, etc. The instruction may alternatively include the direction for the computing device 2424 two locate a particular file, perform a particular action, etc.

In some examples, such instructional information may be conveyed as tokenized information. For example, the data that is transferred from the computing device 2420 to the computing device 2424 may include a token that, when interpreted based on a tokenized communication protocol understood and used by both the computing device 2420 in the computing device 2424, instructs the computing device 2424 to perform a particular operation. This may include instructing the computing device 2424 to retrieve certain information from a database, server, via one or more networks 26, such as the Internet, etc. Alternatively, this may include instructing the computing device 2424 to go to and/or retrieve information from a particular website link, such as a web link such as a Universal Resource Location (URL), etc.

For example, the information that is conveyed within these one or more signals that are communicated from the computing device 2420 via the user to the computing device 2424 may include information that is be based on some particular communication protocol such that the information, upon being interpreted and recovered by the computing device 2424, instructs the computing device 2424 to perform some operation (e.g., locating a file, performing some action, accessing a database, displaying a particular image or particular information on its display, etc.).

Even other examples of information that is conveyed within these one or more signals that are communicated from computing device 2420 via the user to the computing device 2424 may correspond to one or more gestures that are performed by a user that is interacting with a touchscreen of the computing device 2420. For example, a particular pattern, sequence of movements, such as a signature, such as spreading two digits apart as they are in contact with the touchscreen or closing the distance between two digits as they are in contact with the touchscreen, etc. may be used to instruct the computing device 2420 include particular information within one or more signals that are coupled from the computing device 2420 via the user to the computing device 2424.

For example, consider a user having to digits in contact with an image that is displayed on the display of the computing device 2420 and spreading two digits apart has to scale or increase the size of the image being displayed on the display of the computing device 2420. Such a gesture by the user instructs the computing device 2420 to generate information that includes instruction for the computing device 2424 to scale or increase the size of the same image or another image that is being displayed on the display of the computing device 2424, and the computing device 2420 then generates one or more signals that includes such instruction and are then coupled from the computing device 2420 via the user to the computing device 2424. Similarly, a different gesture, such as a user closing the distance between two digits as they are in contact with a portion of the touchscreen that is displaying an image, made results in the computing device 2420 to generate information that includes instruction for the computing device 2424 to scale or decrease the size of the same image or another image that is being displayed on the display of the computing device 2424. In general, any desired mapping of gestures to instructions, information, etc. may be made within the computing device 2420.

With respect to the signals that are generated by the computing device 2420 accordance with displaying one or more images on the display 2422 of the computing device 2420, note that such signals may be of any of a variety of types. Various examples are described below regarding different respective images being used to produce different respective signals, based on displaying images on the display 2422 of the computing device 2420 having certain characteristics. In accordance with generating such signals by displaying images on the display 2422 of the computing device 2420, the computing device 2420 is configured to produce and transmit one or more signals having any of a number of desired properties via the user to the computing device 2424.

In addition, note that such signals may be implemented to include any desired characteristics, properties, parameters, etc. For example, a signal generated by the display of an image 2421 on the display 2422 of the computing device 2420 may be based on encoding of one or more bits to generate one or more coded bits used to generate modulation data (or generally, data). For example, one or more processing modules is included within or associated with computing device 2420. Note that the one or more processing modules implemented within or associated with the computing device 2420 may include integrated memory and/or be coupled to other memory. At least some of the memory stores operational instructions to be executed by the one or more processing modules. In addition, note that the one or more processing modules 42 may interface with one or more other devices, components, elements, etc. via one or more communication links, networks, communication pathways, channels, etc. (e.g., such as via one or more communication interfaces of the computing device 2420, such as may be integrated into the one or more processing modules 42 or be implemented as a separate component, circuitry, etc.).

These one or more processing modules included within or associated with computing device 2420 is configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, these one or more processing modules included within or associated with computing device 2420 is configured to process the one or more coded bits in accordance with modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In certain examples, the display 2422 of the computing device 2420 includes a display alone. In other examples, the display 2422 of the computing device 2420 includes a display with touchscreen display capability, but is not particularly implemented in accordance with electrodes 85 that are respectively serviced by a number of respective DSCs 28.

However, in even other examples, the display 2422 of the computing device 2420 includes a display with touchscreen display with sensors 80 capability that is implemented in accordance with electrodes 85 that are respectively serviced by a number of respective DSCs 28 as described herein. For example, the display 2422 of the computing device 2420 includes a touchscreen display with sensors 80. For example, similar to the implementation shown with respect to computing device 2424, a number of electrodes 85 of a touchscreen display with sensors 80 may be implemented within the computing device 2420 such that a number of respective DSCs 28 are implemented to service the respective electrodes 85 of such a touching display with sensors 80 that are implemented within the computing device 2420 and also: communicate with and cooperate with one or more processing modules 42 that may include memory and/or be coupled to memory, in a similar fashion by which such components are implemented and operated within the computing device 2424.

In accordance with implementation that is based on a display with touchscreen display with sensors 80 capability that is implemented in accordance with electrodes 85 that are respectively serviced by a number of respective DSCs 28 as described herein, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC 28, note that any additional signal that is coupled into an electrode 85 associated with that DSC 28 is also detectable. For example, a DSC 28 that is associated with such electrode is configured to detect any signal from one or more other sources that may include any one or more of electrodes, touch sensors, buses, communication links, loads, electrical couplings or connections, etc. that get coupled into that line, electrode, touch sensor, bus, communication link, a battery, load, electrical coupling or connection, etc.

In addition, note the different respective signals that are driven and simultaneously sensed by one or more DSCs 28 may be are differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

In an example of operation and implementation, an application, an "app," is opened by the user on the computing device 2420 based on the user appropriately interacting with the computing device 2420 (e.g., pressing a button of the computing device 2420, such as a hard button on a side of the computing device 2420, by pressing an icon that is associated with the application that is displayed on the display 2422 of the computing device 2420, etc.), and the initiation of the operation of such an application produces an image 2421 on a display 2422 of the computing device 2420. As the image 2421 is generated and displayed on the display 2422 of the computing device 2420, one or more signals are generated by the image 2421 on the display 2422 of the computing device 2420 and are coupled into the user's body as the user is touching the image 2421 on the display 2422 of the computing device 2420 or is within sufficient proximity to facilitate coupling of signals associated with the image 2421 into the user's body. These signal(s) are coupled into user's body. This may be performed via finger, hand, stylus, e-pen, etc. being in contact with (or sufficiently close to) to the image 2421 on the display 2422 of the computing device 2420.

Then, based on operation of the application, one or more signals associated with the image 2421 or coupled into the user's body, through the user's body, and are coupled into one or more of the electrodes 85 of the touchscreen display with sensors 80 of the computing device 2424. One or more DSCs 28 of the computing device 2424 is configured to detect the one or more signals associated with the image 2421 that have been generated within the computing device 2420 and coupled via the user's body to the into one or more of the electrodes 85 of the touchscreen display with sensors 80 of the computing device 2424. These signal(s) are coupled from the user's body to electrode(s) 85 of the touchscreen display with sensors 80. This may be performed via finger, hand, stylus, e-pen, etc. being in contact with (or sufficiently close to) electrode(s) 85.

In accordance with operation of a DSC 28 within the computing device 2424, a reference signal is used to facilitate operation of the DSC 28 as described herein. Note that such a reference signal that provided from the one or more processing modules 42 to a DSC 28 in this diagram as well as any other diagram herein may have any desired form. For example, the reference signal may be selected to have any desired magnitude, frequency, phase, etc. among other various signal characteristics. In addition, the reference signal may have any desired waveform. For example, many examples described herein are directed towards a reference signal having a DC component and/or an AC component. Note that the AC component may have any desired waveform shape including sinusoid, sawtooth wave, triangular wave, square wave signal, etc. among the various desired waveform shapes. In addition, note that DC component may be positive or negative. Moreover, note that some examples operate having no DC component (e.g., a DC component having a value of zero/0). In addition, note that more the AC component may include more than one component corresponding to more than one frequency. For example, the AC component may include a first AC component having a first frequency and a second AC component having a second frequency. Generally speaking, the AC component may include any number of AC components having any number of respective frequencies.

Based on coupling of the one or more signals associated with the image 2421, via the user's body, and into one or more of the electrodes 85 of the touchscreen display with sensors 80 of the computing device 2424 will be affected by those one or more signals. The one or more DSCs 28 that is configured to interact with and service the one or more electrodes 85 of the touchscreen display with sensors 80 of the computing device 2424 into which the one or more signals associated with the image 2421 are coupled is also configured to detect those one or more signals associated with the image 2421 such as based on any change of signals that are driven to the one or more electrodes 85 of the touchscreen display with sensors 80 of the computing device 2424 and simultaneously sensed by the one or more DSCs 28 within the computing device 2424.

From certain perspectives, this diagram provides an illustration of the communication system that facilitates communication from the computing device 2420 to the computing device 2424, and vice versa if desired, using the user as the communication channel, the communication medium, etc. In addition, note that communication may be made between the computing device 2420 and the computing device 2424 via alternative means as also described herein including via one or more communication systems, communication networks, etc. with which the computing device 2420 and the computing device 2424 are configured to interact with and communicate (e.g., a cellular telephone system, a wireless communication system, satellite communication system, a wireless local area network (WLAN), a wired communication system, a local area network (LAN), a cable-based communication system, fiber-optic communication system, etc.).

In an example of operation and implementation, the computing device 2420 includes signal generation circuitry. When enabled, the signal generation circuitry operably coupled and configured to generate a signal that includes information corresponding to a user and/or an application that is operative within the computing device. Also, the signal generation circuitry operably coupled and configured to couple the signal into the user from a location on the computing device based on a bodily portion of the user being in contact with or within sufficient proximity to the location on the computing device that facilitates coupling of the signal into the user. Also, note that the signal is coupled via the user to computing device 2424 that includes a touchscreen display that is operative to detect and receive the signal based on another bodily portion of the user being in contact with or within sufficient proximity to the touchscreen display of the other computing device that facilitates coupling of the signal from the user.

In some examples, the computing device includes a display and/or a touchscreen display that is operative as the signal generation circuitry. For example, the computing device 2420 includes a display that includes certain hardware components. Examples of such hardware components may include a plurality of pixel electrodes coupled via a plurality of lines (e.g., gate lines, data lines, etc.) to one or more processing modules. When enabled, the display is operably coupled and configured to display an image within at least a portion of the display based on image data associated with operation of the application that is operative within the computing device. In such an implementation, the signal generation circuitry includes at least some of the plurality of pixel electrodes and at least some of the plurality of lines of the display that are operative to facilitate display the image within the at least a portion of the display.

Also, in certain examples, the computing device includes memory that stores operational instructions and one or more processing modules that is operably coupled to the display and the memory. Wherein, when enabled, the one or more processing modules is configured to execute the operational instructions to generate the image data based on operation of the application within the computing device that is initiated based on input from the user to the computing device. The one or more processing modules is also configured to execute the operational instructions to provide the image data to the display via a display interface to be used by the display to render image within the at least a portion of the display.

In some examples, the display includes a resolution that specifies a number of pixel rows and is operative based on a frame refresh rate (FRR). A gate scanning frequency of the display is a product resulting from the number of pixel rows multiplied by the FRR, and a frequency of the signal is a sub-multiple of a gate scanning frequency that is the gate scanning frequency divided by a positive integer that is greater than or equal to 2.

In even other examples, the frequency of the signal is a sub-multiple of the gate scanning frequency that is one-half of the gate scanning frequency multiple by a fraction N/M, where N is a first positive integer that is greater than or equal to 2, and M is a second positive integer that is greater than or equal to 2 and also greater than N.

Examples of the location on the computing device may include any one or more of at least a portion of a display of the computing device, a touchscreen display of the computing device, a button of the computing device, a frame of the computing device, and/or a ground plane of the computing device.

Also, examples of the information corresponding to the user and/or the application that is operative within the computing device may include any one or more of user identification information related to the user, financial related information associated with the user, shipping information associated with the user, and/or contact information associated with the user.

Moreover, in certain specific examples, the user identification information related to the user includes any one or more of a name of the user, a username of the user, a phone number of the user, an e-mail address of the user, a personal address of the user, a business address of the user, and/or business card information of the user. Also, the financial related information associated with the user includes any one or more of payment information of the user, credit card information of the user, or banking information of the user. The shipping information associated with the user includes any one or more of a personal address of the user and/or a business address of the user. Also, the contact information associated with the user includes any one or more of a phone number of the user, an e-mail address of the user, a personal address of the user, a business address of the user, and/or business card information of the user.

In some particular examples, the touchscreen display of the other computing device includes a plurality of sensors and a plurality of drive-sense circuits (DSCs), wherein, when enabled, a DSC of the plurality of DSCs is operably coupled and configured to provide a sensor signal via a single line to a sensor of the plurality of sensors and simultaneously to sense the sensor signal via the single line. Note that the sensing of the sensor signal includes detection of an electrical characteristic of the sensor signal that includes coupling of the signal from the user into the sensor of the plurality of sensors. Also, the DSC of the plurality of DSCs is operably coupled and configured to generate a digital signal representative of the electrical characteristic of the sensor signal.

In some implementations of the DSC, the DSC includes a power source circuit operably coupled and configured to the sensor of the plurality of sensors. When enabled, the power source circuit is operably coupled and configured to provide the sensor signal via the single line to the sensor of the plurality of sensors. Also, the sensor signal includes a DC (direct current) component and/or an oscillating component. The DSC also includes a power source change detection circuit that is operably coupled and configured to the power source circuit. When enabled, the power source change detection circuit is configured to detect an effect on the sensor signal that is based on the coupling of the signal from the user into sensor of the plurality of sensors.

In some specific examples of the DSC, the power source circuit includes a power source to source a voltage and/or a current to the sensor of the plurality of sensors via the single line. Also, the power source change detection circuit included a power source reference circuit configured to provide a voltage reference and/or a current reference. The DSC also includes a comparator configured to compare the voltage and/or the current provided to the sensor of the plurality of sensors to the voltage reference and/or the current reference, appropriately such as voltage to voltage reference and current to current reference, to produce the sensor signal.

In an example of operation and implementation, the computing device 2420 includes a touchscreen display that includes a plurality of sensors and a plurality of drive-sense circuits (DSCs). When enabled, a DSC of the plurality of DSCs is operably coupled and configured to provide a first signal via a single line to a sensor of the plurality of sensors and simultaneously to sense the first signal via the single line, wherein sensing of the first signal includes detection of an electrical characteristic of the first signal. The DSC is also is operably coupled and configured to generate a digital signal representative of the electrical characteristic of the first signal.

The computing device 2420 also includes signal generation circuitry. When enabled, the signal generation circuitry is operably coupled and configured to generate a second signal that includes information corresponding to a user and/or an application that is operative within the computing device 2420. The signal generation circuitry is operably coupled and configured to couple the second signal into the user from a location on the computing device 2420 based on a bodily portion of the user being in contact with or within sufficient proximity to the location on the computing device 2420 that facilitates coupling of the second signal into the user, wherein the second signal is coupled via the user to another computing device 2424 that includes another that is operative to detect and receive the second signal based on another bodily portion of the user being in contact with or within sufficient proximity to the touchscreen display of the another computing device 2424 that facilitates coupling of the second signal from the user.

Figure 25:
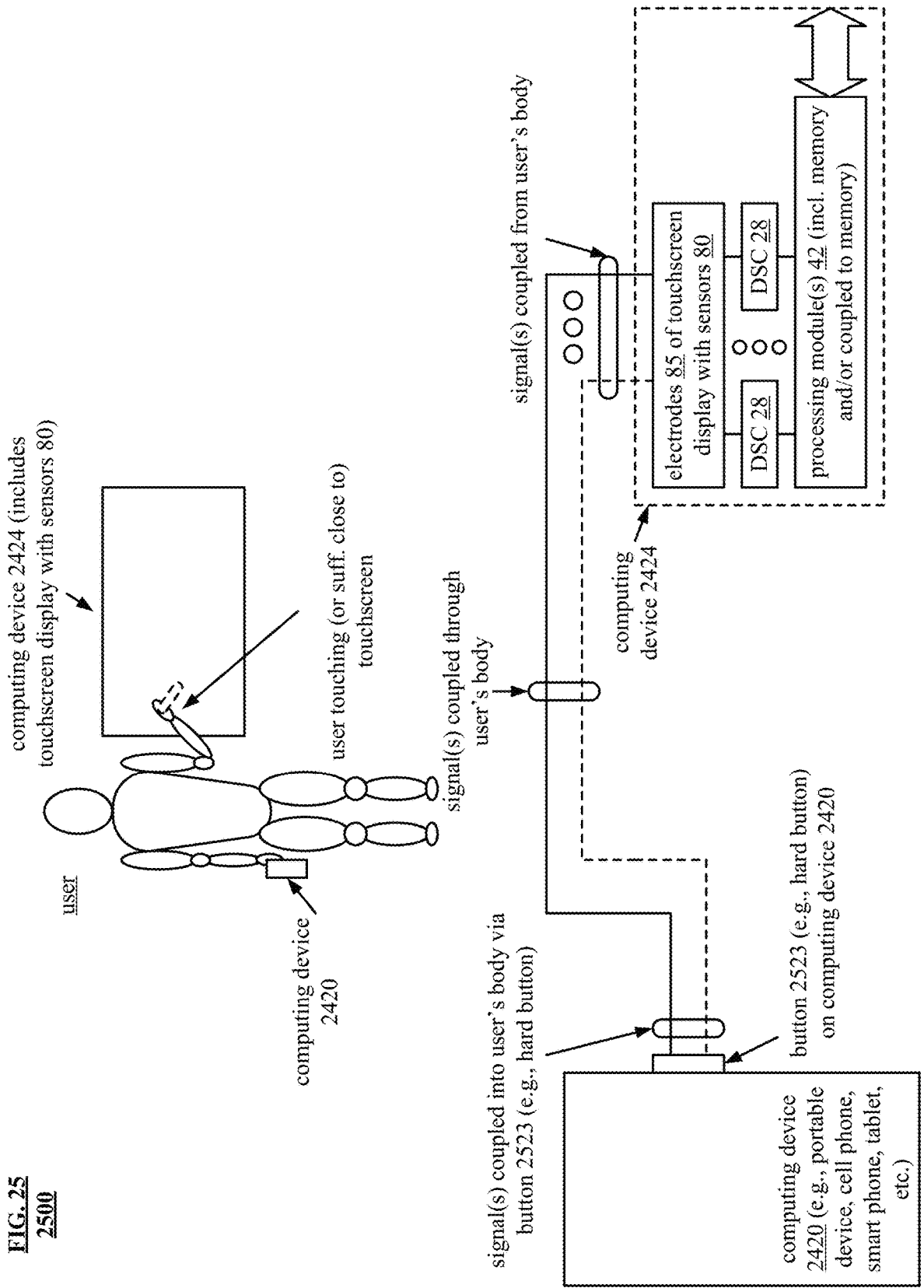
FIG. 25 is a schematic block diagram of another embodiment of computing devices within a system operative to facilitate coupling of one or more signals from a first computing device via a user to a second computing device in accordance with the present invention.

FIG. 25 is a schematic block diagram of another embodiment 2500 of computing devices within a system operative to facilitate coupling of one or more signals from a first computing device via a user to a second computing device in accordance with the present invention. This diagram has similarities to the previous diagram with at least one difference being that the computing device 2420 includes one or more buttons implemented thereon. For example, the computing device 2420 includes a button 2523 that is configured to produce an couple one or more signals into the user's body. In some examples, the button 2523 includes a hard button on the computing device 2420 (e.g., such as having similar shape, style, etc., such as a power on or off button, a volume up or down button, a display intensity increase or decrease button, a dimmer button, and/or any other button of the computing device 2420, etc.).

As the user interacts with the button 2523 of the computing device 2420 (e.g., by touching the button 2523 of the computing device 2420 with a finger, a thumb, a hand, a stylus, an e-pen, etc. or alternatively being within sufficiently close proximity to the button 2523 of the computing device 2420 as to facilitate coupling from the button 2523 of the computing device 2420 into the body of the user), one or more signals is coupled into the body of the user. These signal(s) are coupled into user's body. This may be performed via finger, hand, stylus, e-pen, etc. being in contact with (or sufficiently close to) the button 2523 of the computing device 2420.

In an example of operation and implementation, an application, an "app," is opened by the user on the computing device 2420 based on the user appropriately interacting with the computing device 2420 (e.g., pressing the button 2523 of the computing device 2420, by pressing an icon that is associated with the application that is displayed on the display 2422 of the computing device 2420, etc.), and the initiation of the operation of such an application operates to produce one or more signals that is coupled via the button 2523 of the computing device 2420 into the body of the user.

In certain examples, one or more signal generators, signal generation circuitry, and/or one or more processing modules implemented is connected to or communicatively coupled to the button 2523 and is operative to generate one or more signals to be coupled from a first computing device via a user to a second computing device. For example, a signal generator may be coupled to the button 2523, a signal generator may be implemented in computing device 2420 near button 2523. Alternatively, a signal generator may be implemented any other location on device 2420 (e.g., frame, ground plane, etc.) For example, based on operation of the application, the one or more signal generators and/or one or more processing modules is configured to generate one or more signals that are coupled to the button 2523, and when a user is in contact with the button 2523 or within sufficient proximity to the button 2523 so as to facilitate coupling of those signals from the computing device that includes button 2523 to the user, then one or more signals that are associated with the button 2523 are be coupled from the computing device that includes the button 2523 via the user to another computing device.

Then, based on operation of the application, one or more signals associated with the image 2421 or coupled into the user's body via the button 2523, through the user's body, and are coupled into one or more of the electrodes 85 of the touchscreen display with sensors 80 of the computing device 2424. One or more DSCs 28 of the computing device 2424 is configured to detect the one or more signals associated with the image 2421 that have been generated within the computing device 2420 and coupled via the user's body to the into one or more of the electrodes 85 of the touchscreen display with sensors 80 of the computing device 2424. These signal(s) are coupled from the user's body to electrode(s) 85 of the touchscreen display with sensors 80. This may be performed via finger, hand, stylus, e-pen, etc. being in contact with (or sufficiently close to) to electrode(s) 85.

In addition, while the use of a button 2523 is used in certain examples herein, note that any desired element or component of the computing device 2420 may alternatively be the means via which one or more signals is coupled into the user. For example, one or more signals that may be generated by any one or more signal generators, signal generation circuitry, etc. such as one or more processing modules 42, a controller, an integrated circuit, an oscillator, etc. may be coupled into the user using any desired component of the computing device 2420 that may be located at any desired location on the computing device 2420 such as a button of the device, the frame of the device, a ground plane of the device, and/or some other location on the computing device 2420, etc.

Several of the following diagrams show various the embodiments, examples, etc., by which information may be conveyed from the first computing device to a second computing device via a user. In some instances, different information is provided via different images, buttons, pathways via the user, etc.

Figure 26:
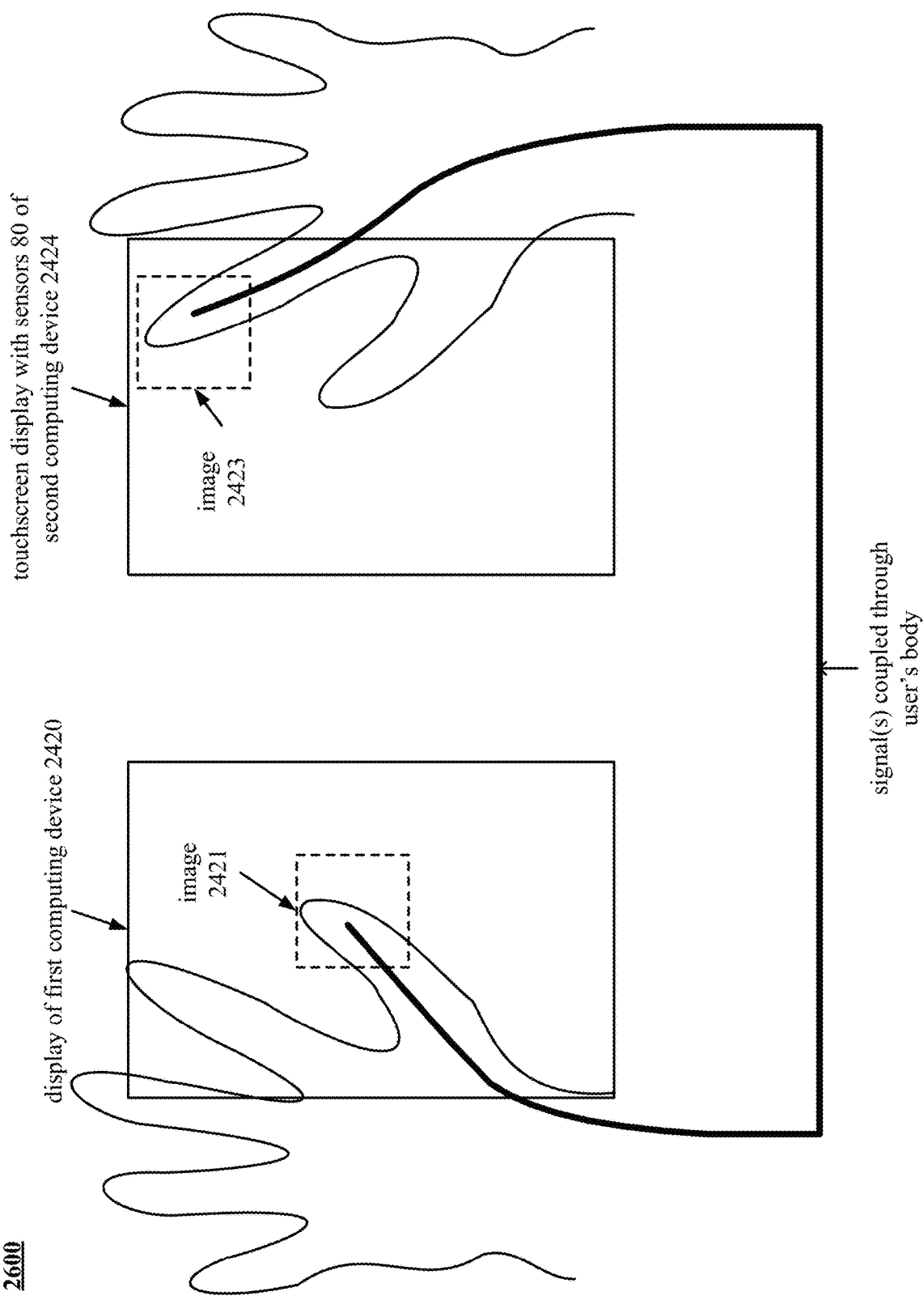
FIG. 26 is a schematic block diagram of an embodiment of coupling of one or more signals from a first computing device, such as from an image displayed by the computing device, via a user to a second computing device in accordance with the present invention.

FIG. 26 is a schematic block diagram of an embodiment 2600 of coupling of one or more signals from a first computing device, such as from an image displayed by the computing device, via a user to a second computing device in accordance with the present invention. This diagram shows a left-hand and right-hand of the user that are respectively interacting with the first computing device 2420 and a second computing device 2424. Note that the first computing device 2420 may be a portable device, stationary device, etc., and the second computing device 2424 may be a portable device, stationary device, etc. On a display (or alternatively a touchscreen display with sensors 80 of first computing device 2420) of the first computing device 2420, an image 2421 is being displayed, and a thumb of the user is shown as being in contact with or within sufficient proximity of the image 2421 as to facilitate coupling of one or more signals associated with the image 2421 into the user's body. The signals are coupled through the user's body (e.g., via a digit of the user, such as a thumb of the user as shown in the second, and into the body of the user). The signals are coupled through the user's body and also into a touchscreen display with sensors 80 of the second computing device 2424. In some instances, a particular image 2423 is displayed on the touchscreen display with sensors 80 of the second computing device 2424, and the user is in contact with or within sufficient proximity of the image 2423 as to facilitate coupling of the one or more signals associated with the image 2421 that have been coupled through the user's body into a portion of the touchscreen display with sensors 80 of the second computing device 2424 and specifically in a location of the image 2423. For example, these signals are coupled out of the user's body via a user's digit to electrode(s) 85 (touch sensors, touchscreen, etc.).

In an example of operation and implementation, consider electrodes 85 that have at least portions thereof underneath the portion of the touchscreen display with sensors 80 that is displaying the image 2423. Those particular electrodes 85 are configured to detect the one or more signals associated with the image 2421 that have been coupled through the user's body into a portion of the touchscreen display with sensors 80 of the second computing device 2424 and specifically in a location of the image 2423. In this example, note that a particular portion of the touchscreen display with sensors 80 of the second computing device 2424, specifically that associated with the image 2423, is the area within which the one or more signals associated with the image 2421 that have been coupled through the user's body are targeted. Note that the image 2423 may be associated with any of a number of items, such as an application being run on the computing device 2424, a particular object that is displayed pictorially (e.g., such as using a photo, a character, an emoji, textual description, or some other visual indicator of a particular object) and that is selected by the user on the touchscreen display with sensors 80 of the second computing device 2424. This example corresponds to an embodiment by which information is conveyed from the first computing device 2420 to a specific area or location of the second computing device 2424.

In other examples, note that the user is in contact with or within sufficient proximity of the computing device 2424 as to facilitate coupling of those one or more signals associated with the image 2421 that have been coupled through the user's body to any of the electrodes 85 that are implemented within the touchscreen display with sensors 80 of the second computing device 2424. For example, there may be instances in which the coupling of the one or more signals associated with the image 2421 that have been coupled through the user's body to any portion of the second computing device 2424 is sufficient as to facilitate communication and to convey information from the first computing device 2420 to the second computing device 2424.

In addition, with respect to this diagram and others herein, note that the location of an image, such as image 2421, may be made based on the operation of the first computing device 2420 itself, or based on detection of a touch of a user on a touchscreen of the first computing device 2420 (or detection of a user be in within sufficient proximity of the touchscreen of the first computing device 2420). In some examples, the image 2421 is placed at a particular location based on operation of the first computing device 2420 without consideration of user interaction with the touchscreen of the first computing device 2420. Consider the image 2421 being displayed on a display of the first computing nice 2420, and the user interacts with that image by touching, or coming within sufficiently close proximity to the image 2420, as to facilitate coupling of one or more signals associated with the image 2421 into the user's body.

In other examples, the touchscreen of the first computing device 2420 detects the presence of the user, and the display of the first computing device 2420 displays the image 2421 at a location associated with the presence of the user with respect to the touchscreen of the first computing device 2420. For example, as the user interacts with the touchscreen of the first computing device 2420 (e.g., at any desired particular location on the entirety of the touchscreen of the first computing device 2420), the display then displays the image 2421 at a location that corresponds to where the user is interacting with the touchscreen of the first computing device 2420.

Figure 27:
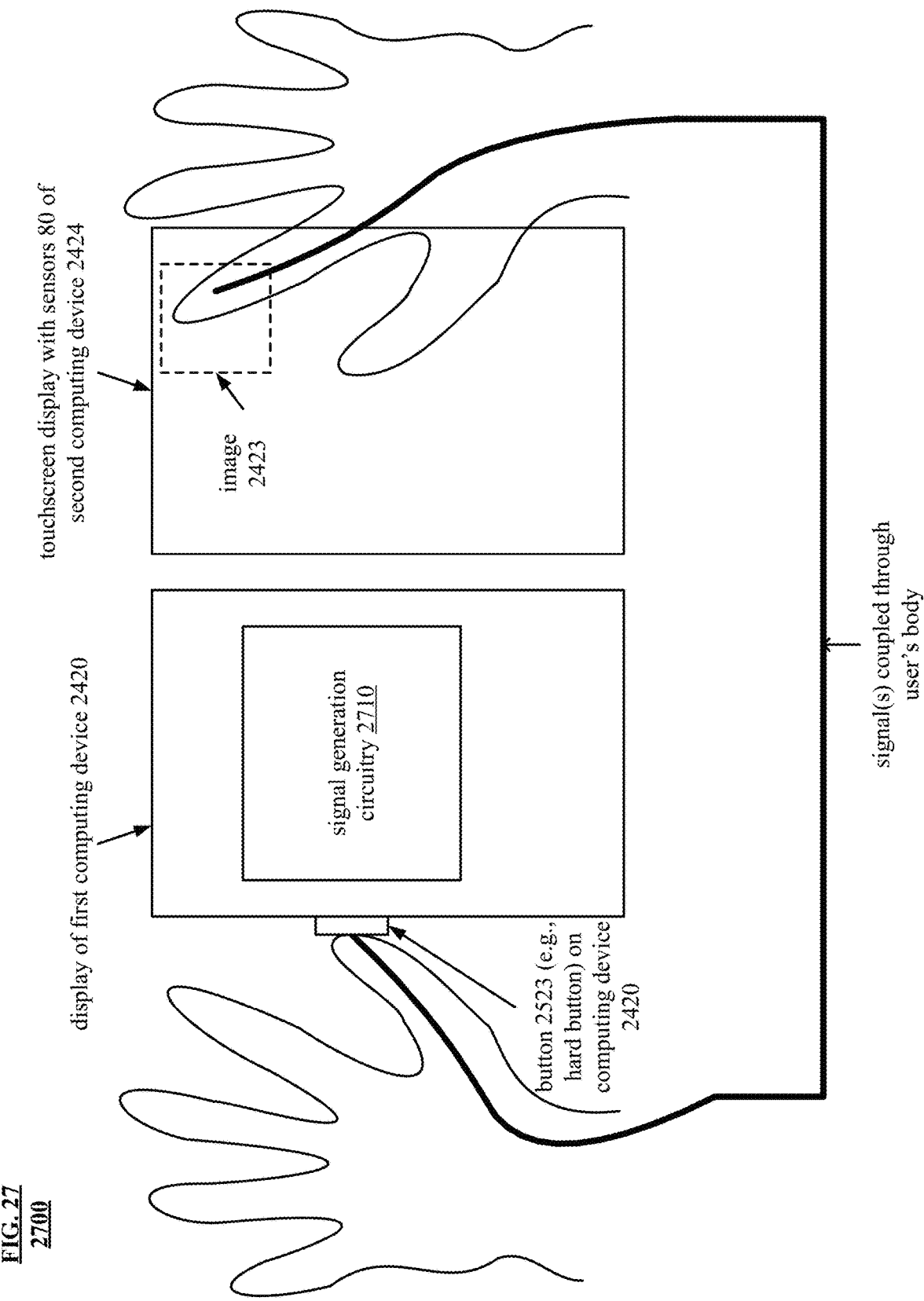
FIG. 27 is a schematic block diagram of an embodiment of coupling of one or more signals from a first computing device, such as from a button of the computing device, via a user to a second computing device in accordance with the present invention.

FIG. 27 is a schematic block diagram of an embodiment 2700 of coupling of one or more signals from a first computing device, such as from a button of the computing device, via a user to a second computing device in accordance with the present invention. This diagram is similar to the prior diagram with at least one difference being that the button 2523 that is implemented on the computing device 2420 is the pathway via which one or more signals are coupled from the first computing device 2420 to the second computing device 2424 via the user. In this example, a portion of the user is in contact with or within sufficient proximity of the button 2523 of the computing device 2420 as to facilitate coupling of those one or more signals from the button 2523 into the user body (e.g., in this diagram, particularly shown as the thumb of the user, though any portion of the user's body may alternatively be used such as a different digit of the user, another bodily portion of the user, etc.).

Certain of the following diagrams show different embodiments, examples, etc. by which one or more signals may be coupled into or out of a user via one or more respective pathways and based on one or more respective images, buttons, etc. Note that while certain of the examples show one or more signals being coupled into a user's body from the first computing device 2420, note that the complementary operation of one or more signals being coupled from the user's body into the first computing device 2420 may alternatively be performed in different examples. Also, note that while many of the examples use the first computing device 2420, another computing device such as a second computing device 2424 may alternatively be implemented to facilitate similar operation.

In this example, the first computing device 2420 includes signal generation circuitry 2710. For example, such signal generation circuitry 2710 may be implemented using any one or more components capable of generating one or more signals that may be coupled into a user of the first computing device 2420 at one or more locations on the first computing device 2420. Examples of such signal generation circuitry 2710 may include any one or more of controller circuitries of the first computing device 2420 (e.g., such as a first controller circuitry implemented to control display operations of a display 83 and a second controller circuitry implemented to control touchscreen operations within a touchscreen display with sensors 80). In some examples, the signals from the signal generation circuitry 2710 are coupled to a location on first computing device 2420, e.g., button, frame, ground plane, etc.

Additional examples of such signal generation circuitry 2710 may include processing module(s) of various types within the first computing device 2420. Examples of such processing module(s) may include one or more processing modules 42 implemented to control both the display operations and touch sensing operations within a touchscreen display with sensors 80, a touchscreen processing module 82 implemented to control only the touch sensing operations within a touchscreen display with sensors 80, and/or more processing modules 42 and/or a video graphics processing module 48 implemented to control only the display operations within a touchscreen display with sensors 80, etc. such as described with reference to FIG. 14 and FIG. 15.

Other examples of such signal generation circuitry 2710 may include one or more DSCs 28 that are coupled respective to one or more electrodes 85 of a touchscreen display with sensors. For example, a DSC 28 is configured to operate as signal generation circuitry 2710 that is operative to generate and transmit one or more signals that may be coupled into a user of the first computing device 2420 at one or more locations on the first computing device 2420 (e.g., via one or more electrodes 85 of the touchscreen). In some examples, multiples DSCs 28 are configured to operate as signal generation circuitry 2710 that is operative to generate and transmit one or more signals that may be coupled into a user of the first computing device 2420 at one or more locations on the first computing device 2420 (e.g., via one or more electrodes 85 of the touchscreen).

Even other examples of such signal generation circuitry 2710 may include an oscillator, a mixer, etc. and/or any other circuitry operative to generate a signal may be used within the first computing device 2420. In even other examples, the hardware components of a display of the first computing device 2420 that operative to render the one or more images on a display 83 of the first computing device 2420 constitute the generation circuitry 2710 (e.g., such as the gate lines, the data lines, the sub-pixel electrodes, etc. of the display 83 are the signal generation circuitry 2710 that is configured to generate the one or more signals to be coupled into the user's body).

Also, the one or more signals generated by the signal generation circuitry 2710 may have any of a variety of forms. For example, the one or more signals may include signals having a DC component and/or an AC component. Note that the AC component may have any desired waveform shape including sinusoid, sawtooth wave, triangular wave, square wave signal, etc. among other waveform shapes.

In addition, regardless of the manner or mechanism by which the one or more signals are generated, such one or more signals may be coupled into the user using any desired location of the first computing device 2420 (e.g., a button, frame, ground plane, and/or some other location on the first computing device 2420, etc.).

Figure 28B:
FIG. 28B is a schematic block diagram of an embodiment of coupling of one or more signals from a computing device via a user, or alternatively, from a user into a computing device, in accordance with the present invention.
Figure 28A:
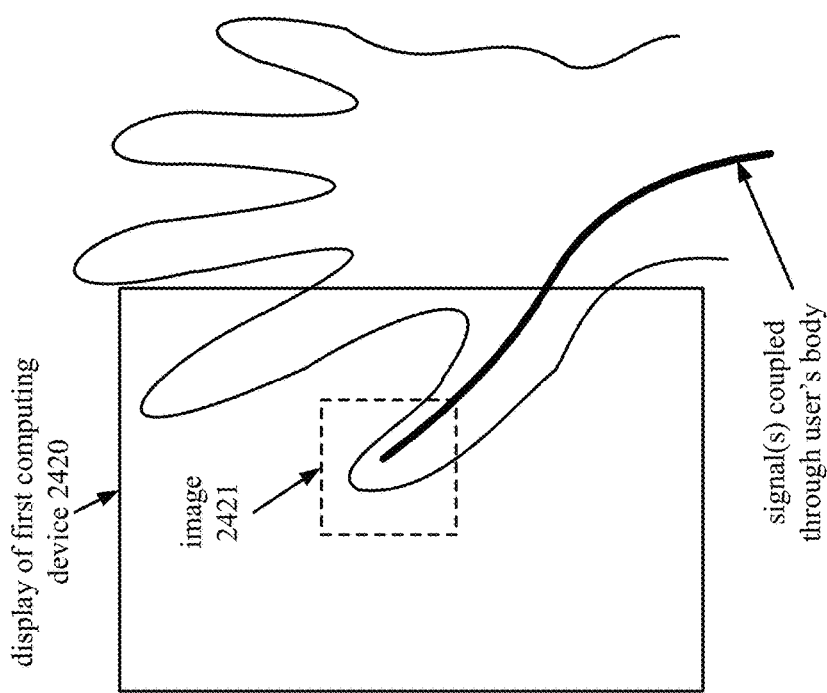
FIG. 28A is a schematic block diagram of an embodiment of coupling of one or more signals from a computing device via a user, or alternatively, from a user into a computing device, in accordance with the present invention.

FIG. 28A is a schematic block diagram of an embodiment 2801 of coupling of one or more signals from a computing device via a user, or alternatively, from a user into a computing device, in accordance with the present invention. In this diagram, an image 2421 is shown as being displayed on a display of the first computing device 2420. Note that the first computing device 2420 may be a portable device, a stationary device, etc. Also, in alternative examples, the image 2421 displayed on a touchscreen display with sensors 80 of first computing device 2420. One or more signals associated with the image 2421 is coupled into and through the user's body based on at least a portion of the user's body being in contact with or within sufficient proximity of the image 2421 as to facilitate coupling of the one or more signals associated therewith into the user's body. This diagram shows one or more signals being coupled into the users body from a sub-portion of the display of the first computing device 2420 that is less than the entirety of the display of the first computing device 2420. Incidentally, that particular sub-portion of the display of the first computing device 2420 is associated with an image 2421 that is being displayed on the display of the first computing device 2420.

FIG. 28B is a schematic block diagram of an embodiment 2802 of coupling of one or more signals from a computing device via a user, or alternatively, from a user into a computing device, in accordance with the present invention. In this diagram, any image 2425 is shown as being displayed on the entirety of the display of the first computing device 2420. Note that the first computing device 2420 may be a portable device, a stationary device, etc. Also, in alternative examples, an image is displayed on an entirety of a touchscreen display with sensors 80 of the first computing device 2420 (e.g., image 2425 displaying on entire display). One or more signals associated with the image 2425 that occupies the entirety of the display of the first computing device 2420 is coupled into and through the user's body based on at least a portion of the user's body being in contact with or within sufficient proximity of the image 2425 as to facilitate coupling of the one or more signals associated therewith into the user's body.

As can be seen in this diagram, three respective digits of a hand of the user are shown as being in contact with or within sufficient proximity of the image 2425 as to facilitate coupling of the one or more signals associated with the image 2425 into the user's body, and similar information associated with the image 2425 is transmitted via a different respective pathways associated with the three respective digits of the hand of the user. This diagram shows an example where one or more signals are coupled through two or more pathways associated with the user (e.g., a first pathway associated with coupling of one or more signals via a first digit of a hand of user, a second passageway associated with coupling of one or more signals via a second digit of the end of the user, etc.). Such an application may be desirable in certain instances where one or more backup pathways or redundancy of coupling similar information is used to improve the overall performance of the system. For example, consider an example during which there has been a detective failure or poor performance of coupling of one or more signals via the user. Such an implementation of providing multiple respective pathways via the user is operative to provide for redundancy and backup to ensure effective coupling of the one or more signals into the users body.

FIG. 29A is a schematic block diagram of an embodiment 2901 of coupling of one or more signals from a computing device via a user, or alternatively, from a user into a computing device, in accordance with the present invention. This diagram shows two different respective images 2421 and 2421-1 that are being displayed on the display of the first computing device 2420. Note that the first computing device 2420 may be a portable device, a stationary device, etc. Also, in alternative examples, two different respective images 2421 and 2421-1 are displayed on an a touchscreen display with sensors 80 of the first computing device 2420. Generally speaking, note that the different respective images 2421 and 2421-1 may or may not have similar characteristics, sizes, shapes, etc. Generally speaking, the different respective images may be of any desired size, shape, location, etc. with respect to the display of the first computing device 2420.

In an example of operation and implementation, a first one or more signals are coupled into the user's body based on a first portion of the user's body being in contact with or within sufficient proximity to the image 2421, and a second one or more signals are coupled into the user's body based on a second portion of the user's body being in contact with or within sufficient proximity to the image 2421-1. For example, consider that the first digit of the user is in contact with or within sufficient proximity to the image 2421 as to facilitate coupling of the first one or more signals associated with the image 2421 into the user's body. Similarly, consider that the second digit of the user is in contact with or within sufficient proximity to the image 2421-1 as to facilitate coupling of the second one or more signals associated with the image 2421-1 into the user's body.

Note that different respective information may be conveyed using the first one or more signals and the second one or more signals in accordance with conveying information from a first computing device 2420 to another computing device such as a second computing device 2424.

FIG. 29B is a schematic block diagram of another embodiment 2902 of coupling of one or more signals from a computing device via a user, or alternatively, from a user into a computing device, in accordance with the present invention. This diagram shows, with respect to a hand of the user, five different respective images 2421, 2421-1, 2421-2, 2421-3, and 2421-4 that are being displayed on the display of the first computing device 2420. Note that the first computing device 2420 may be a portable device, a stationary device, etc. Also, in alternative examples, five different respective images 2421, 2421-1, 2421-2, 2421-3, and 2421-4 are displayed on an a touchscreen display with sensors 80 of the first computing device 2420. Again, note that each of these different respective images 2421-1 made have one or more similar characteristics, sizes, shapes, etc. and/or may also have one or more different characteristics, sizes, shapes, etc.

In an example of operation and implementation, a first one or more signals are coupled into the user's body based on a first portion of the user's body being in contact with or within sufficient proximity to the image 2421, a second one or more signals are coupled into the user's body based on a second portion of the user's body being in contact with or within sufficient proximity to the image 2421-1, a third one or more signals are coupled into the user's body based on a third portion of the user's body being in contact with or within sufficient proximity to the image 2421-2, a fourth one or more signals are coupled into the user's body based on a fourth portion of the user's body being in contact with or within sufficient proximity to the image 2421-3, and a fifth one or more signals are coupled into the user's body based on a fifth portion of the user's body being in contact with or within sufficient proximity to the image 2421-4.

For example, consider that the first digit (e.g., thumb) of the user is in contact with or within sufficient proximity to the image 2421 as to facilitate coupling of the first one or more signals associated with the image 2421 into the user's body. Similarly, consider that the second digit (e.g., index finger) of the user is in contact with or within sufficient proximity to the image 2421-1 as to facilitate coupling of the second one or more signals associated with the image 2421-1 into the user's body.

Also, consider that the third digit (e.g., middle finger) of the user is in contact with or within sufficient proximity to the image 2421-2 as to facilitate coupling of the second one or more signals associated with the image 2421-2 into the user's body, consider that the fourth digit (e.g., ring finger) of the user is in contact with or within sufficient proximity to the image 2421-3 as to facilitate coupling of the second one or more signals associated with the image 2421-3 into the user's body, and consider that the fifth digit (e.g., small/pinky finger) of the user is in contact with or within sufficient proximity to the image 2421-4 as to facilitate coupling of the second one or more signals associated with the image 2421-4 into the user's body. As can be seen, different respective signals, information, etc. may be coupled via different respective pathways.

In some examples, at least some of the respective signals that are coupled into the user's body are differentiated by one or more characteristics. For example, in some examples, each respective signal that is coupled into the user's body (e.g., from each respective image, button, signal generator, signal generation circuitry, etc.) is differentiated based on one or more properties and/or characteristic that may include any one or more of frequency, amplitude, DC offset, modulation, forward error correction (FEC)/error checking and correction (ECC) type, type, waveform shape, phase, etc. among other signal properties and/or characteristic by which signals may be differentiated.

In some alternative examples, the signals that are coupled into the user's body (e.g., from each respective image, button, signal generator, signal generation circuitry, etc.) include one or more common property and/or characteristic (e.g., at least one of a same frequency, amplitude, DC offset, modulation, FEC/ECC type, type, waveform shape, phase, etc., among other signal properties and/or characteristic). In such examples, note that the signals may also be differentiated based on one or more other of such properties and/or characteristic. For example, more than one of the signals may have a common frequency, yet be of different modulation type. Generally speaking, any combination of one or more common properties and/or characteristic and one or more different property properties and/or characteristic may be used with respect to the different signals that are coupled into the user's body (e.g., from each respective image, button, signal generator, signal generation circuitry, etc.).

An even other alternative examples, different respective sets of signals that are provided from different sources (e.g., from different respective images, buttons, signal generators, signal generation circuitries, etc.) include one or more common property and/or characteristic (e.g., at least one of a same frequency, amplitude, DC offset, modulation, FEC/ECC type, type, waveform shape, phase, etc., among other signal properties and/or characteristic). For example, consider a first set of signals provided from a first source (e.g., from a first image, a first button, a first signal generator, first signal generation circuitry, etc.) having the at least one of a same first at least one property or characteristic (e.g., a first frequency and/or first amplitude, etc.). Also, consider a second set of signals provided from a second source (e.g., from a second image, a second button, a second signal generator, second signal generation circuitry, etc.) having the at least one of a same second at least one property or characteristic (e.g., a first frequency and/or first amplitude, etc. that is different from a second frequency and/or second amplitude, etc.).

In some examples, different signals provided to different respective sources (e.g., from different respective images, buttons, signal generators, etc.) may include one or more common property and/or characteristic without deleteriously affecting the performance of one another. For example, consider the sources (e.g., from different respective images, buttons, signal generators, signal generation circuitries, etc.) of such signals provided being of sufficiently far distance away from one another that they may be appropriately differentiated from one another (e.g., buttons on the device being sufficiently far away from one another so as not adversely to affect one another, such as when using sufficiently low power that both of the signals having one or more common property and/or characteristic would not adversely affect one another, images displayed on a display of a device being sufficiently far away from one another so as not adversely to affect one another, etc.).

Also, as shown with respect to certain of the previous diagram and others herein, different respective images may be used to convey different information from a first computing device to a second computing device via a user. Similarly, note that different respective buttons (e.g., different respective hard buttons on the first computing device) may similarly be used to convey different information from a first computing device to a second computing device via a user has different respective images may be used to convey different information from a first computing device to a second computing device via a user (e.g., a first button implemented to convey a first one or more signals including first information, a second button implemented to convey a second one or more signals including second information, etc. such that a user may be in contact with or within sufficient proximity as to facilitate coupling into the user's body of signals from both the first button and the second button).

Also, generally speaking, noted that any one signal that is coupled into user's body may be a combination of any two or more signals. For example, a first signal and a second signal may be combined with one another to generate a third signal that is coupled into the user's body. In other examples, a first signal and a second signal may be mixed (e.g., such as in accordance with frequency conversion, frequency shifting, etc.) to generate a third signal that is coupled into the user's body.

Moreover, as described elsewhere herein, with respect to the capability of a DSC 28 and its ability to detect one or more additional signals that may be coupled into an electrode 28, such as within a touchscreen display with sensors 80 of a recipient computing device, such as a second computing device 2420, any number of different respective signals may be coupled from the first computing device 2420 to a second computing device 2424 via the user's body thereby facilitating simultaneous, parallel, etc. communication of information from the first computing device 2420 to the second computing device 2424. Note that other examples may operate by performing communication in a serial, sequential, etc manner as well, and/or any combination of simultaneous, parallel, etc. communication and serial, sequential, etc. communication.

Certain of the following diagrams describe various embodiments, examples, etc. by which data may be conveyed based on signals that are generated by using one or more signal generators, signal generation circuitries, etc. within the computing device, one or more images displayed on the display of the computing device, etc. In some examples, different respective display scanning frequency patterns are used to convey data. With respect to conveying digital information, some examples operate by designating one particular image and the associated one or more signals generated thereby to correspond to one particular logical value (e.g., logical 0) and another particular image and the associated one or more signals generated thereby correspond to another particular logical value (e.g., logical 1). Displaying such images on the display of the computing device, and using the one or more signals generated by the display of the computing device when displaying such images, may be performed to facilitate communication of digital information (e.g., 0s and/or 1s). In even other examples, the display scanning frequency pattern itself is used to convey digital information within a particular image such that display of an image on the display of the computing device itself, and using the one or more signals generated by the display of the computing device when displaying such an image, may be performed to facilitate communication of digital information (e.g., one or more 0s and/or one or more 1s).

Figure 29C:
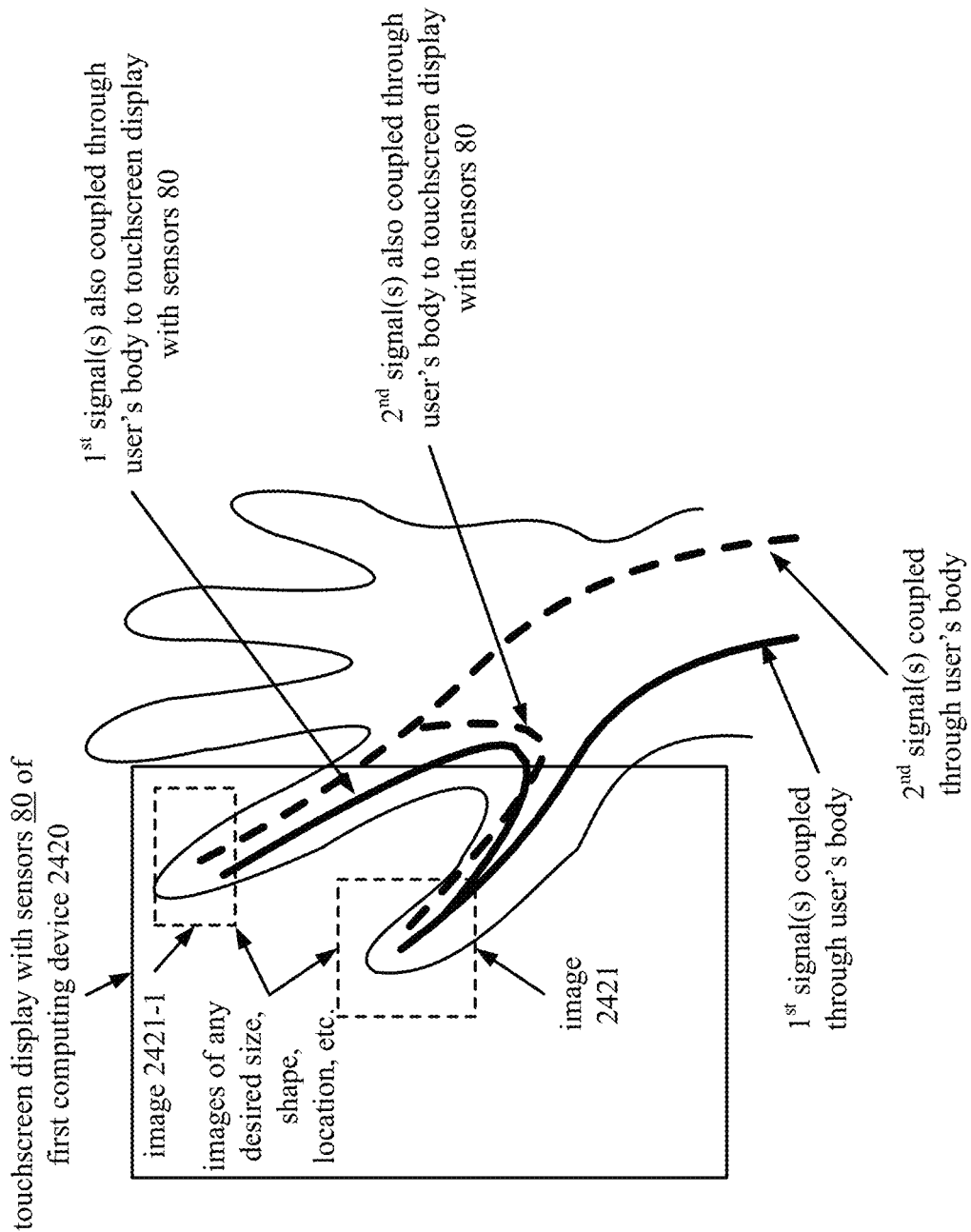
FIG. 29C is a schematic block diagram of another embodiment of coupling of one or more signals from a computing device via a user, or alternatively, from a user into a computing device, in accordance with the present invention.

FIG. 29C is a schematic block diagram of another embodiment 2903 of coupling of one or more signals from a computing device via a user, or alternatively, from a user into a computing device, in accordance with the present invention. This diagram has some similarities to FIG. 29A with at least one difference being that the first computing device 2420 in this diagram does include touchscreen functionality. For example, the first computing device 2420 includes a touchscreen display with sensors 80 in this diagram. Note that the first computing device 2420 may be a portable device, a stationary device, etc. For example, the first computing device 2420 includes capability similar to that described with reference to computing device 2424, such as with respect to FIG. 24, among others. This diagram also shows that, when a user is in contact with, or within sufficiently close proximity to, the touchscreen of the first computing device 2420, as to facilitate interaction with the touchscreen of the device (e.g., touch detection, coupling of signals into or out of the user's body, etc.).

With respect to the first one or more signals that are coupled through the user's body, note that those first one or more signals are also coupled through the user's body to the one or more other user locations in which the user is interacting with the touchscreen. For example, this coupling may be made based on the user being in contact with or sufficiently close to the touchscreen display with sensors 80. That is to say, not only are the first one or more signals coupled into the user's body and through the user's body such as to another computing device, such as a recipient computing device, but those same first one or more signals are also coupled through the user's body back to the touchscreen of the first computing device 2420.

Similarly, with respect to the second one or more signals that are coupled through the user's body, note that those second one or more signals are also coupled through the user's body to the one or more other user locations in which the user is interacting with the touchscreen. For example, this coupling may be made based on the user being in contact with or sufficiently close to the touchscreen display with sensors 80. That is to say, not only are the second one or more signals coupled into the user's body and through the user's body such as to the other computing device, such as a recipient computing device, but those same second one or more signals are also coupled through the user's body back to the touchscreen of the first computing device 2420.

As such, in certain examples, when a user is interacting with the touchscreen of the first computing device 2420 and has multiple touch points (or multiple portions of the user's body that are within sufficiently close proximity to the touchscreen), then one or more signals that are coupled into the user via these one or more locations are also coupled through the user's body back to the touchscreen of the first computing device 2420. As such, one or more processing modules 42 that is operative to service the sensors 80 of the touchscreen, such as using one or more DSCs 28, is also operative to identify which touches are associated with a particular user. For example, the first computing device 2420 will have knowledge regarding which particular signals are being coupled into the user's body, and consequently, the first computing device 2420 will also be able to detect those same signals, having knowledge of them, as they are coupled back through the user's body into the touchscreen of the first computing device 2420.

Note that while this diagram shows the user having to touch points (or two portions of the user's body that are within sufficiently close proximity to the touchscreen), the same principle extend to three or more locations in which a user may be interacting with the touchscreen. For example, consider a user touching the touchscreen using three digits, four digits, all five digits including the thumb, etc. When a signal is coupled into the user's body via one of these portions of the user's body, that same signal will also be coupled back through the user's body at the other locations at which the user is interacting with the touchscreen.

In addition, based on this principle of operation including coupling of signals from the touchscreen into the user's body and back to the touchscreen via another portion of the user's body facilitates discrimination between different respective users that may be interacting with the touchscreen of the first computing device 2420. For example, the identification of which particular touches are associated with a particular user may be made based on knowledge of the signals that are being provided via the first computing device 2420. Similarly, when more than one user is interacting with the touchscreen of the first computing device, based on knowledge of the signals that are being provided via the first computing device 2420 into the multiple users, and knowing which particular touches are associated with a particular user, the first computing device 2420 is been able to discriminate which touches are associated with which particular user. This is based on knowledge of which particular signals are being coupled into the user touches and detection of those signals that are being coupled back into the touchscreen.

Figure 30:
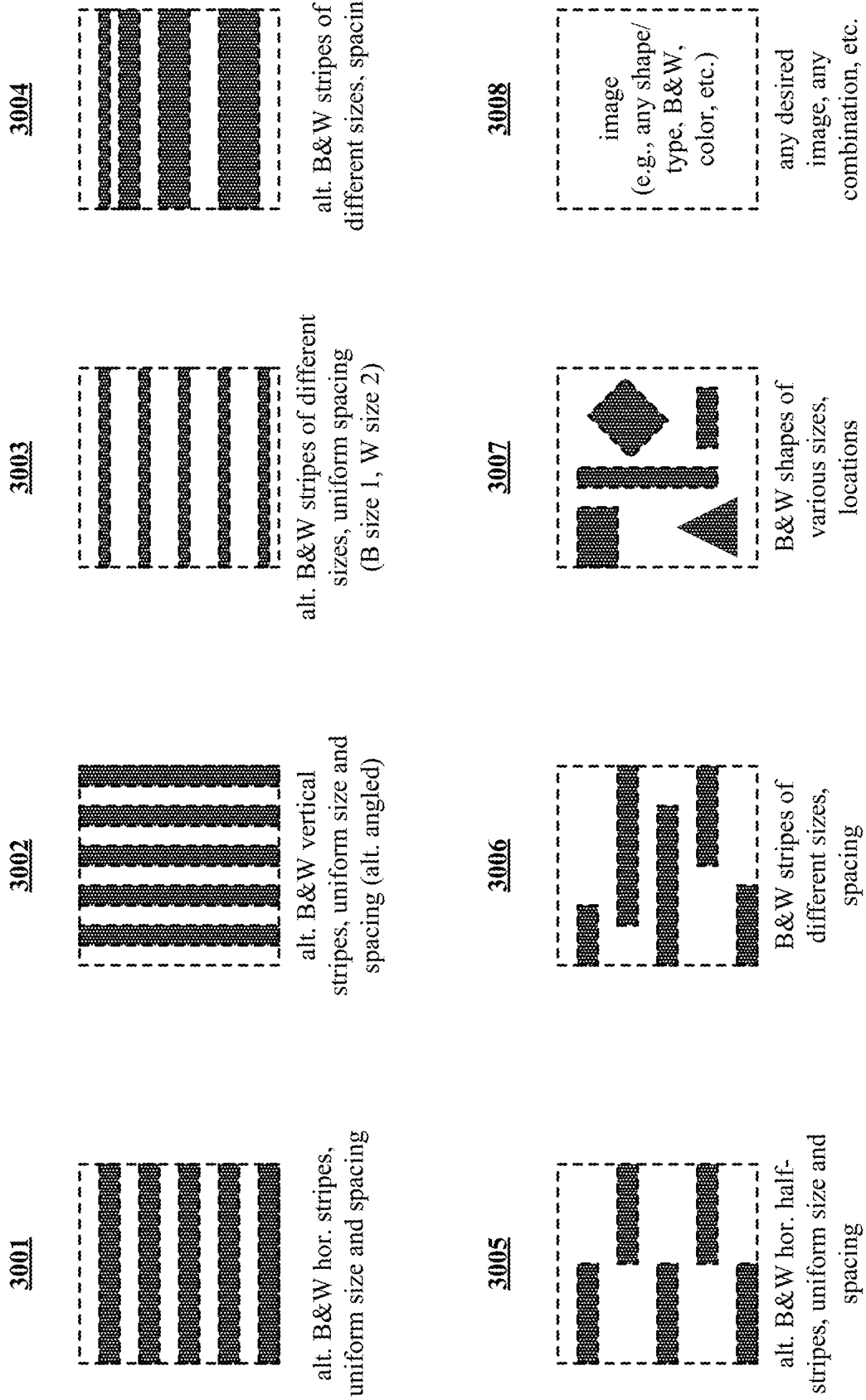
FIG. 30 is a schematic block diagram of various examples of images that may be displayed on a display of a computing device to generate one or more signals that may be implemented to facilitate coupling of those one or more signals from a computing device via a user in accordance with the present invention.

FIG. 30 is a schematic block diagram of various examples 3001, 3002, 3003, 3004, 3005, 3006, 3007, and 3008 of images that may be displayed on a display of a computing device to generate one or more signals that may be implemented to facilitate coupling of those one or more signals from a computing device via a user in accordance with the present invention. This diagram shows examples of images to generate signals to convey data. this may be performed using any combination of one or more parameters: size, frequency, pattern, periodicity, sub-multiple of gate scanning frequency, multiple of frame refresh rate (FRR), # of frames image displayed [1, 2, . . . ], B&W, non-B&W/color, QR code, etc.). Generally speaking, any desired type of image, bar code, QR code, etc. may be implemented based on one or more characteristics such as black-and-white, color, shape, type, size, content, etc. and may be used to convey information via one or more signals that is coupled into user from a display of a computing device. As also described elsewhere herein, when a display such as within a computing device is operative to produce one or more images thereon, the hardware components of the computing device generate various signals to effectuate the rendering of the one or more images on the display of the computing device. Such hardware components of the computing device, based on their operation to render the one or more images on the display the computing device (e.g., such as the gate lines, the data lines, the sub-pixel electrodes, etc. of the display are the signal generation circuitry that is configured to generate the one or more signals to be coupled into the user's body). Note that different respective images generate different respective signals. The differentiation, uniqueness with respect to one another, difference, etc. of the different respective signals that may be generated by different respective images may be as varied as the differentiation, uniqueness with respect to one another, difference, etc. of those different respective images themselves.

In certain examples, note that images that produce signals that are more easily detected by a computing device that includes touchscreen with a display with sensors 80 are chosen so as to facilitate improved performance of the overall system by which signals are coupled via a user's body from a first computing device to a second computing device. For example, consider a second image that is a duplicate of a first image with a difference of color, intensity, etc. value of only one pixel. The detection and differentiation of such a first image and a second image made the difficult in certain implementations. However, consider a second image that is vastly different from the first image with respect to one or more characteristics such as black and white ratio, color, content, etc., then detection and differentiation of such a first image and a second image that are vastly different from one another may be more easily performed in certain implementations. This diagram shows different respective examples of images that may be used to generate signals using the hardware components of the computing device that operates to generate and render the one or more images on the display of the computing device. It is the hardware components of the computing device themselves including those hardware components of a display (e.g., such as the gate lines, the data lines, the sub-pixel electrodes, etc.) that serve as the signal generation circuitry that is configured to generate the one or more signals to be coupled into the user's body.

Note that such examples are not exhaustive, and as can be seen with respect to image 3008, an image may generally have any one or more characteristics including any one or more of shape/type, black-and-white, color, etc. and made also include any combination of such one or more characteristics.

In certain examples with respect to the various images that are described herein, consider the implementation of FIG. 19 that includes a number of pixels composed of RGB sub-pixels arranged in a row and column format.

In addition, with respect to reference regarding horizontal and vertical, or row and column, note that with respect to matrix addressed displays, consider the display having at length and height. Generally speaking, with respect to the layout of gate lines and data lines, the gate lines are generally implemented along the longer axis. For example, consider a desktop computer or a laptop computer where the width axis of the display is relatively less than the height axis of the display. In such instances, the gate lines will typically be implemented along the long axis, or the horizontal axis of the display, and the data lines will typically be implemented along the shorter access, or the vertical axis of the display.

However, with respect to certain other devices, such as portable devices including smart phones, etc. may alternatively include a width axis of the display is relatively greater than the height axis of the display. In such instances, the gate lines will typically be implemented along the long axis, or the vertical axis of the display, and the data lines will typically be implemented along the shorter access, or the horizontal axis of the display.

Generally speaking, any reference to horizontal, vertical, etc. with respect to any images may generally be viewed as being based on any particular axis of a display, whether the bottom, the left, the top, the right. The orientation of such references to horizontal, vertical, etc. may be changed based on changing the orientation of the computing device that includes the display. For example, with respect to one particular orientation of the display of a device, horizontal and vertical may be understood with respect to one particular frame of reference. However, with respect to another particular orientation of that same display of that same device, horizontal and vertical may be understood with respect to another particular frame of reference. The use of such references as horizontal, vertical, etc. it is an illustration, and it is noted that horizontal in one implementation may be vertical based on a change orientation of the display of a device, and vice versa.

Image 3001 includes alternating black and white horizontal stripes of uniform size and spacing. As the image 3001 is generated by the hardware components of the computing device, a square wave signal will be generated having a frequency corresponding to the periodicity of the uniform size and spacing of the alternating black and white horizontal stripes based on the hardware components of the display generating this image. For example, consider that the hardware components of a display operate to provide a white colored pixel by driving the hardware to a maximum value (e.g., X volts, where X is the maximum voltage by which the hardware associated with the display may be driven) and to provide a black colored pixel by driving the hardware to a minimum value (e.g., 0 volts). Such an image may be generated by driving a certain number of rows of pixels composed of RGB sub-pixels to generate black and white horizontal stripes (e.g., Y rows of adjacent the located pixels to produce and display the color black, then the next Y rows of adjacently located pixels to produce and display the color white, and so on, such that Y is some desired number corresponding to the number of rows of pixels to provide the desired thickness of the black and white horizontal stripes).

Image 3002 is similar to the image 3001 with the difference being that image 3002 includes alternating black and white vertical stripes of uniform size and spacing. Alternatively, note that such alternating black and white stripes may alternatively be implemented in an angled implementation, such as extending from top left to lower right or top bottom left to upper right, according to any desired angle or trajectory.

Image 3003 includes alternating black and white horizontal stripes of different sizes, yet having uniform spacing between them. For example, consider that the black stripes have a certain size (e.g., size 1), and the White stripes have a different size (e.g., size 2). The corresponding signal that would be generated by such an image 3003 would be a modified square wave signal having unequal or asymmetrical maximum/minimum portions. For example, such a modified square wave signal would have a maximum value for relatively longer duration and the minimum value (e.g., the duration during which the modified square wave signal would be at the maximum value, e.g., X volts, to provide white colored pixels would be of relatively longer duration than the duration during which the modified square wave signal would be at the minimum value, e.g., 0 volts, to provide black colored pixels).

Note that a complementary type image corresponding to image 3003 may alternatively be implemented by replacing the white stripes with black stripes and the black stripes of white stripes to effectuate another modified square wave signal having unequal or asymmetrical maximum/minimum portions. For example, such a modified square wave signal would have a maximum value for relatively shorter duration and the minimum value (e.g., the duration during which the modified square wave signal would be at the maximum value, e.g., X volts, to provide white colored pixels would be of relatively shorted duration than the duration during which the modified square wave signal would be at the minimum value, e.g., 0 volts, to provide black colored pixels).

Image 3004 also includes alternating black and white horizontal stripes of not only different sizes, but also of non-uniform spacing between them. Generally speaking, the use of black and white horizontal stripes of any desired size, spacing, etc., may be used to generate modified square wave signals having any desired properties.

Moreover, it is noted that while certain of the examples described herein show alternating black and white stripes of various size, spacing, thickness, etc., note that any shade of grey or gray scale may also be used in accordance with generating such images. For example, consider image 3001 has generating a square wave signal having certain properties. In an alternative implementation, consider that a sinusoidal signal having certain properties is desired. In such an instance, instead of effectuating a rapid transition, such as a step function, when changing color from black to white, a gradual transition of white into grayscale then into black and out of black back into grayscale and into white may be used instead to facilitate a smoother transition and to effectuate a sinusoidal signal. Generally speaking, variation of the use of white, black, gray, maybe used to generate any number of different types of signals including a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component), etc.

In addition, note that such transition of color using white, black, and gray including various shades of gray scale, may be used to generate signals having any other desired properties and any other desired shape including sinusoid, sawtooth wave, triangular wave, square wave signal, etc. among the various desired waveform shapes.

Image 3005 includes alternating black and white horizontal half-stripes of uniform size and spacing. As can be seen in the diagram, the pattern is composed of alternating black and white horizontal half-stripes with white stripes. At the top of image 3005 is a white stripe extending across the entirety of the image 3005 from left to right. Moving down the image 3005 is a black and white horizontal half-stripes composed of black on the left-hand side and white on the right hand side. Moving down the image 3005 is another white stripe extending across the entirety of the image 3005 from left to right. Moving down the image 3005 is a black and white horizontal half-stripes composed of white on the left-hand side and black on the right hand side. The pattern repeats itself within the image 3005.

Image 3006 includes alternating black and white horizontal partial-stripes of uniform size and spacing. As can be seen in the diagram, the pattern is composed of alternating black and white horizontal partial-stripes with white stripes. At the top of image 3006 is a white stripe extending across the entirety of the image 3006 from left to right. Moving down the image 3006 is a black and white horizontal partial-stripe composed of black on a portion of the left-hand side and white on a portion of the right hand side, with the white portion being relatively larger than the black portion.

Moving down the image 3006 is another white stripe extending across the entirety of the image 3006 from left to right. Moving down the image 3006 is a black and white horizontal partial-stripe composed of white on a portion of the left-hand side and black on a portion of the right hand side, with the white portion being relatively smaller than the black portion.

Moving down the image 3006 is another white stripe extending across the entirety of the image 3006 from left to right. Moving down the image 3006 is yet another a black and white horizontal partial-stripe composed of black on a portion of the left-hand side and white on a portion of the right hand side, with the white portion being relatively smaller than the black portion.

Moving down the image 3006 is another white stripe extending across the entirety of the image 3006 from left to right. Moving down the image 3005 is a black and white horizontal half-stripes composed of white on the left-hand side and black on the right hand side.

Moving down the image 3006 is another white stripe extending across the entirety of the image 3006 from left to right. Moving down the image 3006 is a black and white horizontal partial-stripe composed of black on a portion of the left-hand side and white on a portion of the right hand side, with the white portion being relatively larger than the black portion, but of a different ratio then other black and white horizontal partial-stripes within the image 3006.

Image 3007 includes any desired combination of one or more different shapes at any desired location within the image 3007. For example, image 3007 includes various black rectangles of various sizes, dimensions, lengths, widths, etc. located at different locations within the image 3007 including some that are horizontally arranged, vertically arranged, or arranged along an angular trajectory within the image 3007. Image 3007 also includes a black triangle. The remainder of the image 3007 is white. Generally speaking, any desired combination of black, white, grayscale, etc. may be implemented within an image including rendering of any one or more desired shapes, etc.

FIG. 31 is a schematic block diagram of an embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention.

This diagram shows two respective images 3121 and 3122 as each being composed of alternating black and white stripes. This diagram shows examples of examples of 2 images used to convey digital data (using different images to convey 0s and 1s, e.g., 1 image per frame, 1 image per n frames, etc.). Image 3121 includes alternating black and white stripes of a first uniform size and spacing, and image 3122 includes alternating black and white stripes of a second uniform size and spacing. The graph 3101 shows the corresponding signal 1 that is generated by image 3121 that is a square wave signal having a first frequency, f1, corresponding to the size and spacing of the alternating black and white stripes of image 3121. The graph 3102 shows the corresponding signal 2 that is generated by image 3122 that is a square wave signal having a second frequency, f2, corresponding to the size and spacing of the alternating black and white stripes of image 3122. In certain embodiments, the image 3121 and corresponding signal are designated to correspond to a first logical value, such as logical zero (0), and the image 3122 and corresponding signal are designated correspond to a second logical value, such as logical one (1). Note that the alternative may be used if desired (e.g., switching the assignment of logical zero (0) and logical one (1) with respect to the images).

By alternating a portion (or the entirety) of a display between image 3121 and image 3122, information may be conveyed from a first computing device to a second computing device such as via a user such as in accordance with digital communication by transmitting logical 0 and logical 1 in any desired pattern. For example, consider the frame refresh rate (FRR) of the display being of a particular duration (e.g., for a display that includes 1080 rows and has a FRR of 60 Hz, then the entirety of the display is refreshed or updated 60 times per second), then the image that is displayed on the display may be refreshed 60 times per second thereby providing 60 bits of information every second.

On the right-hand side of the diagram are various examples of operation. For example, the graph 3103 shows an implementation that is used to convey digital data 0001. Consider 4 refreshes of the display, and consider displaying the image 3121 during three consecutive refreshes the display followed by image 3122 during the fourth refresh of the display, then the digital data 0001 may be transmitted from a first computing device to a second computing device such as via a user.

For another example, the graph 3104 shows an implementation that is used to convey digital data 0101. Consider 4 refreshes of the display, and consider displaying the image 3121 during a first refresh of the display, followed by image 3122 during a second refresh the display, followed by image 3121 during a third refresh of the display, and followed by image 3122 during a fourth refresh of the display, then the digital data 0101 may be transmitted from a first computing device to a second computing device such as via a user.

For another example, the graph 3105 shows an implementation that is used to convey digital data 1010. Consider 4 refreshes of the display, and consider displaying the image 3122 during a first refresh of the display, followed by image 3121 during a second refresh the display, followed by image 3122 during a third refresh of the display, and followed by image 3121 during a fourth refresh of the display, then the digital data 1010 may be transmitted from a first computing device to a second computing device such as via a user.

Generally speaking, if any desired sequence of alternating between images 3121 and 3122 may be used to convey information, such as in accordance with digital communication by transmitting logical 0 and logical 1 in any desired pattern, from a first computing device to a second computing device such as via a user.

In the alternative implementations, note that the period during which an image displayed may be more than corresponding to the FRR. For example, an image may be displayed on the display for any desired multiple of refreshes of the display (e.g., maintain an image to be displayed on the display during N refreshes of the display, where N is some positive integer greater than or equal to 2). For example, there may be certain instances when maintaining an image to be displayed on the display for a period of time corresponding to longer than the FRR is desirable (e.g., such as to improve the efficacy, performance, etc. of communication from a first computing device to a second computing device such as via a user).

In an example of operation and implementation, consider the graph 3103 shows an implementation that is used to convey digital data 0001. Consider 12 refreshes of the display, and consider displaying the image 3121 during 9 consecutive refreshes the display followed by image 3122 during the subsequent 3 refresh of the display, then the digital data 0001 may be transmitted from a first computing device to a second computing device such as via a user. Alternatively, consider 24 refreshes of the display, and consider displaying the image 3121 during 18 consecutive refreshes the display followed by image 3122 during the subsequent 6 refreshes of the display, then the digital data 0001 may be transmitted from a first computing device to a second computing device such as via a user. Generally speaking, the period during which a given image is maintained to be displayed on the display may include one refresh of the display or generally any number of refreshes (e.g., n, some positive integer greater than or equal to 2) of the display.

Also, in certain implementations, the number of refreshes may be nonuniform from bit to bit. For example, so long as the first computing device and the second computing device are in agreement and understanding with respect to the desired operation, a first bit may be communicated during A number of refreshes of the display, a second that may be communicated during B refreshes of the display, and so on, such that A and B are positive integers, and so long of the first computing device and the second computing device or in agreement and understanding with respect to the particular mode of operation. Generally speaking, any desired communication protocol may be performed between the first computing device in the second computing device so long as the first lesson the second computing device are in agreement with respect to one another.

FIG. 32 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention.

This diagram has some similarity to the previous diagram with at least one difference being that different respective images 3221 and 3222 are used to facilitate and communicate values of logical 0 and logical 1. This diagram shows examples of 2 images used to convey digital data (using different images to convey 0s and 1s, e.g., 1 image per frame, 1 image per n frames, etc.).

This diagram shows two respective images 3221 and 3222 as each being composed of alternating black and white stripes. Image 3221 includes alternating black and white stripes of different sizes yet having uniform spacing, and image 3222 includes alternating black and white stripes of different sizes such that the respective black stripes or not of uniform size and the respective white stripes are not of uniform size and also having non-uniform spacing. The graph 3201 shows the corresponding signal 1 that is generated by image 3221 that is a modified non-uniform square wave signal having a first frequency, f1, corresponding to the size and spacing of the black and white stripes of image 3221. The graph 3202 shows the corresponding signal 2 that is generated by image 3222 that is a modified non-uniform square wave signal having a second frequency, f2, corresponding to the size and spacing of the black and white stripes of image 3222. In certain embodiments, the image 3221 and corresponding signal are designated to correspond to a first logical value, such as logical zero (0), and the image 3222 and corresponding signal are designated correspond to a second logical value, such as logical one (1). Note that the alternative may be used if desired (e.g., switching the assignment of logical zero (0) and logical one (1) with respect to the images).

On the right-hand side of the diagram are various examples of operation. For example, the graph 3203 shows an implementation that is used to convey digital data 0001. Consider 4 refreshes of the display, and consider displaying the image 3221 during three consecutive refreshes the display followed by image 3222 during the fourth refresh of the display, then the digital data 0001 may be transmitted from a first computing device to a second computing device such as via a user.

For another example, the graph 3204 shows an implementation that is used to convey digital data 0101. Consider 4 refreshes of the display, and consider displaying the image 3221 during a first refresh of the display, followed by image 3222 during a second refresh the display, followed by image 3221 during a third refresh of the display, and followed by image 3222 during a fourth refresh of the display, then the digital data 0101 may be transmitted from a first computing device to a second computing device such as via a user.

For another example, the graph 3205 shows an implementation that is used to convey digital data 1010. Consider 4 refreshes of the display, and consider displaying the image 3222 during a first refresh of the display, followed by image 3221 during a second refresh the display, followed by image 3222 during a third refresh of the display, and followed by image 3221 during a fourth refresh of the display, then the digital data 1010 may be transmitted from a first computing device to a second computing device such as via a user.

FIG. 33 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention. This diagram shows different images themselves convey digital data (B&W variation to convey 0s and 1s within image, employ any desired image pattern to convey any desired digital information). This diagram shows the use of black and white stripes but operative in a different way to convey information. Images 3321, 3322, and 3323 are operative to use black and white (B&W) to convey 0s and 1s (e.g., B=logical 0, W=logical 1). For example, the image is partitioned into a number of stripes having a particular width. For example, image 3321 is shown as including 12 horizontal stripes alternating from white to black to white to black, etc. Generally speaking, an image may be divided into any desired number of stripes, whether horizontal or vertical, such as n stripes where n is a positive integer greater than or equal to 1. The example of n=1 would correspond to the entire image being either black or white and having a common value throughout.

The information conveyed per stripe is a function of the value of the stripe. In an example of operation and implementation, black colored stripes are starting to have a first logical value, and white colored stripes are assigned to have a second logical value (e.g., black=logical zero (0) and white=logical one (1), or vice versa). The signal is generated based on the particular pattern that is rendered within the image corresponds to the data that is to be transmitted by that image. For example, consider image 3321 as alternating between white and black, then the corresponding signal that would be generated by the hardware components of the display (e.g., such that the hardware components of the display serve as signal generation circuitry) is shown by graph 3301a being a square wave signal having a frequency corresponding to the alternating pattern of the image 3321. As the image 3321 is displayed by a display of the computing device, the corresponding signal generated by the image 3321 coupled into and through a user to another computing device. The digital information that is conveyed based on coupling of this signal through the user to the other computing device corresponding to the alternating values of black and white within the image 3321. For example, as the other computing device detects the signal being coupled into it via the user from the computing device having the display that displays image 3321, a high-value of the signal is interpreted to be a first logical value, and a low-value of the signal is interpreted to be a second logical value. For example, within the recipient computing device, detection of a low-value of the signal, such as generated in accordance with a particular stripe displaying the color black, would be interpreted as a logical zero (0). Similarly, within the recipient computing device, detection of a high-value of the signal, such as generated in accordance with a particular stripe displaying the color white, would be interpreted as a logical one (1). In such an implementation, more than one bits of information may be transmitted per image. For example, graph 3301b shows the conveyance of digital data, a bite, a digital word, etc. including a 12 bits having value 101010101010.

Based on agreement and understanding between the first computing device that includes the display that is displaying the image and thereby generating the signal is coupled via the user to the second computing device regarding the assignment of black and white to respective logical values, and also based on agreement of the width of the stripes being used, which will correspondingly govern the amount of time that the signal will be at high and/or low values (e.g., control the value of the signal as a function of time as the images being displayed), digital information may be conveyed between the first computing device and the second computing device. As can be seen with respect to the graph 3301b, as the image 3321 is displayed by a display of the first computing device, a signal corresponding to graph 3301a is generated by the hardware of the display of the first computing device in coupled via the user to the second computing device such that the second computing device detects, processes, and interprets the signal to recover the 12 bits having value 101010101010.

Based on agreement between the first computing device and the second computing device regarding the manner by which information is to be conveyed between the first computing device in the second computing device in this matter, any desired number of black and white striped combinations may be used to convey information between the first computing device and the second computing device. In addition, note that an image may be displayed for one or more frame refreshes. For example, there may be instances in which each respective image refresh corresponds to the conveyance of a certain number of digital data bits, a byte, a digital word, etc. For example, consider the example in which the image is partitioned into 12 respective stripes, then each respective image may be used to transmit 12 bits. Note that there may be instances in which the image is maintained on the display for more than a single frame (e.g., generally speaking, n frames, where n is a positive integer greater than or equal to 2) so as to facilitate improved communication and ease of detection and reception by a second computing device that is implemented to detect a signal generated by the image and coupled through a user to the second computing device.

Also, note that the number of respective stripes of the image may be any desired number based on the hardware implementation (e.g., based on the number of horizontal pixel lines of the display used to display the image). For example, consider a display having 720 horizontal lines, such as an HD display, and consider that the image is being displayed using less than all of those horizontal lines, such as 60 lines, then each respective stripe of the image in one implementation may include one or more of those horizontal lines. For example, an image being displayed using 60 lines is implemented based on 60 respective stripes, one horizontal pixel line for each stripe. In another example, an image being displayed using 60 lines is implemented based on 30 respective stripes each being composed of two horizontal adjacently located pixel lines. In yet another example, an image being displayed use and 60 lines is implemented based on four respective stripes each being composed of 15 horizontal adjacently located pixel lines. In even other implementations, nonuniform partitioning of the horizontal lines is performed. Considered example in which an image being displayed on 60 lines is implemented based on stipes of different values such as a first stripe composed of 10 horizontal adjacently located pixel lines, a second stripe composed of 20 horizontal adjacently located pixel lines, a third stripe composed of 15 horizontal adjacently located pixel lines, and so on. Generally speaking, an image being displayed on X lines may be partitioned into any desired number of stripes of any desired size including uniform or nonuniform sized stripes.

Based on any desired agreement, handshake, negotiation, etc. between the first computing device on the second computing device, the first computing device and/or the second computing device operate to assign the manner in which an image is to be generated and encoded and subsequently decoded and interpreted.

Considering some other examples of implementation and operation, consider image 3322 that includes black and white stripes and that generates the signal represented by graph 3302a as being a modified square wave signal or a signal that varies between a high-value and a low value based on the color of the stripes being displayed. For example, graph 3302b shows the conveyance of digital information having a value of 101000111000 based on the signal shown in the graph 3302a that is generated based on the hardware of the display displaying the image 3322. Considering another example, graph 3302c shows the conveyance of digital information having a value of 111000111000 based on the signal shown in the graph 3303a that is generated based on the hardware of the display displaying the image 3323.

In general, any desired combination of 1s and/or 0s may be conveyed from the first computing device via a user to the second computing device based on display of an image in accordance with these principles. With respect to data transmission rates, consider an example in which 12 bits are conveyed during each frame refresh of the display, and consider a refresh rate of 60 Hz, then a data rate of 60 Hz×12 bits=720 bits per second may be achieved. Consider another example in which 12 bits are conveyed within an image yet the image is displayed on the display for 2 frame refreshes, such that an effective refresh rate of 30 Hz is achieved, then a data rate of 30 Hz×12 bits=360 bits per second may be achieved. Similarly, consider another example in which 12 bits are conveyed within an image yet the image is displayed on the display for 3 frame refreshes, such that an effective refresh rate of 20 Hz is achieved, then a data rate of 20 Hz×12 bits=240 bits per second may be achieved. Generally speaking, based on the number of bits, B, being conveyed per image, the frame refresh rate (FRR), and the number of frames, n, during which the image is displayed, and effective data rate may be calculated (e.g., FRR/(n)×B=data rate).

FIG. 34 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention. This diagram shows different respective square wave signals being generated that are based on the frame refresh rate (FRR) of the display. Consider image 3401A as corresponding to the number of horizontal pixel lines of the display. For example, consider the different respective types of display described above that may include a number of horizontal pixel roads including 720 lines, 1080 lines, 1440 lines, etc., and based on a corresponding FRR such as 60 Hz, 120 Hz, etc., then the corresponding maximum frequency of the signal, such as a clock signal or a square wave signal, that may be generated is based on the gate scanning frequency of the display.

For example, consider a full HD display having 1080 lines and a FRR of 60 Hz, then such a full HD display has a gate scanning frequency, $f_{gc}$, of 1080×60 equals 64,800 Hz or 64.8 kHz. This is a frequency of the signal is generated in accordance with operation of the full HD display such that every row of the display, all 1080 lines, are updated 60 times per second in accordance with refresh and operation of the display. This gate scanning frequency, $f_{gc}$, signal is one such signal that may be generated by the computing device that includes the display.

Image 3421 includes alternating black and white stripes of one pixel row thickness each (e.g., first row of white pixels, second row of black pixels, third row of white pixels, and so on). The frequency of the signal that may be generated by such an image 3421 is shown by graph 3421a, alternating back and forth between maximum and minimum values associated with white pixels and black pixels rows of this size, respectively.

Consider such an image 3421 that is displayed on such a full HD display. The frequency of such a signal would be f=(# of rows of the display (X)×FRR (60))/2=64,800/2=32,400 Hz or 32.4 kHz such that the signal alternates between high and low values every other horizontal row. In general, any additional signals being of any sub-multiple of this frequency may be generated appropriately using corresponding images of the display. For example, the use of the gate scanning frequency, $f_{gc}$, of the computing device is one such signal that is available for use to convey information including two couple into user. However, note that generally any frequency that is any sub-multiple of the gate scanning frequency, $f_{gc}$, of a computing device may also be generated as follows:

$$f = X \times FRR/n = f_{gc}/n, \text{ where}$$

X=# of rows of the display
FRR=frame refresh rate
n=any positive integer such as 1, 2, 3, etc.
$f_{gc}$=gate scanning frequency Also, note that alternative implementations may be used to generate any other sub-multiple of the gate scanning frequency, $f_{gc}$, of the computing device as follows:

$$f = (X \times FRR) \times m = f_{gc} \times m, \text{ where}$$

X=(# of rows of the display
FRR=frame refresh rate
m=modified, asymmetric, non-uniform ⅓ based on ⅔ pattern, modified, asymmetric, non-uniform ¼ based on ¼ or ¾ pattern, modified, asymmetric, non-uniform ⅕ based on ⅖ or ⅘ pattern, etc.
$f_{gc}$=gate scanning frequency Image 3421 includes alternating B&W horizontal stripes, uniform size and spacing (every other row of pixels, square wave with frequency f=($f_{gs}$/2), based on gate scanning rate ($f_{gs}$)=# of rows of display (X)×frame refresh rate (FRR).

Image 3422 includes alternating black and white stripes of 2 pixel rows thickness each (e.g., first 2 row of white pixels, second 2 row of black pixels, third 2 row of white pixels, and so on). The frequency of the signal that may be generated by such an image 3422 is shown by graph 3422a, alternating back and forth between maximum and minimum values associated with white pixels and black pixels rows of this size, respectively, and having one-half the frequency of the signal shown in the graph 3421a, i.e., being $f_{gc}$/4.

Consider such an image 3422 that is displayed on such a full HD display. The frequency of such a signal would be f=(# of rows of the display (X)×FRR (60))/4=64,800/4=16,200 Hz or 16.2 kHz such that the signal alternates between high and low values every 2 horizontal rows.

Image 3422 includes B&W horizontal stripes, uniform size and spacing (square wave with f=$f_{gs}$/4).

Image 3423 includes alternating black and white stripes of 3 pixel rows thickness each (e.g., first 3 rows of white pixels, second 3 row2 of black pixels, third 3 row2 of white pixels, and so on). The frequency of the signal that may be generated by such an image 3423 is shown by graph 3423a, alternating back and forth between maximum and minimum values associated with white pixels and black pixels rows of this size, respectively, and having one-third the frequency of the signal shown in the graph 3421a, i.e., being $f_{gc}/6$.

Consider such an image 3423 that is displayed on such a full HD display. The frequency of such a signal would be f=(# of rows of the display (X)×FRR (60))/6=64,800/6=10,800 Hz or 10.8 kHz such that the signal alternates between high and low values every 3 horizontal rows.

Image 3423 includes B&W horizontal stripes, uniform size and spacing (square wave with $f=f_{gs}/6$). Generally, this may be performed produce any frequency that is any sub-multiple of $f_{gs}$ e.g., f=(X×FRR)/n, n=1, 2, 3, etc. or alternative sub-multiples of different shapes, e.g., f=(X×FRR)*m, m=any desired fraction.

FIG. 35 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention. This diagram shows additional options by which different respective signals may be generated.

For reference, image 3421 and graph 3421a are also shown for comparison.

Image 3522 includes alternating black and white stripes of 1 pixel row and 2 pixel rows thickness each (e.g., 1 row of white pixels, then 2 rows of black pixels, then 1 row of white pixels, then 2 rows of black pixels, and so on). The frequency of the signal that may be generated by such an image 3522 is shown by graph 3522a, alternating back and forth between maximum and minimum values associated with 1 white pixel and 2 black pixel rows, respectively, is $f_{gc} \times (1/2) \times (2/3)$. Also, note that the durations at which the signal is at the maximum and minimum values are not equal. This may be viewed as a modified square wave signal that is not fully symmetric and uniform with respect to the maximum and minimum values durations.

Consider such an image 3522 that is displayed on such a full HD display. The frequency of such a signal would be f=(# of rows of the display (X)×FRR (60))×(½)×(⅔)=64,800×(½)×(⅔)=21,600 Hz or 21.6 kHz such that the signal alternates between high and low values associated with white pixels and black pixels rows of this size, respectively.

Image 3522 includes B&W horizontal stripes, uniform size, 1 W, 2 B . . . (modified square wave, max/min of different durations, with $f=((f_{gs}/2) \times (2/3))$).

Image 3523 includes alternating black and white stripes of 3 pixel rows and 2 pixel rows thickness each (e.g., 3 rows of white pixels, then 2 rows of black pixels, then 3 rows of white pixels, then 2 rows of black pixels, and so on). The frequency of the signal that may be generated by such an image 3523 is shown by graph 3523a, alternating back and forth between maximum and minimum values associated with 2 white pixels and 3 black pixel rows, respectively is $f_{gc} \times (1/2) \times (2/5)$. Also, note that the durations at which the signal is at the maximum and minimum values are not equal. This may be viewed as a modified square wave signal that is not fully symmetric and uniform with respect to the maximum and minimum values durations within a given period or cycle. As can be seen, the signal has a periodicity of 5 pixel rows and is a modified, asymmetric, non-uniform square wave signal.

Consider such an image 3523 that is displayed on such a full HD display. The frequency of such a signal would be f=(# of rows of the display (X)×FRR (60))×(½)×(⅖)=64,800×(½)×(⅖)=12,960 Hz or 12.96 kHz such that the signal alternates between high and low values associated with white pixels and black pixels rows of this size, respectively.

Image 3523 includes B&W horizontal stripes, uniform size, 3 W, 2 B . . . (modified square wave, max/min of different durations, with $f=((f_{gs}/2) \times (2/5))$).

FIG. 36 is a schematic block diagram of another embodiment of the use of one or more images displayed on a display of a computing device to generate one or more signals to facilitate coupling of those one or more signals from the computing device via a user to another computing device to convey information from the computing device to the other computing device, or vice versa, in accordance with the present invention.

For reference, image 3421 and graph 3421a are also shown for comparison.

Image 3622 includes alternating black and white stripes of 1 pixel row and 2 pixel rows thickness each (e.g., 2 rows of white pixels, then 1 row of black pixels, then 2 rows of white pixels, then 1 row of black pixels, and so on). Image 3622 may be viewed as being an inverse of image 3522 thereby generating a signal that is similar to the signal generated by image 3622 but with at least one of inversed polarity, phase shift, etc. The frequency of the signal that may be generated by such an image 3622 is shown by graph 3622a, alternating back and forth between maximum and minimum values associated with 2 white pixels and 1 black pixel rows, respectively is $f_{gc} \times (1/2) \times (2/3)$. Also, note that the durations at which the signal is at the maximum and minimum values are not equal. This may be viewed as a modified square wave signal that is not fully symmetric and uniform with respect to the maximum and minimum values durations.

Consider such an image 3622 that is displayed on such a full HD display. The frequency of such a signal would be f=(# of rows of the display (X)×FRR (60))×(½)×(⅔)=64,800×(½)×(⅔)=21,600 Hz or 21.6 kHz such that the signal alternates between high and low values associated with white pixels and black pixels rows of this size, respectively.

Image 3622 includes B&W horizontal stripes, uniform size, 2 W, 1 B . . . (modified square wave, max/min of different durations, with $f=((f_{gs}/2) \times (2/3))$).

Image 3623 includes alternating black and white stripes of 3 pixel rows and 2 pixel rows thickness each (e.g., 3 rows of white pixels, then 2 rows of black pixels, then 3 rows of white pixels, then 2 rows of black pixels, and so on). Image 3623 may be viewed as being an inverse of image 3523 thereby generating a signal that is similar to the signal generated by image 3622 but with at least one of inversed polarity, phase shift, etc. The frequency of the signal that may be generated by such an image 3623 is shown by graph 3623a, alternating back and forth between maximum and minimum values associated with 2 white pixels and 3 black pixel rows, respectively is $f_{gc} \times (1/2) \times (2/5)$. Also, note that the durations at which the signal is at the maximum and minimum values are not equal. This may be viewed as a modified square wave signal that is not fully symmetric and uniform with respect to the maximum and minimum values durations within a given period or cycle. As can be seen, the signal has a periodicity of 5 pixel rows and is a modified, asymmetric, non-uniform square wave signal.

Consider such an image 3623 that is displayed on such a full HD display. The frequency of such a signal would be f=(# of rows of the display (X)×FRR (60))×(½)×(⅖)=64,800×(½)×(⅖)=12,960 Hz or 12.96 kHz such that the signal alternates between high and low values associated with white pixels and black pixels rows of this size, respectively.

Image 3622 includes B&W horizontal stripes, uniform size, 2 W, 3 B . . . (modified square wave, max/min of different durations, with f=(($f_{gs}$/2)×(⅖))).

FIG. 37 is a schematic block diagram of an embodiment 3700 of active matrix-gate line scanning such as may be performed within a computing device that includes a display in accordance with the present invention. This diagram shows the operation and activation of the respective gate lines of the display (e.g., such as may be associated with the relatively longer axis of the display) as a function of time beginning with the respective data lines of the device. For example, this may be viewed as beginning with a gate 1 (e.g., a top row of the display having a horizontal axis that is relatively larger than the vertical axis), a gate 2 (e.g., the second row from the top of the display having a horizontal axis that is relatively larger than the vertical axis), gate 3, and so on. Operation of this diagram may be understood also with respect to FIGS. 19, 20, and 21, among others that show and describe operation of the respective gate lines and data lines to facilitate operation of the RGB sub-pixels of a display. For example, consider the operation of the respective gate lines and RGB data lines shown in FIG. 19 of the display. In accordance with displaying one video frame, the respective gate lines are successively operated one after another in accordance with gate line scanning in this diagram. The overall scan frequency of the display is a function of the number of rows of the display (e.g., of the display having a horizontal axis that is relatively larger than the vertical axis) multiplied by the frame refresh rate (FRR). For example, consider a display having 1028 rows with an FRR of 60 Hz, then the scan frequency of the display is 61,680 Hz (f=# rows X×FRR=1028×60).

FIG. 38 is a schematic block diagram of an embodiment 3800 of active matrix-data line scanning such as may be performed within a computing device that includes a display in accordance with the present invention. This diagram shows the operation shows the operation and activation of the respective data lines of the display. For example, the data lines may correspond to the respective columns of the display based on a display having a horizontal axis that is relatively larger than the vertical axis. In such an example, consider the display as including column 1, column 2, and so on that correspond to the respective data lines data 1, data 2, and so on. Operation of this diagram may also be understood also with respect to FIGS. 19, 20, and 21, among others that show and describe operation of the respective gate lines and data lines to facilitate operation of the RGB sub-pixels of a display. For example, consider the operation of the respective gate lines and RGB data lines shown in FIG. 19 of the display.

This diagram shows operation of a display displaying alternating B&W rows (e.g., rows corresponding to gate lines) on display/touchscreen yields a f that is function of FRR/2 (FRR=frame refresh rate). Different patterns may be created for different subsets of FRR (e.g., FRR/2, FRR/3, . . . FRR/n, etc.).

Operation in accordance with this diagram corresponds to displaying alternating black and white rose on the display thereby generating a signal having a frequency that is a function of the frame refresh rate (FRR). For example, the signal would have a frequency as follows:

$$f=(\text{\# of rows of the display } (X) \times \text{FRR})/2$$

For example, a display having 1920 columns and 1028 rows with an FRR of 60 Hz may be operated in accordance with this diagram to generate a signal having a frequency as follows:

$$f=(1028 \text{ rows} \times 60 \text{ Hz})/2=61,680/2=30,840 \text{ Hz or } 30.84 \text{ kHz}$$

Note that different respective patterns may be used to create different subsets of the video refresh rate as also described above.

Also, note that in different manners of operating a display may also affect the image and/or signal that is generated and that may be coupled into a user's body. For example, certain displays operate in certain ways as to mitigate the effects of accumulated charge of the dielectric of the display. One particular mode of operation includes swapping polarity of the signals that are used to drive the display according to some particular schedule. Some displays operate by swapping the polarity every other frame such as operating by using a positive voltage signal in one frame, then the negative voltage signal on the next frame, then using the positive voltage signal on the next frame, and so on (e.g., +5 V on one frame, −5 V on the next frame, and +5 V on the next frame, so on).

Certain other displays operate by inverting the polarity of the signals provided to operate the display on every column of the display such as operating by using a positive voltage signal in one column, then the negative voltage signal on the next column, then using the positive voltage signal on the next column, and so on. Note that a given image, when displayed on different types of displays operating in accordance with different modes of operation such as these, may provide different respective signals based on those different modes of operation of those displays. As such, a particular image, when displayed on different displays that operate in accordance with different modes of operation, may produce different signals in some instances. As such, depending on the display and its mode of operation, a given image may generate different respective signals that may be coupled into users body.

FIG. 39A is a schematic block diagram of an embodiment of a method 3901 for execution by one or more computing devices in accordance with the present invention. The method 3901 operates in step 3910 by generating a signal using a computing device that includes information corresponding to a user and/or and application (e.g., an application operative within the computing device).

In some alternative variants of the method 3901, the method 3901 also operates in step 3912 by generating the signal using signal generation circuitry, processing module (s), etc. of the computing device. For example, a signal generator, one or more processing modules, an oscillator, a mixer, etc. and/or any other circuitry operative to generate a signal may be used within the computing device.

In other alternative variants of the method 3901, the method 3901 operates in step 3914 by generating the signal using hardware components of a display and/or a touchscreen display (e.g., pixel electrodes, lines such as gate lines, data lines, etc.). For example, the actual hardware components of a display and/or a touchscreen display of the computing device serve as the mechanism to generate the signal. In such an example, the hardware components of the display and/or the touchscreen display may be viewed as being signal generation circuitry that operates to generate the signal itself.

The method 3901 also operates in step 3920 by coupling the signal into a user from one or more locations on the computing device. For example, the signal is coupled into the body of the user based on the user being in contact with or within sufficient proximity to a location on the computing device that is generating the signal. This signal is coupled into the body of the user and may then be coupled into another computing device. For example, in some alternative variants of the method 3901, the method 3901 also operates in step 3939 by transmitting the signal via the user to another computing device that is operative to detect and receive the signal. In certain examples, this other computing device may include a device with a touchscreen and/or touchscreen display. Also, the sensors, electrodes, etc. of the touchscreen and/or touchscreen display may be operative in conjunction with one or more DSCs as described herein.

FIG. 39B is a schematic block diagram of another embodiment of a method 3902 for execution by one or more computing devices in accordance with the present invention. The method 3902 operates in step 3911 by receiving, via a user, a signal using a computing device (e.g., a signal that is generated by another computing device and coupled into and through the body of the user to the computing device, the signal including information corresponding to the user and/or and application such as an application operative within the computing device).

In some alternative variants of the method 3902, the method 3902 also operates in step 3913 by detecting the signal using a touchscreen and/or touchscreen display with electrodes, sensors, etc.

The method 3902 operates in step 3921 by processing the signal (e.g., the modulating, decoding, interpreting, etc.) to recover the information corresponding to the user and/or and application. In some alternative variants of the method 3902, the method 3902 also operates in step 3912 by operating on the information corresponding to the user and/or the application in accordance with (e.g., effectuating a purchase and/or financial transaction, receiving and storing such information, etc.). Generally speaking, depending on the type of information being conveyed to the computing device from the other computing device, the computing device operates to use the information that has been recovered in accordance with one or more functions. The types of functions may be of any of the variety of types. Examples of such types of functions may include any one or more of ordering of one or more particular food items from a menu that is displayed on a display and/or a touchscreen display of the computing device, selecting one or more items for purchase that are displayed on the display and/or the touchscreen display of the computing device, exchanging business card information, providing a shipping address for one or more items that have been purchased, completing a financial transaction such as payment of money, transfer of funds, etc.

FIG. 40 is a schematic block diagram of another embodiment of a method 4000 for execution by one or more computing devices in accordance with the present invention. The method 4000 operates in step 4010 by selecting one or more encoding schemes to be used to encode information into a signal to be generated by a display and/or a touchscreen display of a computing device. Such selection of one or more encoding schemes may be based on any of the embodiments, examples, etc. described herein. For example, consider the various means by which information may be encoded into one or more signals based on various manners in which a display and/or a touchscreen display may be operated such as with respect to FIGS. 30-38, among others.

In some alternative variants of the method 4000, the method 4000 also operates in step 4012 by selecting the one or more encoding schemes from a number of encoding schemes that operate using respective frequency patterns frequency pattern to convey data. In some examples, this may involve alternating between different respective images to generate different respective, such as every frame, or every certain number of frames, in accordance with conveying digital information such that the respective images correspond to different digital values (e.g., a first image corresponding to a logical value of 0, a second image corresponding to a logical value of 1). Alternatively, this may involve operating the display and/or the touchscreen display in accordance with generating one or more signals that include multiple digital values therein such that different respective images generate different respective signals corresponding to different digital data/bytes/words, etc.

In some other alternative variants of the method 4000, the method 4000 also operates in step 4014 by facilitating agreement between the computing device and another computing device (e.g., a recipient computing device) regarding the selected one or more encoding schemes. For example, in accordance with selecting the appropriate one or more encoding schemes, another computing device, such as a recipient computing device, and the computing device both need to know which particular one or more encoding schemes are being used to facilitate effective communication between the computing device and the other computing device.

The method 4000 also operates in step 4020 by operating the display and/or touchscreen display to generate one or more signals based on the one or more selected encoding schemes that includes information corresponding to a user and/or an application (e.g., an application operative within the computing device).

The method 4000 operates in step 4030 by coupling the signal into a user from one or more locations on the display and/or touchscreen display of the computing device. In some alternative variants of the method 4000, the method 4000 also operates in step 4032 by transmitting the signal via the user to another computing device that is operative to detect and receive the signal.

Certain of the following diagrams provide various means by which respective computing devices may be operated as to perform communication at initialization, handshake, codec negotiation, agreement on the manner of operation, etc. For example, consider a computing device 2420 that includes a display and a computing device 2424 that includes a touchscreen display (e.g., implemented based on electrodes 85, touchscreen display with sensors 80 that are respectively serviced by DSCs 28 that are in communication with one or more processing models 42 that may include integrated memory and/or be coupled to memory) such that one or more signals are operable to be coupled from the computing device 2420 via a user to the computing device 2424, or vice versa. Also, in some examples, note the computing device 2420 and/or the computing device 2424 includes functionality to interface with one or more other devices, components, elements, etc. via one or more communication links, networks, communication pathways, channels, etc.

In another example, consider two computing devices 2420 that includes such capability of a touchscreen display (e.g., implemented based on electrodes 85, touchscreen display with sensors 80 that are respectively serviced by DSCs 28 that are in communication with one or more processing models 42 that may include integrated memory and/or be coupled to memory) such that one or more signals are operable to be coupled from a first of the computing devices 2424 via a user to the other of the computing devices 2424, or vice versa.

FIG. 41 is a schematic block diagram of an embodiment 4100 of user computing device and touchscreen communication initialization and handshake as performed within a system operative to facilitate coupling of one or more signals from a first computing device via a user to a second computing device in accordance with the present invention. The bottom of this diagram shows the sequence of operations as a function of time between two computing devices that facilitate coupling of one or more signals to one another via a user. In these examples, consider a computing device 2420 that includes capability to generate one or more signals to be coupled into the user's body, through the user's body, and into one or more electrodes 85 of a touchscreen display with sensors 80 of a computing device 2424. In alternative embodiments, note that the computing device 2420 also includes functionality and capabilities as shown by the computing device 2424. For example, the computing device 2420 may be a portable device. The computing device 2420 may also include a touchscreen display with sensors 80. This diagram corresponds to an instance in which the communication initialization and handshake between the computing devices 2420 and 2424 is initiated by the computing device 2420. In other examples, the communication initialization and handshake between the computing devices 2420 and 2424 is initiated by the computing device 2424.

In an example of operation and implementation, the computing device 2420 is configured to generate and transmit a handshake signal to the computing device 2424 via the body of the user. The handshake signal is the mechanism by which the computing device 2420 indicates to the computing device 2424 that the computing device 2420 intends to provide one or more data communication signals to the computing device 2424 via the user's body. In certain examples, the handshake signal is generated and transmitted by the computing device 2420 based on the opening of an application (e.g., an "app" such as being open and initiated by the user). In other examples, the handshake signal is generated and transmitted by the computing device 2420 based on the user selecting a particular option or button within the application or of the computing device 2420. In other examples, the handshake signal is a signal with predetermined characteristic(s), based on user interaction, opening of app, etc. In certain examples, the handshake signal includes a known bit/data pattern, bit sequence, bar code: header, data, footer, etc. For example, the handshake signal is coupled from the computing device 2420 via the user's body to the computing device 2424 in accordance with any particular implementation (e.g., such as the user contacting or being within sufficient proximity to an image on the display of the computing device 2420, with the user contacting or being within sufficient proximity to a button of the computing device 2420, etc.). Generally speaking, such a handshake signal indicates to the computing device 2424 that the computing device 2420 intends to make a communication to the computing device 2424.

The handshake signal includes one or more predetermined characteristics such that the computing device 2424 is configured to recognize the signal as being the handshake signal. For example, the handshake signal may include known bit/data pattern, a particular bit sequence, a bar code, a known format such as including a header portion, followed by a data portion, followed by a footer portion, including the respective size, number of bits, length, modulation type, etc. of that particular format, and/or one or more other characteristics that is known to the computing device 2424. For example, each of the computing device 2420 and the computing device 2424 are programmed to know the particular characteristics of the handshake signal so that the computing device 2420 utilizes the appropriate handshake signal to indicate to the computing device 2424 that communication is forthcoming In addition, note that different handshake signals may be employed at different times as long as the computing device 2420 and the computing device 2424 which particular handshake signal is to be used in a particular instance.

In the event that the computing device 2420 does not receive a response (e.g., an acknowledgement (ACK) from the computing device 2424 based on the transmission of the handshake signal from the computing device 2420 to the computing device 2424 is not received), the computing device 2420 may retransmit the handshake signal. This may be based on any one or more criteria, such as after the elapse of a particular amount of time (e.g., Delta T, such as X seconds, where X is some desired value such as 0.01, 0.05, 0.1 0.7, 1, 2, etc. or some other value).

Based on reception of the handshake signal by the computing device 2424, and based on detection of the handshake signal as being the handshake signal by the computing device 2424, and based on the computing device 2424 operative and ready to receive subsequent communication from the computing device 2420, the computing device 2424 transmits an acknowledgement (ACK) of the handshake signal to the computing device 2420. The computing device 2420 is configured to receive the ACK that is transmitted from the computing device 2424. Alternatively, in some examples, based on the computing device 2424 not being operative and ready to receive subsequent communication from the computing device 2420, the computing device 2424 and may not respond to the handshake signal whatsoever or may respond to the handshake signal with a different signal or response than an ACK to indicate to the computing device 2420 that the computing device 2424 is not operative and ready to receive such subsequent communication from the computing device 2420.

Note that the ACK that is provided from the computing device 2424 to the computing device 2420 in response to the handshake signal may be transmitted in any number of pathways. In some examples (e.g., such as when the computing device 2420 includes a touchscreen display with sensors 80, such as in a similar implementation to the computing device 2424), the ACK is provided from the computing device 2424 via the user's body to the computing device 2420. In other examples (e.g., such as when the computing device 2420 does not include a touchscreen display with sensors 80), the ACK is provided from the computing device 2424 to the computing device 2420 via one or more alternative to communication pathways (e.g., such as the one or more networks 26 such as described with reference to FIG. 1, FIG. 47 and/or communication channels thereof such as described with reference to FIG. 48, etc.). For example, communication from the computing device 2420 to the computing device 2424 may be performed in a similar manner that communication is provided from the computing device 2420 via the user's body to the computing device 2424 or via another communication mechanism.

Based on successful transmission of the handshake signal from the computing device 2420 to the computing device 2424 and based on the computing device 2420 successfully receiving the ACK from the computing device 2424 in response to the handshake signal, the computing device 2420 is configured to transmit one or more data communication signals to the computing device 2424. In some examples, note that the computing device 2424 is configured to provide one or more ACKs, responses, etc. to the computing device 2420 in response to the one or more data communication signals that are transmitted from the computing device 2420. The data communication signals may be achieved using various means such as using signals via an image to convey data, signals via a button to convey data, etc. Note that the data communication signals that are provided from the computing device 2420 to the computing device 2424 may include any type of information. Examples of such information may include any one or more of user identification information related to the user, name of the user, etc., financial related information such as payment information, credit card information, banking information, etc., shipping information such as a personal address, a business address, etc. to which one or more selected or purchase products are to be shipped, etc., and/or contact information associated with the user such as phone number, e-mail address, physical address, business card information, a web link such as a Universal Resource Location (URL), etc. Generally speaking, such one or more signals may be generated and produced to include any desired information to be conveyed from the computing device 2420 to the computing device 2424 via the user.

In addition, in certain examples, such data communication signals, ACKs, responses, etc. are provided from the computing device 2420 to the computing device 2424, and/or vice versa, based on a codec (e.g., an encoding and decoding protocol) that has been agreed to by the computing device 2420 and the computing device 2424. For example, in accordance with such communication handshake initialization, or in accordance with a separate mechanism such as codec negotiation, the computing device 2420 and the computing device 2424 and establish agreement on a codec that specifies the manner in which data is to be encoded by the computing device 2420 and conveyed to the computing device 2424. For example, such codec negotiation is performed to ensure that both the computing device 2420 and the computing device 2424 communicate in and agreed upon manner. This may include selection of one or more parameters that govern how such communications are to be made between the computing devices 2420 and 2424.

FIG. 42 is a schematic block diagram of another embodiment 4200 of user computing device and touchscreen communication initialization and handshake as performed within a system operative to facilitate coupling of one or more signals from a first computing device via a user to a second computing device in accordance with the present invention.

This diagram corresponds to an instance in which the communication initialization and handshake between the computing devices 2420 and 2424 is initiated by the computing device 2424. In other examples, the communication initialization and handshake between the computing devices 2420 and 2424 is initiated by the computing device 2420. In this diagram, the computing device 2424 generates and transmits the handshake signal to the computing device 2420. For example, the computing device 2420 may be a portable device. The computing device 2420 may also include a touchscreen display with sensors 80.

In the event that the computing device 2424 does not receive a response (e.g., an acknowledgement (ACK) from the computing device 2420 based on the transmission of the handshake signal from the computing device 2424 to the computing device 2420 is not received), the computing device 2420 may retransmit the handshake signal. This may be based on any one or more criteria, such as after the elapse of a particular amount of time (e.g., Delta T, such as X seconds, where X is some desired value such as 0.01, 0.05, 0.1 0.7, 1, 2, etc. or some other value).

Based on successful transmission of the handshake signal from the computing device 2424 to the computing device 2420 and based on the computing device 2424 successfully receiving the ACK from the computing device 2420 in response to the handshake signal, the computing device 2420 is configured to transmit one or more data communication signals to the computing device 2424. In some examples, note that the computing device 2424 is configured to provide one or more ACKs, responses, etc. to the computing device 2420 in response to the one or more data communication signals that are transmitted from the computing device 2420.

In even other alternative implementations, both the computing device 2420 and the computing device 2424 initiate the communication initialization and handshake. For example, both the computing device 2420 and the computing device 2424 transmit the same handshake signal to perform communication initialization and handshake, and a successfully transmitted and received ACK in response to the handshake signals (e.g., from the computing device 2420 to the computing device 2424, or from computing device 2424 to the computing device 2420) completes the communication initialization and handshake and facilitates subsequent one or more data communication signals between the computing device 2420 and the computing device 2424.

In some other examples, the computing device 2420 is configured to operate by transmitting a first handshake signal, and the computing device 2424 is configured to operate by transmitting a second handshake signal that is different than the first handshake signal. In such examples, a successfully transmitted and received ACK in response to the first handshake signal (e.g., consider the first handshake signal from the computing device 2420 to the computing device 2424, and an ACK transmitted from the computing device 2424 and received by the computing device 2420) or the second handshake signal (e.g., consider the second handshake signal from the computing device 2424 to the computing device 2420, and an ACK transmitted from the computing device 2420 and received by the computing device 2424) completes the communication initialization and handshake and facilitates subsequent one or more data communication signals between the computing device 2420 and the computing device 2424. In some examples, the same ACK may be used by each of the computing device 2420 and the computing device 2424 in response to the first handshake signal and the second handshake signal, respectively. In alternative examples, different respective ACKs may be used by each of the computing device 2420 and the computing device 2424 in response to the first handshake signal and the second handshake signal, respectively.

FIG. 43 is a schematic block diagram of another embodiment of a method 4300 for execution by one or more computing devices in accordance with the present invention. The method 4300 operates in step 4310 by generating a handshake signal. In some examples, the handshake signal is one that includes one or more predetermined characteristics. For example, based on both the computing device and another computing device, such as a recipient computing device, knowing the one or more predetermined characteristics associated with the handshake signal, the other computing device is operative to detect the handshake signal and to recognize that it is in fact the handshake signal based on knowledge of the one or more predetermined characteristics.

In some examples, both the computing device on the other computing device or program with information regarding the war more predetermined characteristics. In other examples, the computing device and the other computing device communicate with one another to agree upon the one or more predetermined characteristics to be included within a handshake signal. Regardless of the manner by which both the computing device and the other computing device acquire the information regarding the one or more predetermined characteristics associated with the handshake signal, once both the computing device and the other computing device have such information, then computing device is operative to generate the handshake signal based on those one or more predetermined characteristics. Note that different respective handshake signals may be used at different times, such as a first handshake signal used at or during the first time, a second handshake signal used at work during a second time, etc. So long as both the computing device and the other computing device have information regarding which particular handshake signal is to be used at or during a given time, a communication handshake initialization operation may be performed between the computing device and the other computing device.

The method 4300 also operates in step 4320 by transmitting the handshake signal to another computing device. For example, this may be performed by coupling the signal from the computing device via a user to the other computing device. For another example, transmission of the handshake signal to the other computing devices is performed via an alternative communication pathway between the computing device and the other computing device.

The method 4300 operates in step 4330 by determining whether or not an acknowledgment (ACK), response, etc. has been received from the other computing device in response to the handshake signal that has been transmitted. Based on no ACK, response, etc. being received by the computing device, such as after a certain amount of time has elapsed, then the method 4300 loops back to step 4320 to retransmit the handshake signal to the other computing device. Alternatively, based on no ACK, response, etc. being received by the computing device after multiple attempts or instances of the computing device transmitting the handshake signal, the method 4300 ends or continues.

However, based on an ACK, response, etc. that is provided from the other computing device being received by the computing device in step 4330, the method 4300 also operates in step 4340 by supporting communications between the computing device and the other computing device. In some alternative variants of the method 4300, the method 4300 also operates in step 4342 by generating and transmitting one or more data communication signals from the computing device to the other computing device. In even other some alternative variants of the method 4300, the method 4300 also operates in step 4344 by receiving one or more ACKs, responses, etc. from the other computing device.

In some implementations, one or more additional negotiation, agreement, etc. operations are performed in addition to communication initialization and handshake. For example, codec negotiation is performed by the computing device 2420 and the computing device 2424 to establish agreement on a codec that specifies the manner in which data is to be encoded by the computing device 2420 and conveyed to the computing device 2424, and/or vice versa and to ensure that both the computing device 2420 and the computing device 2424 communicate in and agreed upon manner.

This may include selection of one or more parameters that govern how such communications are to be made between the computing devices 2420 and 2424. Examples of such parameters that are to be agreed upon in accordance with codec negotiation as performed between the computing devices 2420 and 2424 may include any one or more of the manner by which one or more signals are to be coupled into a user from computing device 2420, one or more pathways via which the one more signals are to be coupled from the computing device 2420 via the user to the computing device 2424 (e.g., such as may be performed in accordance with any of the various examples, embodiments, associated with FIG. 26-29B, among others), one or more return pathways via which the one or more signals are to be coupled from the computing device 2424 to the computing device 2420 (e.g., such as may be performed in accordance with any of the various examples, embodiments, associated with FIGS. 26-29B, among others, which facilitate coupling of signals the user and/or such as may be performed in accordance with any of the various examples, embodiments, associated with FIGS. 47-48, among others, which facilitate transmission of signals via one or more other communication channels, networks, etc.), the manner by which information is to be represented (e.g., the manner by which digital information such as 1s and 0s is to be represented, such as using different respective images to represent respectively 1 and 0 or such as using a particular signal generation mechanism, within one or more signals that are generated by the computing device 2420 such as by a signal generator, by the hardware components of the display based on the displaying an image, etc., such as may be performed in accordance with any of the various examples, embodiments, associated with FIGS. 30-36, among others), any forward error correction (FEC) and/or error checking and correction (ECC) code that is to be used to generate one or more coded bits to be included with any one or more signals, modulation or symbol mapping to generate modulation symbols such as binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation such as even higher ordered modulations having even greater number of constellation points (e.g., 1024 QAM, etc.), etc.

FIG. 44 is a schematic block diagram of an embodiment 4400 of user device and touchscreen codec negotiation as performed within a system operative to facilitate coupling of one or more signals from a first computing device via a user to a second computing device in accordance with the present invention. The bottom of this diagram shows the sequence of operations as a function of time between two computing devices that facilitate coupling of one or more signals to one another via a user. In these examples, consider a computing device 2420 that includes capability to generate one or more signals to be coupled into the user's body, through the user's body, and into one or more electrodes 85 of a touchscreen display with sensors 80 of a computing device 2424. In alternative embodiments, note that both the computing devices that provide such functionality include capabilities as shown by the computing device 2424. For example, the computing device 2420 may be a portable device. The computing device 2420 may also include a touchscreen display with sensors 80. This diagram corresponds to an instance in which the communication initialization and handshake to facilitate codec negotiation between the computing devices 2420 and 2424 is initiated by the computing device 2420. In other examples, the communication initialization and handshake to facilitate codec negotiation between the computing devices 2420 and 2424 is initiated by the computing device 2424.

In an example of operation and implementation, the computing device 2420 is configured to generate and transmit a codec negotiation signal to the computing device 2424 via the body of the user. The codec negotiation signal includes information to assist and facilitate the agreement between the computing device 2420 and the computing device 2424 on the respective parameters by which subsequent communication is to be performed. Examples of information that may be included within such a codec negotiation signal may include any one or more of one or more required codecs to be used, one or more proposed options for one or more codecs to be used, one or more supported codecs, one or more preferred codecs, etc. based on the functionality and capability of the computing device 2420. In certain examples, the computing device 2420 includes functionality and capability to support communication in accordance with certain parameters and not with others, and the codec negotiation signal includes information to inform the computing device 2424 of that functionality and capability.

In other examples, the computing device 2420 is implemented to support communications based on a list of supported codecs such that certain of the codecs facilitate more robust communications in accordance with modulation and/or symbol mapping (e.g., such as using relatively lower ordered modulations, such as BPSK, QPSK, etc. that may be used when the communication pathway, such as the user or an alternative communication bandwidth, between the computing device 2420 and the computing device 2424 is adversely affected by noise, interference, etc. as opposed to relatively higher ordered modulations, such as 64 QAM, etc.), certain of the codecs facilitate greater throughput (e.g., such as using relatively higher ordered modulations, such as 64 QAM, etc. when the communication medium, such as the user or an alternative communication pathway, between the computing device 2420 and the computing device 2424 is not adversely affected by noise, interference, etc. and is capable of supporting greater throughput), etc., and one or more particular codecs may be preferred to be used in certain instances. In certain examples, the codec negotiation signal includes information regarding which one or more particular codecs are preferred to be used into communications between the computing device 2420 and the computing device 2424.

In even other examples, the computing device 2420 is implemented to support communications based on a list of supported codecs such that certain of the codecs based on certain forms of FEC and/or ECC and not others (e.g., support communication based on turbo code, trellis coded modulation (TCM), but not other types of FEC and/or ECC, or alternatively support communication based on Reed-Solomon (RS) code and BCH (Bose and Ray-Chaudhuri, and Hocquenghem) code, but not other types of FEC and/or ECC, etc.). Communication between the computing device 2420 and the computing device 2424 may be made in accordance with communicating the respective capabilities of the computing devices to identify and to agree on a particular FEC and/or ECC of which both the computing device 2420 and the computing device 2424 and capability that may be used or subsequent communications. Generally speaking, the computing device 2420 and the computing device 2424 effectuate codec negotiation by identifying one or more shared capabilities by both the computing device 2420 and the computing device 2424, such as based on advertisement of such capabilities to one another, based on communication of such information between one another, etc., and subsequent selection of a particular codecs that may be used by both the computing device 2420 and the computing device 2424. In some examples, such as when the computing device 2420 in the computing device 2424 do not share capability of one or more FECs and/or ECCs, the computing device 2420 in the computing device 2424 may agree to facilitate communication between them based on uncoated modulation without using any FEC and/or ECC.

Moreover, negotiation on the particular codecs to be used between the computing device 2420 and the computing device 2424 includes selection of the manner by which signals are to be generated and coupled from the computing device 2420 via the user to the computing device 2424.

In the event that the computing device 2420 does not receive a response (e.g., an acknowledgement (ACK) from the computing device 2424 based on the transmission of the codec negotiation signal from the computing device 2420 to the computing device 2424 is not received), the computing device 2420 may retransmit the codec negotiation signal. This may be based on any one or more criteria, such as after the elapse of a particular amount of time (e.g., Delta T, such as X seconds, where X is some desired value such as 0.01, 0.05, 0.1 0.7, 1, 2, etc. or some other value).

Based on detection and reception of the codec negotiation signal by the computing device 2424, the computing device 2420 is configured to perform one or more operations. In certain examples, the computing device 2424 is configured to accept a proposed codec that is included within the codec negotiation signal provided from the computing device 2420. For example, based on the computing device 2420 generating and transmitting a new codec negotiation signal that includes a proposed codec, and based on the computing device 2424 including capability and functionality to support the proposed codec, the computing device 2424 is configured to generate and transmit a signal, such as a response or an ACK, to the computing device 2420 that indicates acceptance of the proposed codec so that subsequent communications between the computing device 2420 and the computing device 2424 may be performed using the proposed and accepted codec.

In other examples, based on the computing device 2424 not including capability and functionality to support the proposed codec, the computing device 2424 is configured to generate and transmit a signal, such as a response or an ACK, that indicates nonacceptance of the proposed codec. In certain other examples, computing device 2424 is configured to generate and transmit the signal to include one or more alternative proposed codecs to be used for subsequent communications between the computing device 2420 computing device 2424. For example, the response or ACK may include acceptance or denial of one or more of required codec(s), proposed option(s) for codec, supported codec(s), preferred codec(s). Alternatively, this may include other supported codec(s), other preferred codec(s), etc.

In addition, note that multiple respective communications may be made between the computing device 2420 and the computing device 2424 in accordance with performing codec negotiation. For example, multiple respective communications may be made between the computing device 2420 and the computing device 2424 to arrive at agreement regarding which particular codec is to be employed for subsequent communications between the computing device 2420 and the computing device 2424. For example, additional communications may be made to reach agreement of codec (e.g., finalize negotiation of one or more codec parameters if not yet agreed to).

Note that the response or ACK that is provided from the computing device 2424 to the computing device 2420 in response to the codec negotiation signal may be transmitted in any number of pathways. In some examples (e.g., such as when the computing device 2420 includes a touchscreen display with sensors 80, such as in a similar implementation to the computing device 2424), the response or ACK is provided from the computing device 2424 via the user's body to the computing device 2420. In other examples (e.g., such as when the computing device 2420 does not include a touchscreen display with sensors 80), the ACK is provided from the computing device 2424 to the computing device 2420 via one or more alternative to communication pathways (e.g., such as the one or more networks 26 such as described with reference to FIG. 1, FIG. 47 and/or communication channels thereof such as described with reference to FIG. 48, etc.). For example, communication from the computing device 2420 to the computing device 2424 may be performed in a similar manner that communication is provided from the computing device 2420 via the user's body to the computing device 2424 or via another communication mechanism.

Based on successful transmission of the codec negotiation signal from the computing device 2420 to the computing device 2424 and based on the computing device 2420 successfully receiving the response or ACK from the computing device 2424 in response to the codec negotiation signal, and based on the computing device 2420 and the computing device 2424 having agreed on a particular codec to be used for communications between the computing devices, the computing device 2420 is configured to transmit one or more data communication signals to the computing device 2424. In some examples, note that the computing device 2424 is configured to provide one or more ACKs, responses, etc. to the computing device 2420 in response to the one or more data communication signals that are transmitted from the computing device 2420. Note that the data communication signals that are provided from the computing device 2420 to the computing device 2424 may include any type of information. The data communication signals may be achieved using various means such as using signals via an image to convey data, signals via a button to convey data, etc. Examples of such information may include any one or more of user identification information related to the user, name of the user, etc., financial related information such as payment information, credit card information, banking information, etc., shipping information such as a personal address, a business address, etc. to which one or more selected or purchase products are to be shipped, etc., and/or contact information associated with the user such as phone number, e-mail address, physical address, business card information, a web link such as a Universal Resource Location (URL), etc. Generally speaking, such one or more signals may be generated and produced to include any desired information to be conveyed from the computing device 2420 to the computing device 2424 via the user.

In addition, in certain examples, such data communication signals, ACKs, responses, etc. are provided from the computing device 2420 to the computing device 2424, and/or vice versa, based on a codec (e.g., governing one or more of the manner in which signals are generated in one or more of the computing device 2420 in the computing device 2424, one or more communication pathways via which signals are coupled between the computing device 2420 and the computing device 2424, an encoding and decoding protocol such as including FEC and/or ECC, modulation and/or symbol mapping, etc.) that has been agreed to by the computing device 2420 and the computing device 2424. For example, in accordance with such communication handshake initialization, and/or in accordance with a separate mechanism such as codec negotiation, the computing device 2420 and the computing device 2424 and establish agreement on a codec that specifies the manner in which data is to be encoded by the computing device 2420 and conveyed to the computing device 2424. For example, such codec negotiation is performed to ensure that both the computing device 2420 and the computing device 2424 communicate in and agreed upon manner. This includes selection of one or more parameters that govern how such communications are to be made between the computing devices 2420 and 2424. In some examples, this involves FIG. 45 is a schematic block diagram of an embodiment 4500 of user device and touchscreen codec negotiation as performed within a system operative to facilitate coupling of one or more signals from a first computing device via a user to a second computing device in accordance with the present invention.

This diagram corresponds to an instance in which the codec negotiation between the computing devices 2420 and 2424 is initiated by the vice 2424. In this diagram, the computing device 2424 generates and transmits the codec negotiation signal to the computing device 2420.

In the event that the computing device 2424 does not receive a response (e.g., an acknowledgement (ACK) from the computing device 2420 based on the transmission of the codec negotiation signal from the computing device 2424 to the computing device 2420 is not received), the computing device 2420 may retransmit the codec negotiation signal. This may be based on any one or more criteria, such as after the elapse of a particular amount of time (e.g., Delta T, such as X seconds, where X is some desired value such as 0.01, 0.05, 0.1 0.7, 1, 2, etc. or some other value).

Based on successful transmission of the codec negotiation signal from the computing device 2424 to the computing device 2420 and based on the computing device 2424 successfully receiving the ACK from the computing device 2420 in response to the codec negotiation signal, the computing device 2420 is configured to transmit one or more data communication signals to the computing device 2424. In some examples, note that the computing device 2424 is configured to provide one or more ACKs, responses, etc. to the computing device 2420 in response to the one or more data communication signals that are transmitted from the computing device 2420.

In even other alternative implementations, both the computing device 2420 and the computing device 2424 initiate the codec negotiation. For example, both the computing device 2420 and the computing device 2424 transmit the same codec negotiation signal to perform codec negotiation, and a successfully transmitted and received response or ACK in response to the codec negotiation signals (e.g., from the computing device 2420 to the computing device 2424, or from computing device 2424 to the computing device 2420) completes the codec negotiation and facilitates subsequent one or more data communication signals between the computing device 2420 and the computing device 2424.

In some other examples, the computing device 2420 is configured to operate by transmitting a first codec negotiation signal, and the computing device 2424 is configured to operate by transmitting a second codec negotiation signal that is different than the first codec negotiation signal. In such examples, a successfully transmitted and received ACK in response to the first codec negotiation signal (e.g., consider the first codec negotiation signal from the computing device 2420 to the computing device 2424, and an ACK transmitted from the computing device 2424 and received by the computing device 2420) or the second codec negotiation signal (e.g., consider the second codec negotiation signal from the computing device 2424 to the computing device 2420, and an ACK transmitted from the computing device 2420 and received by the computing device 2424) completes the codec negotiation and facilitates subsequent one or more data communication signals between the computing device 2420 and the computing device 2424. In some examples, the same ACK may be used by each of the computing device 2420 and the computing device 2424 in response to the first codec negotiation signal and the second codec negotiation signal, respectively. In alternative examples, different respective ACKs may be used by each of the computing device 2420 and the computing device 2424 in response to the first codec negotiation signal and the second codec negotiation signal, respectively.

FIG. 46 is a schematic block diagram of another embodiment of a method 4600 for execution by one or more computing devices in accordance with the present invention. In some alternative variants of the method 4600, the method 4600 performs a communications initialization and handshake operation before performing subsequent steps included within the method 4600. For example, in such alternate variants of the method 4600, the method 4600 operates in step 4602 by performing a communications initialization and handshake operation between a computing device and another computing device.

The method 4600 operates in step 4610 by generating a codec negotiation signal. In certain examples, the codec negotiation signal is a signal that includes one or more of required codec(s), proposed options for codec(s), supported codec(s), preferred codec(s), etc. based on the functionality, capabilities, etc. of the computing device, etc. Any of a number of variety of types of information related to one or more codecs may be included within the codec negotiation signal that is generated by the computing device to facilitate agreement between the computing device and another computing device regarding one or more codecs to be subsequently used in accordance with supporting communications between the computing device and the other computing device.

The method 4600 also operates in step 4620 by transmitting the codec negotiation to another computing device. In some examples, transmission of the codec negotiation signal to the other computing device is performed by coupling the signal from the computing device via a user to the other computing device. In other examples, transmission of the codec negotiation signal to the other computing devices is performed via an alternative communication pathway between the computing device and the other computing device.

The method 4600 operates in step 4630 by determining whether or not an acknowledgment (ACK), response, etc. has been received from the other computing device in response to the codec negotiation signal that has been transmitted. Based on no ACK, response, etc. being received by the computing device, such as after a certain amount of time has elapsed, then the method 4600 loops back to step 4620 to retransmit the codec negotiation signal to the other computing device. Alternatively, based on no ACK, response, etc. being received by the computing device after multiple attempts or instances of the computing device transmitting the codec negotiation signal, the method 4600 ends or continues.

In addition, in certain alternative variants of the method 4600, additional communications may be made between the computing device and the other computing device to reach agreement of one or more codecs to be used in accordance with supporting subsequent communications between the computing device and the other computing device. For example, the other computing device may provide information to the computing device indicating one or more of required codec(s), proposed options for codec(s), supported codec(s), preferred codec(s), etc. based on the functionality and capabilities of the other computing device, etc. then, based on both the computing the rice and the other computing device having such information regarding the functionality, capabilities, etc., of both the computing device and the other computing device, then the computing device and the other computing device can reach agreement of one or more codecs to be used in accordance with supporting subsequent communications between the computing device and the other computing device.

However, based on an ACK, response, etc. that is provided from the other computing device being received by the computing device in step 4630 in response to the codec negotiation signal that provides for agreement of one or more codecs, the method 4600 also operates in step 4640 by supporting communications between the computing device and the other computing device. In some alternative variants of the method 4600, the method 4600 also operates in step 4642 by generating and transmitting one or more data communication signals from the computing device to the other computing device in accordance with the codec(s) that is/are agreed to between the computing device and the other computing device based on codec negotiation. In even other some alternative variants of the method 4600, the method 4600 also operates in step 4644 by receiving one or more ACKs, responses, etc. from the other computing device in accordance with the codec(s) that is/are agreed to between the computing device and the other computing device based on codec negotiation.

FIG. 47 is a schematic block diagram of an embodiment 4700 of touchscreen to user device communication pathways as performed within a system operative to facilitate coupling of one or more signals from a first computing device via a user to a second computing device in accordance with the present invention. This diagram shows one or more alternative communication pathways between computing device 2420 and the computing device 2424. For example, the computing device 2420 may be a portable device. The computing device 2420 may also include a touchscreen display with sensors 80. In an example of operation and implementation, each of the computing device 2420 and the computing device 2424 include a respective communication interface to facilitate communication via the one or more networks 26. Note that communications from the computing device 2424 to the computing device 2420 (e.g., which may include any one or more of a response, an ACK, a confirmation, a reply, any other communication, etc.) may be performed via coupling through the user's body, such as when the computing device 2420 includes electrodes 85 of a touchscreen display with sensors 80 or alternatively be a one or more other return pathways. Examples of some communications from the computing device 2424 to the computing device 2420 may include any one or more of ACKs, responses, confirmation(s), other communication(s), etc.) via coupling through user's body. This may be performed when the computing device 2420 includes electrodes 85. Alternatively, such communications may be made via any other return pathway such as wired, wireless, WiFi, cellular, cable, satellite, etc. Examples of such communication pathways within the one or more networks 26 may include any one or more of a wired communication pathway, a wireless communication pathway, a wireless local area network (WLAN) such as WiFi, a cellular communication system, a cable-based communication system that may include fiber optic components, hybrid fiber coax (HFC) components, etc., a satellite communication system, and/or any other type of communication system, etc.

In an example of operation and implementation, the computing device 2420 is configured to generate and transmit one or more signals that are coupled via a user's body to the computing device 2424. In accordance with effectuating a return communication from the computing device 2424 to the computing device 2420, the computing device 2424 is configured to generate and transmit one or more other signals that are transmitted to the computing device 2420 via the one or more networks 26. In addition, in certain examples, note that the computing device 2420 is also configured to generate and transmit one or more signals to the computing device 2424 via the one or more networks 26. The communication mechanism from the computing device 2420 via the user's body to the computing device 2424 includes one or more particular communication pathways (e.g., such as via different fingers, digits, extremities, etc. the user), and the communication mechanism between the computing device 2420 and the computing device 2424 includes one or more other communication pathways (e.g., via the one or more networks 26).

FIG. 48 is a schematic block diagram of another embodiment 4800 of touchscreen to user device communication pathways as performed within a system operative to facilitate coupling of one or more signals from a first computing device via a user to a second computing device in accordance with the present invention. Generally speaking, with respect to digital communications, the goal of digital communications systems is to transmit digital data from one location, or subsystem, to another either error free or with an acceptably low error rate. As shown in FIG. 48, data may be transmitted over a variety of communications channels in a wide variety of communication systems: magnetic media, wired, wireless, fiber, copper, and other types of media as well. this diagram includes one or more examples of a communication system that includes one or more communication media, systems, etc. by which one or more signals may be communicated between the computing device 2420 in the computing device 2424.

Referring to FIG. 48, this embodiment 4800 of a communication system includes a communication channel 4899, which may be viewed as being included within the one or more networks 26, that communicatively couples the computing device 2420 and the computing device 2424. In certain examples, the computing device 2420 includes a communication interface that includes a receiver 4816 having a decoder 4818 that is configured to receive one or more signals via the communication channel 4899. In certain other examples, the computing device 2420 also includes a transmitter 4812 having an encoder 4814 that is configured to generate and transmit one or more signals via the communication channel 4899.

At the other end of the communication channel, the computing device 2424 includes a transmitter 4826 having an encoder 4828 that is configured to generate and transmit one or more signals via the communication channel 4899. In certain other examples, the computing device 2424 also includes a receiver 4822 having a decoder 4824 that is configured to receive one or more signals via the communication channel 4899.

In some alternative examples, either of the communication computing devices 2420 and 2424 may include a communication interface that only includes a transmitter or a receiver. There are several different types of media by which the communication channel 4899 may be implemented (e.g., a satellite communication channel 4830 using satellite dishes 4832 and 4834, a wireless communication channel 4840 using towers 4842 and 4844 and/or local antennae 4852 and 4854, a wired communication channel 4850, and/or a fiber-optic communication channel 4860 using electrical to optical (E/O) interface 4862 and optical to electrical (O/E) interface 4864)). In addition, more than one type of media may be implemented and interfaced together thereby forming the communication channel 4899.

FIG. 49A is a schematic block diagram of another embodiment of a method 4901 for execution by one or more computing devices in accordance with the present invention. The method 4901 operates in step 4910 by transmitting a first signal (e.g., handshake signal, codec negotiation signal, data communication signal, etc.) to another computing device via a first communication pathway (e.g., by coupling the signal from the computing device via a user to the other computing device).

The method 4901 also operates in step 4920 by receiving a second signal (e.g., ACK, response, data communication signal, etc.) from the other computing device via the first communication pathway (e.g., by coupling the second signal from the other computing device via the user to the computing device).

FIG. 49B is a schematic block diagram of another embodiment of a method 4902 for execution by one or more computing devices in accordance with the present invention.

The method 4902 operates in step 4911 by transmitting a first signal (e.g., handshake signal, codec negotiation signal, data communication signal, etc.) to another computing device via a first communication pathway (e.g., by coupling the signal from the computing device via a user to the other computing device).

The method 4902 also operates in step 4921 by receiving a second signal (e.g., ACK, response, data communication signal, etc.) from the other computing device via a second communication pathway (e.g., via an alternative communication pathway that is different than coupling via the user).

FIG. 50 is a schematic block diagram of embodiments 5001 and 5002 of user device and touchscreen security based on user bio-metric characterization for use within a system operative to facilitate coupling of one or more signals from a first computing device via a user to a second computing device in accordance with the present invention. In this diagram, one or more processing modules 42 is configured to communicate with and interact with one or more other devices including one or more of DSCs, one or more components associated with a DSC, and/or one or more other components implemented within the computing device 2420 (or alternatively, the computing device 2424). For example, the computing device 2420 and/or the computing device 2424 may be a portable device. The computing device 2420 and/or the computing device 2424 may also include a touchscreen display with sensors 80. Note that such functionality and capability is described with respect to this diagram may be included with any of the various examples, embodiments, etc. of the computing device 2424.

As within other examples, embodiments, etc., note that the one or more processing modules 42 may include integrated memory and/or be coupled to other memory. At least some of the memory stores operational instructions to be executed by the one or more processing modules 42. In addition, note that the one or more processing modules 45 may interface with one or more other devices, components, elements, etc. via one or more communication links, networks, communication pathways, channels, etc. (e.g., such as via one or more communication interfaces of the computing device 2420, such as may be integrated into the one or more processing modules or be implemented as a separate component, circuitry, etc.).

In this diagram, the one or more processing modules 42 is configured to service and interact with the electrodes 85 of a touchscreen display with sensors 80 using respective DSCs 28. In addition, the computing device 2420 is also implemented to include one or more other bio-metric sensors that facilitate verification of a user of the computing device 2420. Examples of such bio-metric sensors that may be implemented within the computing device 2420 may include any one or more of the finger/thumb print sensor 5022 configured to facilitate detection of a finger/thumb print, a camera 5024 configured to facilitate facial recognition of a user, a microphone and 5026 configured to facilitate voice recognition of user, and/or generally any other bio-metric sensors 5026. Note that one or more of these respective bio-metric sensors implemented within the computing device 2420 may be service by one or more other DSCs 28. For example, the communication, control, and signaling to and from the one or more respective bio-metric sensors implemented within the computing device 2420 may be effectuated via the one or more other DSCs 28.

Moreover, in an example of operation and implementation, in an implementation of the computing device 2420 that includes electrodes 85 of a touchscreen display with sensors 80 such that the electrodes 85 are serviced by DSCs 28, impedance measurement (Z) of the user is performed based on the user interacting with the electrodes 85 of the touchscreen display with sensors 80. For example, based on a user contacting or being within sufficiently close proximity to one or more of the electrodes 85 of the touchscreen display with sensors 80, the one or more DSCs 28 configured to service and interact with the electrodes 85 of the touchscreen display with sensors 80 are also configured to perform impedance measurement (Z) of the user of the computing device 2420. Note that such impedance measurement (Z) of the user of the computing device 2420 may be performed based on every interaction of the user with the computing device 2420, based on fewer than all of the interactions of the user with the computing device 2420, and/or based on any other schedule or criteria. In certain samples, the one or more processing modules 42 is configured to keep track various measurements of the impedance measurement (Z) of the user of the computing device 2420 to generate a particular profile associated with the user.

In certain examples, the impedances detected based on impedance measurements (Zs) of the user of the computing device 2420 at different respective times are the same for sufficiently close within some degree of certainty (e.g., varying less than 15%, less than 10%, less than 5%, or varying less than some other degree of certainty). In other examples, the impedances detected based on impedance measurements (Zs) of the user of the computing device 2420 at different respective times are substantially different from one another based on such a degree of certainty (e.g., varying more than 15%, less more 10%, more than 5%, or varying more than some other degree of certainty). By tracking and monitoring the impedance measurement (Z) of the user of the computing device 2420 over time, the one or more processing modules 42 is configured to update the profile associated with the user.

In addition, note that one or more environmental sensors (e.g., temperature sensor, humidity sensor, barometric pressure sensor, etc.) may be implemented within the computing device 2420 and measurements generated by the one or more environmental sensors may be processed in combination with impedance measurements (Zs) of the user of the computing device 2420 in accordance with updating the profile associated with the user. In addition, or alternatively to, the computing device 2420 may include one or more mechanisms by which environmental information corresponding to a location of the user of the computing device 2420 and the computing device 2420 may be determined. For example, the computing device 2420 may access one or more networks, such as the Internet, to retrieve environmental information associated with a location that is associated with the location of the user of the computing device 2420 and the computing device 2420 (e.g., based on location determination capability within the computing device 2420 in accordance with interacting with one or more networks, and correlating retrieved environmental information associated with the determined location). For example, a higher or lower impedance measurement (Z) of the user may be determined and maybe based on the particular humidity of the environment in which the user of the computing device 2420 and the computing device 2420 are situated at a particular time. Similarly, other environmental conditions may also affect the impedance measurement (Z) of the user.

Note that any of the bio-metric sensing capabilities as described herein may be performed individually or in combination with one or more other of the bio-metric sensing capabilities as described herein so as to facilitate effective verification of the identity of a user of the computing device 2420. For example, such bio-metric sensing capabilities may be based on Z measurement of user, thumb/finger-print, facial recognition, voice recognition, respiration rate, etc. In some examples, this is performed at start-up/initialization, periodically/every Delta T, based on 1+ conditions, based on 1+ criteria, based on of environment conditions, and/or any change of such parameters/conditions/etc.)

In an example of operation and implementation, one or more bio-metric mechanisms of user verification is performed by the computing device 2420 before effectuating communication from the computing device 2420 via the user to the computing device 2424. For example, any one or more of an impedance measurements (Zs) of the user of the computing device 2420 (e.g., using the electrodes 85 of the touchscreen display with sensors 80 that are serviced by DSCs 28 that are in communication with the one or more processing modules 42), a finger/thumb print detection of the user of the computing device 2420 (e.g., using the finger/thumb print sensor 5022 of the computing device 2420, which may optionally be serviced by one or more DSCs 28 that are in communication with the one or more processing modules 42), a facial recognition of the user of the computing device 2420 (e.g., using the camera 5024 of the computing device 2420, which may optionally be serviced by one or more DSCs 28 that are in communication with the one or more processing modules 42), a voice recognition of the user of the computing device 2420 (e.g., using the microphone 5026 of the computing device 2420, which may optionally be serviced by one or more DSCs 28 that are in communication with the one or more processing modules 42), and/or any other bio-metric sensor 5026 is configured to perform verification of the user of the computing device 2420.

Note that any one or more additional bio-metric mechanisms of user monitoring and verification may also be used including those that are based on one or more other sensors, such as heart rate sensors, respiration/breathing rate sensors, etc. In certain examples, the one or more processing modules 42 is configured to monitor such bodily operations based on an operation currently being performed by a user of the computing device 2420. Consider a user of the computing device 2420 who is an unauthorized user of the computing device 2420 attempting to effectuate a fraudulent financial transaction using the computing device 2420, the one or more processing modules 42 is configured to perform monitoring and detection of change of one or more bodily functions such as heart rate, respiration rate, etc. when the user is attempting to effectuate a fraudulent financial transaction using the computing device 2420. Based on such change of one or more bodily functions such as heart rate, respiration rate, etc. comparing unfavorably to one or more criteria (e.g., being outside of acceptable range), the one or more processing modules 42 is configured to identify that the financial transaction is indeed fraudulent and to deny or block the user from interacting with the computing device 2420.

Also, the one or more processing modules 42 is configured to process information provided from any such bio-metric mechanisms of user monitoring and verification in accordance with determining whether the identity of the user of the computing device 2420 corresponds to the identity of an authorized user of the computing device 2420. Examples of such bio-metric mechanisms may include any or more of Z measurement of user, thumb/finger print, facial recognition, voice recognition, galvanic skin response (GSR) [alternatively referred to as Electrodermal Activity (EDA) and Skin Conductance (SC)], etc.

Based on information provided by such one or more mechanisms of the user verification, the one or more processing modules 42 is configured to process that information provided from any such one or more bio-metric mechanisms of user monitoring and verification to determine whether or not it compares favorably to an identity of the user.

For example, one or more processing modules 42 is configured to compare predetermined or known information associated with the user (e.g., such as stored within memory, retrieved from a database, etc.) to information that is provided based on one or more bio-metric sensors that are implemented within the computing device 2420 to determine whether or not the user of the computing device 2420 is to be authorized to effectuate communication from the computing device 2420 via the user to the computing device 2424. Based on favorable comparison of such information to predetermined or known information associated with the user, the one or more processing modules 42 is configured to permit the user of the computing device 2420 to effectuate communication from the computing device 2420 via the user to the computing device 2424. Alternatively, based on the unfavorable comparison of such information to predetermined or known information associated with the user, the one or more processing modules 42 is configured to deny or block the user of the computing device 2420 from the ability to effectuate communication from the computing device 2420 via the user to the computing device 2424. The use of one or more bio-metric provides enhanced security and control access for a user's usage of the computing device 2420 based on one or more bio-metric measurements associated with the user of the computing device 2420.

FIG. 51 is a schematic block diagram of another embodiment of a method 5100 for execution by one or more computing devices in accordance with the present invention. The method 5100 operates in step 5110 by producing verification information for a user using a computing device based on one or more bio-metric mechanisms (e.g., Z measurement of user, thumb/finger print, facial recognition, voice recognition, galvanic skin response (GSR) [alternatively referred to as Electrodermal Activity (EDA) and Skin Conductance (SC)], etc.).

The method 5100 also operates in step 5120 by processing the verification information for the user to determine whether the user is authorized to operate the computing device and/or one or more applications operative on the computing device. Based on the user being determined to be authorized to operate the computing device computing device and/or one or more applications operative on the computing device, the method 5100 branches via step 5130 to step 5140 and continues by permitting the user to operate the computing device including to effectuate communication from the computing device to another computing device.

Alternatively, based on the user being determined not to be authorized to operate the computing device computing device and/or one or more applications operative on the computing device, the method 5100 branches via step 5130 to step 5150 and continues by blocking the user from operating the computing device including blocking communication from the computing device to the other computing device. Alternatively, based on the user being determined not to be authorized to operate the computing device computing device and/or one or more applications operative on the computing device, the method 5100 branches via step 5130 to end or continue.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc.

that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
one or more processing modules; and
a display that includes a plurality of pixel electrodes operably coupled to the one or more processing modules via a plurality of lines, wherein, when enabled, the display configured to:
transmit first data to another computing device based on a first signal having a first frequency that is generated by displaying a first image within the display based on first image data provided by the one or more processing modules, wherein the first image includes a first plurality of alternating stripes based on a first function of a frame refresh rate (FRR) of the display; and
transmit second data to the another computing device based on a second signal having a second frequency that is generated by displaying a second image within the display based on second image data provided by the one or more processing modules, wherein the second image includes a second plurality of alternating stripes based on a second function of the FRR of the display, wherein the first signal and the second signal are coupled into a user being in contact with or within proximity to the display that facilitates coupling of the first signal and the second signal through the user to the another computing device that includes a touchscreen that is configured to detect and receive the first signal and the second signal based on the user being in contact with or within proximity to the touchscreen of the another computing device that facilitates coupling of the first signal and the second signal from the user.

2. The computing device of claim 1, wherein:
the first plurality of alternating stripes are of a first size; and
the second plurality of alternating stripes are of a second size.

3. The computing device of claim 1, wherein:
the first plurality of alternating stripes and the second plurality of alternating stripes are of a common uniform size.

4. The computing device of claim 1, wherein:
the first plurality of alternating stripes are of a first uniform size; and
the second plurality of alternating stripes are of a second uniform size.

5. The computing device of claim 1, wherein:
the first plurality of alternating stripes includes a first stripe of a first size and a second stripe of a second size.

6. The computing device of claim 1, wherein:
the first plurality of alternating stripes includes a first stripe of a first size and a second stripe of a second size; and
the second plurality of alternating stripes includes a third stripe of a third size.

7. The computing device of claim 1, wherein:
the first plurality of stripes includes a first plurality of alternating black and white stripes; and
the second plurality of stripes includes a second plurality of alternating black and white stripes.

8. The computing device of claim 7, wherein:
the first plurality of alternating stripes are of a first value and a second value, respectively, that are based on the first function of the FRR of the display; and
the second plurality of alternating stripes are of the first value and the second value, respectively, that are based on the second function of the FRR of the display.

9. The computing device of claim 1, wherein:
the display includes a resolution that specifies a number of pixel rows and is operative based on the FRR;
a gate scanning frequency of the display is a product resulting from the number of pixel rows multiplied by the FRR; and
the first frequency of the first signal is a first sub-multiple of the gate scanning frequency that is the gate scanning frequency divided by a first positive integer that is greater than or equal to 2; and
the second frequency of the second signal is a second sub-multiple of the gate scanning frequency that is the gate scanning frequency divided by a second positive integer that is different than the first positive integer and is greater than or equal to 2.

10. The computing device of claim 1, wherein:
the display includes a resolution that specifies a number of pixel rows and is operative based on a FRR;
a gate scanning frequency of the display is a product resulting from the number of pixel rows multiplied by the FRR;

the first frequency of the first signal is a first sub-multiple of the gate scanning frequency that is one-half of the gate scanning frequency multiple by a first fraction N/M;
the second frequency of the first signal is a second sub-multiple of the gate scanning frequency that is one-half of the gate scanning frequency multiple by a second fraction O/P;
N is a first positive integer that is greater than or equal to 2;
M is a second positive integer that is greater than or equal to 2 and also greater than N;
O is a third positive integer that is greater than or equal to 2; and
P is a fourth positive integer that is greater than or equal to 2 and also greater than O.

11. The computing device of claim 1, wherein at least one of the first data and the second data includes at least one of:
user identification information related to the user;
financial related information associated with the user;
shipping information associated with the user; or
contact information associated with the user.

12. The computing device of claim 11, wherein at least one of:
the user identification information related to the user including at least one of a name of the user, a username of the user, a phone number of the user, an e-mail address of the user, a personal address of the user, a business address of the user, or business card information of the user;
the financial related information associated with the user including at least one of payment information of the user, credit card information of the user, or banking information of the user;
the shipping information associated with the user including at least one of a personal address of the user or a business address of the user; or
the contact information associated with the user including at least one of a phone number of the user, an e-mail address of the user, a personal address of the user, a business address of the user, or business card information of the user.

13. The computing device of claim 1, wherein the touchscreen of the another computing device includes a touchscreen display that is configured to display another image and to detect and receive the first signal and the second signal based on the user being in contact with or within proximity to the touchscreen of the another computing device that facilitates coupling of the first signal and the second signal from the user.

14. The computing device of claim 1, wherein the display of the computing device includes a touchscreen display.

15. A computing device comprising:
one or more processing modules; and
a display that includes a plurality of pixel electrodes operably coupled to the one or more processing modules via a plurality of lines, wherein, when enabled, the display configured to:
transmit first data to another computing device based on a first signal having a first frequency that is generated by displaying a first image within the display based on first image data provided by the one or more processing modules, wherein the first image includes a first plurality of alternating black and white stripes of a first size based on a first function of a frame refresh rate (FRR) of the display; and
transmit second data to the another computing device based on a second signal having a second frequency that is generated by displaying a second image within the display based on second image data provided by the one or more processing modules, wherein the second image includes a second plurality of alternating black and white stripes of a second size based on a second function of the FRR of the display, wherein the first signal and the second signal are coupled into a user being in contact with or within proximity to the display that facilitates coupling of the first signal and the second signal through the user to the another computing device that includes a touchscreen that is configured to detect and receive the first signal and the second signal based on the user being in contact with or within proximity to the touchscreen of the another computing device that facilitates coupling of the first signal and the second signal from the user.

16. The computing device of claim 15, wherein:
the first plurality of alternating black and white stripes are of a first value and a second value, respectively, that are based on the first function of the FRR of the display; and
the second plurality of alternating black and white stripes are of the first value and the second value, respectively, that are based on the second function of the FRR of the display.

17. The computing device of claim 15, wherein:
the display includes a resolution that specifies a number of pixel rows and is operative based on the FRR;
a gate scanning frequency of the display is a product resulting from the number of pixel rows multiplied by the FRR; and
the first frequency of the first signal is a first sub-multiple of the gate scanning frequency that is the gate scanning frequency divided by a first positive integer that is greater than or equal to 2; and
the second frequency of the second signal is a second sub-multiple of the gate scanning frequency that is the gate scanning frequency divided by a second positive integer that is different than the first positive integer and is greater than or equal to 2.

18. The computing device of claim 15, wherein:
the display includes a resolution that specifies a number of pixel rows and is operative based on a FRR;
a gate scanning frequency of the display is a product resulting from the number of pixel rows multiplied by the FRR;
the first frequency of the first signal is a first sub-multiple of the gate scanning frequency that is one-half of the gate scanning frequency multiple by a first fraction N/M;
the second frequency of the first signal is a second sub-multiple of the gate scanning frequency that is one-half of the gate scanning frequency multiple by a second fraction O/P;
N is a first positive integer that is greater than or equal to 2;
M is a second positive integer that is greater than or equal to 2 and also greater than N;
O is a third positive integer that is greater than or equal to 2; and
P is a fourth positive integer that is greater than or equal to 2 and also greater than O.

19. The computing device of claim 15, wherein at least one of the first data and the second data includes at least one of:
- user identification information related to the user;
- financial related information associated with the user;
- shipping information associated with the user; or
- contact information associated with the user.

20. The computing device of claim 19, wherein at least one of:
- the user identification information related to the user including at least one of a name of the user, a username of the user, a phone number of the user, an e-mail address of the user, a personal address of the user, a business address of the user, or business card information of the user;
- the financial related information associated with the user including at least one of payment information of the user, credit card information of the user, or banking information of the user;
- the shipping information associated with the user including at least one of a personal address of the user or a business address of the user; or
- the contact information associated with the user including at least one of a phone number of the user, an e-mail address of the user, a personal address of the user, a business address of the user, or business card information of the user.

* * * * *